(12) United States Patent (10) Patent No.: US 11,314,478 B2
Kim et al. (45) Date of Patent: Apr. 26, 2022

(54) ELECTRONIC DEVICE FOR CONTROLLING AUDIO OUTPUT AND OPERATION METHOD THEREOF

(71) Applicant: Samsung Electronics Co., Ltd., Suwon-si (KR)

(72) Inventors: Hyunkyoung Kim, Seoul (KR); Hyewon Seo, Suwon-si (KR); Dasom Kim, Seoul (KR); Ukhyun Kim, Daegu (KR); Kyunghui Oh, Seoul (KR); Sangmin Lee, Chilgok-gun (KR); Hoyeon Kim, Yongin-si (KR); Jung-Uk Lim, Yongin-si (KR); Hyunyoung Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/923,536

(22) Filed: Mar. 16, 2018

(65) Prior Publication Data

US 2018/0267773 A1 Sep. 20, 2018

(30) Foreign Application Priority Data

Mar. 17, 2017 (KR) .................. KR10-2017-0034048

(51) Int. Cl.
*G06F 3/16* (2006.01)
*G06F 3/0484* (2013.01)
*G06F 3/0482* (2013.01)

(52) U.S. Cl.
CPC ............ *G06F 3/165* (2013.01); *G06F 3/0482* (2013.01); *G06F 3/0484* (2013.01); *G06F 2203/04803* (2013.01)

(58) Field of Classification Search
CPC ...... G06F 3/165; G06F 3/0482; G06F 3/0484; G06F 2203/04803

(Continued)

(56) References Cited

U.S. PATENT DOCUMENTS 5,640,176 A * 6/1997 Mundt .................. G06F 1/3203
715/839
5,740,436 A * 4/1998 Davis .................. G06F 3/04897
713/1

(Continued)

FOREIGN PATENT DOCUMENTS

CN 102821195 A 12/2012
CN 104811543 A 7/2015

(Continued)

OTHER PUBLICATIONS

European Office Action dated Jun. 14, 2019, issued in European Patent Application No. 18162553.4.

(Continued)

*Primary Examiner* — Stephen S Hong
*Assistant Examiner* — Broderick C Anderson
(74) *Attorney, Agent, or Firm* — Jefferson IP Law, LLP

(57) ABSTRACT

An electronic device for controlling output of audio data, and an operation method thereof are provided. The electronic device includes a display, a communication interface, at least one processor, and a memory electrically connected to the processor, wherein the memory is configured to store instructions, and when executed, the instructions enable the at least one processor to perform setting the electronic device and at least one other electronic device as audio output devices of different applications, based on a user input, detecting a connection to the at least one other electronic device via the communication interface, and controlling the display to display information indicating that the electronic device and the at least one other electronic device are set as the audio output devices of different applications.

20 Claims, 48 Drawing Sheets

(58) Field of Classification Search
USPC .......................................................... 715/716
See application file for complete search history.

(56) References Cited

U.S. PATENT DOCUMENTS

| | | | |
|---|---|---|---|
| 8,068,925 | B2 | 11/2011 | McKillop et al. |
| 9,348,495 | B2 | 5/2016 | Young et al. |
| 9,424,208 | B2 | 8/2016 | Mahalingam |
| 2002/0196134 | A1* | 12/2002 | Lutter .................. H04R 5/04 340/426.1 |
| 2004/0267965 | A1 | 12/2004 | Vasudevan et al. |
| 2006/0236255 | A1* | 10/2006 | Lindsay ................. G06F 3/165 715/766 |
| 2011/0196520 | A1 | 8/2011 | Peterson et al. |
| 2012/0054613 | A1* | 3/2012 | Yoo ....................... G06F 3/165 715/716 |
| 2012/0208455 | A1 | 8/2012 | Hill |
| 2013/0283164 | A1* | 10/2013 | Mahalingam ....... G06F 3/04817 715/727 |
| 2014/0316543 | A1* | 10/2014 | Sharma ................. H04L 67/10 700/94 |
| 2015/0121278 | A1* | 4/2015 | Kim .................... G06F 3/04886 715/771 |
| 2016/0302027 | A1 | 10/2016 | Lee |
| 2017/0300192 | A1* | 10/2017 | Naour ................. H04N 21/431 |
| 2020/0310743 | A1* | 10/2020 | Nicholson ............. G06F 3/165 |

FOREIGN PATENT DOCUMENTS

| | | |
|---|---|---|
| CN | 106055300 A | 10/2016 |
| CN | 106201423 A | 12/2016 |
| CN | 106302997 A | 1/2017 |
| CN | 106375563 A | 2/2017 |
| EP | 2 423 807 A2 | 2/2012 |
| KR | 10-2005-0094424 A | 9/2005 |
| KR | 10-2008-0058815 A | 6/2008 |
| KR | 10-0901714 B1 | 6/2009 |
| KR | 10-2013-0113745 A | 10/2013 |
| KR | 10-2016-0040770 A | 4/2016 |
| KR | 10-2016-0041233 A | 4/2016 |
| KR | 20160041233 A | 4/2016 |

OTHER PUBLICATIONS

Chinese Office Action dated Jan. 6, 2020, issued in Chinese Application No. 201810220743.8.
Ndian Office Action dated Oct. 12, 2020, issued in Indian Application No. 201814009662.
European Summons to attend oral proceedings dated May 27, 2020, issued in European Application No. 18162553.4-1203.
Chinese Office Action dated Jul. 17, 2020, issued in Chinese Application No. 201810220743.8.
Korean Office Action dated Jan. 22, 2021, issued in Korean Application No. 10-2017-0034048.
Chinese Office Action dated Feb. 5, 2021, issued in Chinese Application No. 201810220743.8.
Korean Notice of Patent Grant dated Jul. 29, 2021, issued in Korean Application No. 10-2017-0034048.
European Result of Consultation dated Apr. 20, 2021, issued in European Patent Application No. 18162553.4-1203.
European Minutes dated May 4, 2021, issued in European Patent Application No. 18162553.4-1203.
European Decision to Refuse dated May 11, 2021, issued in European Patent Application No. 18162553.4-1203.
Chinese Decision of Rejection dated May 21, 2021, issued in Chinese Patent Application No. 201810220743.8.

* cited by examiner

ELECTRONIC DEVICE FOR CONTROLLING AUDIO OUTPUT AND OPERATION METHOD THEREOF

CROSS-REFERENCE TO RELATED APPLICATION(S)

This application is based on and claims priority under 35 U.S.C. § 119(a) of a Korean patent application number 10-2017-0034048, filed on Mar. 17, 2017, in the Korean Intellectual Property Office, the disclosure of which is incorporated by reference herein in its entirety.

TECHNICAL FIELD

The disclosure relates to an electronic device for controlling the output of audio data, and an operation method thereof.

BACKGROUND

An electronic device may be connected to an external electronic device having an audio output function via a wired or wireless interface. For example, the electronic device may be connected to an external electronic device having an audio output function, such as earphones, headphones, a speaker, a TV, or the like. The electronic device may output audio data via an external electronic device when audio data is generated in the state in which the electronic device is connected to the external electronic device.

The above information is presented as background information only to assist with an understanding of the disclosure. No determination has been made, and no assertion is made, as to whether any of the above might be applicable as prior art with regard to the disclosure.

SUMMARY

An electronic device that is connected to an external electronic device may output audio data of multiple applications via one of the electronic device and the external electronic device based on user input. For example, when the electronic device is selected as an audio output device, based on a user input, and a game application is launched while a music application is running, the electronic device may output audio data generated by the music application and the game application via the electronic device. As another example, when the external electronic device is selected as an audio output device, based on a user input, and a navigation application is launched while a music application is running, the electronic device may perform control such that audio data generated by the music application and the navigation application are transmitted to the external electronic device and the external electronic device outputs the audio data. However, when audio data generated by multiple applications are output together via one device, it may be inconvenient for a user when listening to the audio data, which is a drawback. Therefore, conventionally, when multiple applications that generate audio data are executed, only audio data of the most recently launched application is output, and output of the audio data of the remaining applications is interrupted. However, this cannot satisfy a user who desires to enjoy various sounds.

Aspects of the disclosure are to address at least the above-mentioned problems and/or disadvantages and to provide at least the advantages described below. Accordingly, an aspect of the disclosure provide a method and apparatus for separately outputting audio data generated by multiple applications by an electronic device.

In accordance with an aspect of the disclosure, an electronic device is provided. The electronic devices includes a display, a communication interface, at least one processor, and a memory electrically connected to the at least one processor, wherein the memory is configured to store instructions, and when executed, the instructions enable the at least one processor to perform setting the electronic device and at least one other electronic device as audio output devices of different applications, based on a user input, detecting a connection to the at least one other electronic device via the communication interface, and controlling the display to display such that information indicating that the electronic device and the at least one other electronic device are set as the audio output devices of different applications.

In accordance with an aspect of the disclosure, an operation method of an electronic device is provided. The operation method includes setting the electronic device and at least one other electronic device as audio output devices of different applications, based on a user input, detecting a connection to the at least one other electronic device, and displaying information indicating that the electronic device and the at least one other electronic device are set as the audio output devices of the different applications.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
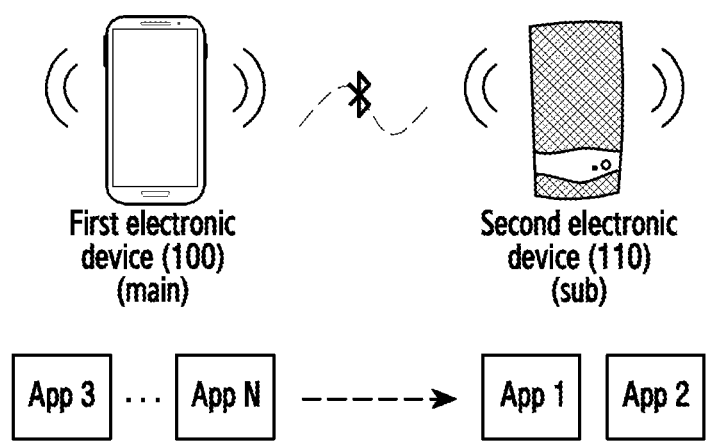
FIGS. 1A, 1B, 1C, and 1D are diagrams illustrating structures of separate output of audio data by an electronic device according to various embodiments of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, an expression "A or B", "A and/or B", or the like may include all possible combinations of items enumerated together. Although expressions such as "$1^{st}$", "$2^{nd}$", "first", and "second" may be used to express corresponding constitutional elements, it is not intended to limit the corresponding constitutional elements. When a certain (e.g., $1^{st}$) constitutional element is mentioned as being "operatively or communicatively coupled with/to" or "connected to" a different (e.g., $2^{nd}$) constitutional element, the certain constitutional element is directly coupled with/to another constitutional element or can be coupled with/to the different constitutional element via another (e.g., $3^{rd}$) constitutional element.

An expression "configured to" used in the disclosure may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., central processing unit (CPU) or an application processor) capable of performing corresponding operations by executing one or more software programs stored in a memory device.

An electronic device according to an embodiment of the disclosure may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, or a wearable device (e.g., smart glasses, a head-mounted-device (HMD), electronic clothes, an electronic bracelet, an electronic necklace, an electronic appcessory, an electronic tattoo, a smart mirror, or a smart watch).

The electronic device (ex. home appliance) may include at least one of a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, or an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, or various kinds of measuring instruments (e.g., a water meter, an electric meter, a gas meter, and a radio wave meter). The electronic device according to various embodiments of the disclosure may be a combination of one or more of the aforementioned various devices. The electronic device according to an embodiment of the disclosure may be a flexible device. The electronic device is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

In the various embodiments described hereinafter, the term "application" has a meaning that includes various applications driven by an operating system. For example, the application may include various types of applications that may generate audio data, such as applications associated with video, games, phone calls, text messaging, music, an alarm, a scheduler, navigation, system configuration, a web browser, an SNS, a camera, or the like. The application according to embodiments in the disclosure is not limited to the above-described applications.

In the various embodiments described hereinafter, an external electronic device may be any of various types of electronic devices capable of being connected to an electronic device via a wired or wireless interface, and having an audio output function. The wired or wireless interface may include, for example, at least one of a high definition multimedia interface (HDMI), Bluetooth, Wi-Fi, Li-Fi, and a cellular communication interface. For example, the external electronic device may include a Bluetooth speaker, Bluetooth earphones, a Bluetooth headphone, a Bluetooth headset, a TV connected via HDMI, a remote electronic device connected via a Wi-Fi and/or cellular communication interface, or the like. However, the external electronic device in the disclosure is not limited to the above-described devices. In the various embodiments described hereinafter, an electronic device assumes an audio output device that is directly connected to the electronic device via an earphone terminal or a USB terminal as an audio output device of the electronic device. However, the electronic device may recognize an audio output device that is directly connected to the electronic device via an earphone terminal or a USB terminal as an external electronic device.

FIGS. 1A to 1D are diagrams illustrating structures of separate output of audio data by an electronic device according to various embodiments of the disclosure.

Referring to FIGS. 1A to 1D, a first electronic device 100 may be connected to at least one external electronic device (e.g., the second electronic device 110 and the third electronic device 120) via a wired or wireless interface. The first electronic device 100 may separately output audio data generated by multiple applications, based on the first electronic device 100 and at least one external electronic device connected to the first electronic device 100. For example, the first electronic device 100 may determine a main-output device and at least one sub-output device for audio data from among the first electronic device 100 and the at least one external electronic device, based on a user input. The first electronic device 100 may control such that audio data of at least one of multiple applications which are executable in the first electronic device 100 is output via the at least one sub-output device, and may perform control such that audio data of the remaining applications is output via the main-output device.

For example, the first electronic device 100 may determine the first electronic device 100 to be a main-output device, and may determine the second electronic device 110 connected to the first electronic device 100 via Bluetooth to be a sub-output device, as illustrated in FIG. 1A. The first electronic device 100 may control such that audio data of first and second applications (App1 and App2) from among multiple applications (App1 to App N) which are executable in the first electronic device 100 are output via the second electronic device 110, and may control such that audio data of the remaining applications (App3 to App N) are output via the first electronic device 100. The first electronic device 100 may output audio data of the remaining applications via one of a speaker installed in the first electronic device 100, earphones connected via an earphone terminal, and a USB audio output device connected via a USB terminal.

Figure 1B:
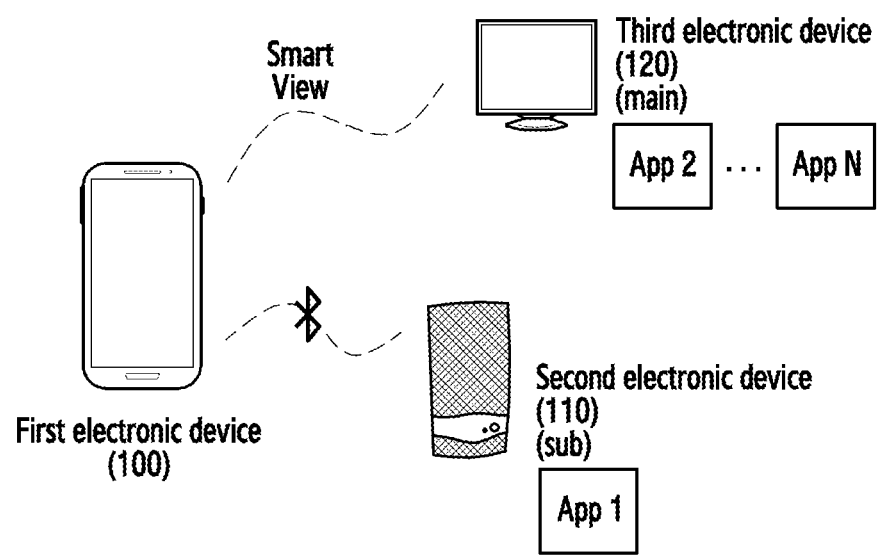

In the example illustrated in FIG. 1B, the first electronic device 100 may determine the third electronic device 120, which is connected to the first electronic device 100 via wireless communication (e.g., Wi-Fi), as a main-output device, and may determine the second electronic device 110, which is connected to the first electronic device 100 via Bluetooth, as a sub-output device. The first electronic device 100 may control such that audio data of a first application (App1) from among multiple applications (App1 to App N) which are executable in the first electronic device 100 is output via the second electronic device 110, and may perform control such that audio data of the remaining applications (App2 to App N) are output via the third electronic device 120.

Figure 1C:
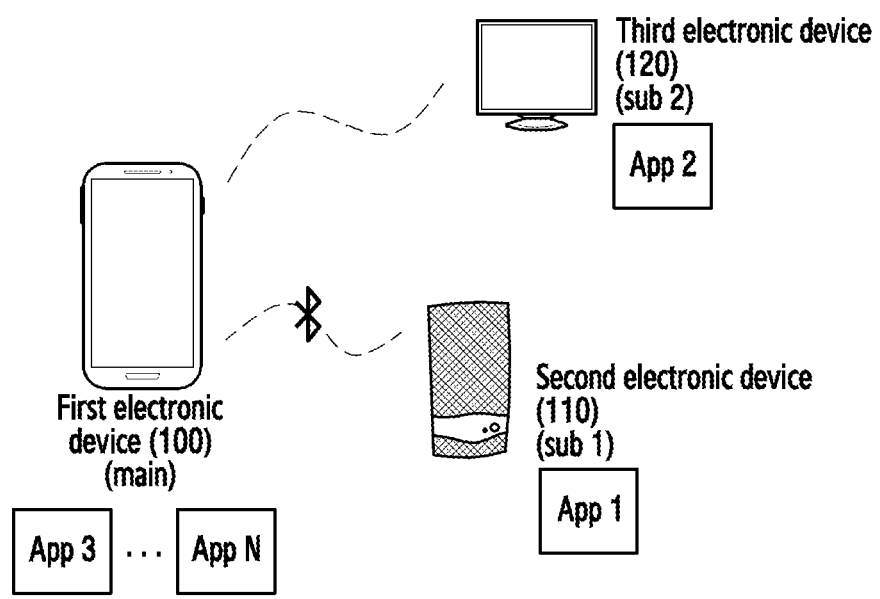

In the example illustrated in FIG. 1C, the first electronic device 100 may determine the first electronic device 100 as a main-output device, may determine the second electronic device 110 connected to the first electronic device 100 via Bluetooth as a first sub-output device, and may determine the third electronic device 120 connected to the first electronic device 100 via a HDMI as a second sub-output device. The first electronic device 100 may perform control such that audio data of a first application (App1) from among multiple applications (App1 to App N) which are executable in the first electronic device 100 is output via the second electronic device 110, may perform control such that audio data of a second application (App2) is output via the third electronic device 120, and may perform control such that audio data of the remaining applications (App3 to App N) are output via the first electronic device 100.

Figure 1D:
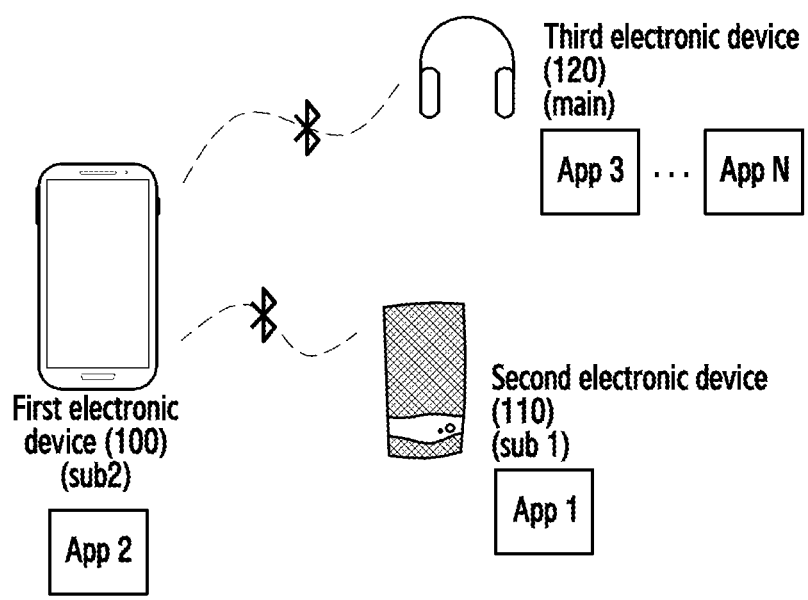

In the example illustrated in FIG. 1D, the first electronic device may determine the third electronic device 120 connected to the first electronic device 100 via Bluetooth as a main-output device, may determine the second electronic device 110 connected to the first electronic device 100 via Bluetooth as a first sub-output device, and may determine the first electronic device 100 as a second sub-output device. The first electronic device 100 may control such that audio data of a first application (App1) from among multiple applications (App1 to App N) which are executable in the first electronic device 100 is output via the second electronic device 110, may control such that audio data of a second application (App2) is output via the first electronic device 100, and may perform control such that audio data of the remaining applications (App3 to App N) are output via the third electronic device 120.

Figure 2:
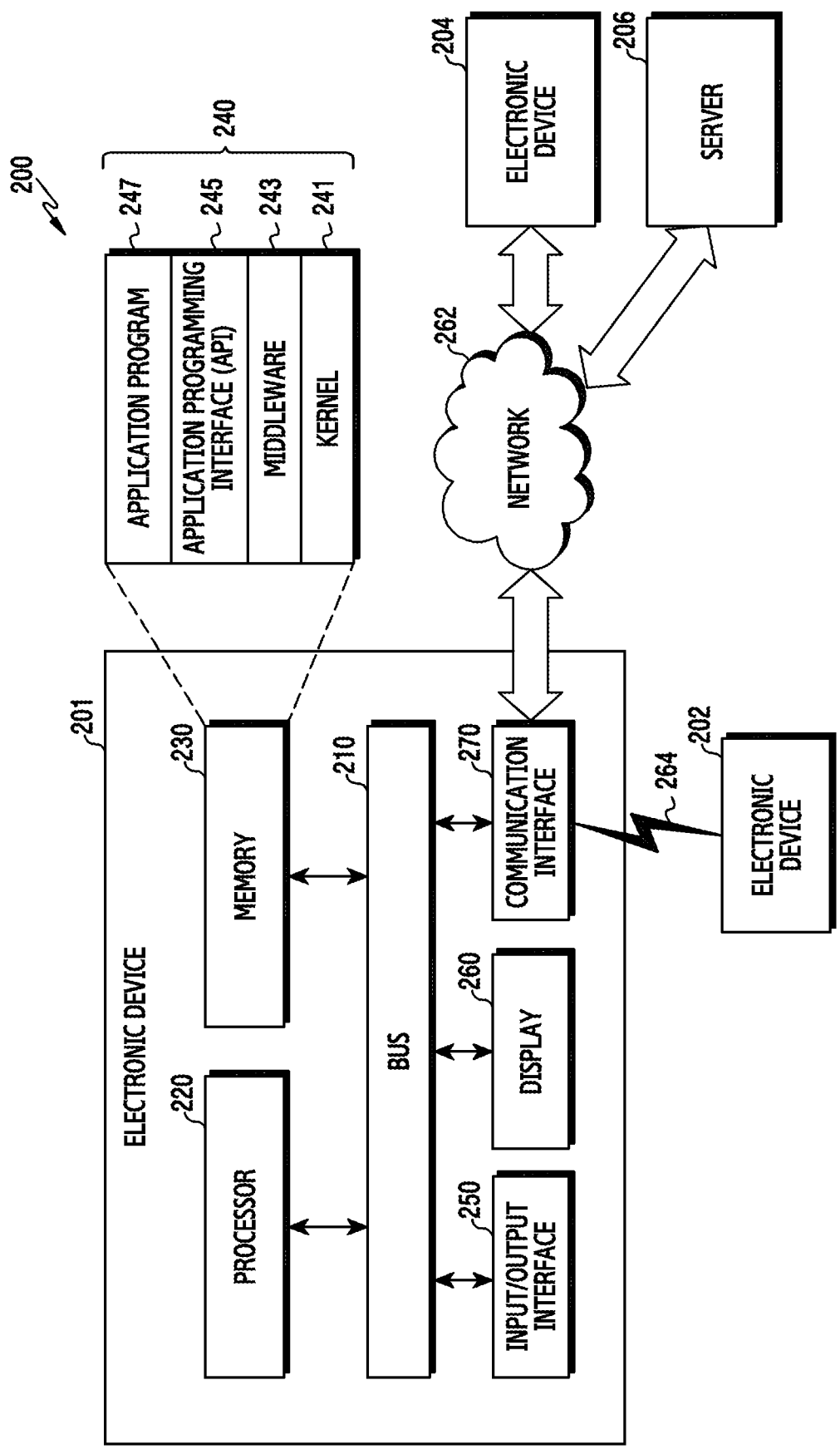
FIG. 2 is a diagram illustrating a network environment including an electronic device according to an embodiment of the disclosure.

FIG. 2 illustrates a network environment including an electronic device according to various embodiments of the disclosure. An electronic device 201 of FIG. 2 may be the first electronic device 100 of FIG. 1.

Referring to FIG. 2, the electronic device 201 may include a bus 210, a processor 220, a memory 230, an input/output interface 250, a display 260, and a communication interface 270. In some embodiments, the electronic device 201 may omit at least one of the elements, or may further include other elements.

The bus 210 may include a circuit which interconnects the elements 220 to 270, and forwards communication (e.g., a control message and/or data) between the elements.

The processor 220 may include one or more of a central processing unit (CPU), an application processor (AP), an image signal processor (ISP), and a communication processor (CP). The processor 220 may carry out operations or data processing relating to the control and/or communication of at least one other element of the electronic device 201.

The processor 220 may determine an audio output device for at least one application, based on a user input. The processor 220 may select at least one application from among multiple applications executable in the electronic device 201, based on a user input, and may determine a sub-output device which is to output audio data of the at least one selected application. The processor 220 may determine a main-output device which is to output audio data of the applications remaining after excluding the application selected by the user input. The processor 220 may select at least one first application from among multiple applications executable in the electronic device 201, based on a first user input, and may determine a first sub-output device which is to output audio data of the at least one selected first application. The processor 220 may select at least one second application, based on a second user input, and may determine a second sub-output device which is to output audio data of the at least one selected second application.

The processor 220 may determine a main-output device which is to output audio data of the applications remaining after excluding the applications selected by the first and second user inputs. A main-output device and a sub-output device may be selected by a user from among the electronic device 201, an external electronic device connected to the electronic device 201, and an external electronic device which has a record of connection to the electronic device 201. For example, the electronic device 210 may be selected as a main-output device, and an external electronic device that has a record of connection to the electronic device 201 may be selected as a sub-output device. As another example, an external electronic device connected to the electronic device 201 may be selected as a main-output device, and an external electronic device that has a record of connection to the electronic device 201 may be selected as a sub-output device. For ease of description, the disclosure will be described on the assumption that at least one application corresponding to a sub-output device is selected based on a user input. However, according to various embodiments, the processor 220 may select an application corresponding to a main-output device, based on a user input.

When the execution of an application is detected, the processor 220 may control such that audio data generated by the executed application is output to an audio output device that is predetermined for the executed application. For example, upon detection of the execution of a game application, which has been set to output audio data to a main-output device, the processor 220 may control such that audio data generated by the game application is output to the main-output device. When the main-output device is the electronic device 201, the processor 220 may output audio data of the game application via a speaker, earphones, or a USB device of the electronic device 201. When the main-output device is an external electronic device, the processor 220 may determine whether the external electronic device is currently connected to the electronic device 201. When the external electronic device, which is the main-output device, is connected to the electronic device 201, the processor 220 may transmit audio data of the game application to the external electronic device, and may request output of the audio data. When the external electronic device, which is the main-output device, is not connected to the electronic device 201, the processor 220 may control such that audio data of the game application is output via a speaker, earphones, or a USB device of the electronic device 201. The processor 220 may perform control so as to display graphic effects indicating that the audio data of the game application is not allowed to be output via the predetermined main-output device. As another example, upon detection of the execution of a music application, which takes a sub-output device as an audio output device, the processor 220 may perform control such that audio data generated by the music application is output via the sub-output device.

When the sub-output device is the electronic device 201, the processor 220 may output audio data of the music application via a speaker, earphones, or a USB device of the electronic device 201. When the sub-output device is an external electronic device, the processor 220 may determine whether the external electronic device is currently connected to the electronic device 201. When the external electronic device, which is the sub-output device, is connected to the electronic device 201, the processor 220 may transmit audio data of the music application to the external electronic device, and may request output of the audio data. When the external electronic device, which is the sub-output device, is not connected to the electronic device 201, the processor 220 may perform control such that audio data of the music application is output via a speaker of the electronic device 201. The processor 220 may control so as to display graphic effects indicating that the audio data of the music application is not allowed to be output via the predetermined sub-output device.

While at least one external electronic device is connected to the electronic device 201, the processor 220 may perform control so as to display, on a screen, information indicating a main-output device and at least one sub-output device associated with audio data. For example, the processor 220 may perform control such that information indicating that the electronic device 201 operates as a main-output device and at least one external electronic device operates as a sub-output device is displayed on the screen. As another example, the processor 220 may control such that information indicating that the electronic device 201 operates as a sub-output device and an external electronic device operates as a main-output device is displayed on the screen. Information indicating a main-output device and at least one sub-output device associated with audio data may include at least one from among identification information of the main-output device, identification information of the sub-output device, a graphic effect indicating the main-output device, or a graphic effect indicating the sub-output device. Each of the identification information of the main-output device and the identification information of the sub-output device may include, for example, at least one of the name, the ID, the icon, and the device type of a corresponding device. Each of the graphic effect indicating the main-output device and the graphic effect indicating the sub-output device may include at least one from among displaying an equalizer icon, displaying an icon set by an operator or a user, changing the color of identification information, changing the size of identification information, and changing the font of identification information. Information indicating the main-output device and at least one sub-output device associated with audio data may be displayed in a predetermined area of a screen, an area previously designated by a user, a quick panel area, an upper bar area, a part of an area where an application screen is displayed, or a separate popup window area.

The processor 220 may control so as to display information indicating an application that is to output audio data via a corresponding device, with respect to at least one of a main-output device and a sub-output device. For example, when information indicating a sub-output device is displayed, the processor 220 may control such that identification information of at least one application that is set to output audio data to a sub-output device is displayed therewith. When information indicating a main-output device is displayed, the processor 220 may control such that identification information of at least one application that is set to output audio data to a main-output device is displayed therewith. The identification information of the application may include, for example, at least one selected from among the name, the ID, and the icon of an application.

The processor 220 may change at least one of a main-output device and a sub-output device, based on a user input. The processor 220 may change at least one of an audio output device which is to operate as a main-output device and an audio output device which is to operate as a sub-output device, based on a user input on an area where information indicating the main-output device and at least one sub-output device associated with audio data is displayed. For example, in the state in which a first external electronic device and a second external electronic device are connected to the electronic device 201, when the electronic device 201 operates as a main-output device and the first external electronic device operates as a sub-output device, the processor 220 may change the sub-output device from the first external electronic device to the second external electronic device, based on a user input. As another example, in the state in which a first external electronic device and a second external electronic device are connected to the electronic device 201, when the electronic device 201 operates as a main-output device and the first external electronic device operates as a sub-output device, the processor 220 may change the main-output device from the electronic device 201 to the first external electronic device and may change the sub-output device from the first external electronic device to the electronic device 201.

The processor 220 may add, change, or remove an application associated with at least one of a main-output device and a sub-output device, based on a user input provided via the electronic device 201. Upon detection of a user input on an area where information indicating a sub-output device is displayed, the processor 220 may control such that an application list including information associated with multiple applications is displayed. The application list may include information associated with a first application which is previously set to output audio data to a sub-output device. The processor 220 may detect that at least one application is selected by a user from the application list, and may add the selected application as an application associated with a sub-output device. The processor 220 may set at least one application selected by the user from the application list as an application associated with a sub-output device, instead of the predetermined first application. The processor 220 may detect that the predetermined first application is selected from the application list, and, in response thereto, may perform control such that audio data of the first application is output to a main-output device, instead of outputting to the sub-output device.

The processor 220 may control the volume of each of a main-output device and a sub-output device. When a key input for volume control is detected, the processor 220 may provide a user interface capable of separately controlling the audio volume of the main-output device and the audio volume of the sub-output device. The audio volume of the main-output device may include at least one of a ringtone volume, a media volume, a notification volume, and a system volume. When a key input for volume control is detected in the state in which an application execution screen is displayed, the processor 220 may control the volume of a corresponding audio output device. For example, when a key input for volume control is detected in the state in which the execution screen of a music application that takes a sub-output device as an audio output device is displayed, the processor 220 may display audio volume information of the sub-output device, and may control the audio volume information of the sub-output device, based on a volume key input or a user touch input. As another example, when a key input for volume control is detected in the state in which the execution screen of a game application that takes a main-output device as an audio output device is displayed, the processor 220 may display audio volume information of the main-output device, and may display and control the audio volume information of the main-output device, based on a volume key input or a user touch input. When a user input for setting the details of volume information is detected in the state in which the audio volume information of the sub-output device or the audio volume information of the main-output device is displayed based on an application displayed on a screen, the processor 220 may provide a user interface for separately controlling the audio volume of the main-output device and the audio volume of the sub-output device.

While an application, an audio output device of which is set as a sub-output device, is executed, the processor 220 may perform control so as to display information indicating that audio data is being output via the sub-output device. The processor 220 may detect a user input that requests deactivation of a function that outputs audio data via a sub-output device, and, in response thereto, may control such that the audio data generated by a corresponding application is output via a main-output device.

The processor 220 may determine an audio output device, based on a screen area of the electronic device 201. The processor 220 may divide the screen area of the electronic device 201 into at least two areas, and may determine an audio output device for each screen area. The screen area may be logically divided by a designer and/or a user, or may be physically divided in advance. For example, the processor 220 may determine the electronic device 201 as an audio output device for an application executed in the upper screen area of the electronic device 201, and may determine an external electronic device as an audio output device for an application executed in the lower screen area. As another example, the processor 220 may determine an external electronic device as an audio output device for an application executed in a screen area on a first side of the electronic device 201, and may determine the electronic device 201 as an audio output device for an application executed in a screen area on a second side of the electronic device 201.

The processor 220 may determine an audio output device based on the execution condition of an application. For example, the processor 220 may determine the electronic device 201 as an audio output device for an application executed in a multi-window, and may determine an external electronic device as an audio output device for other applications. The processor 220 may determine an external electronic device as an audio output device for an application executed in a multi-window, and may determine the electronic device 201 as an audio output device for other applications. The processor 220 may determine the electronic device 201 as an audio output device for an application which is executed in a multi-window and is displayed on the uppermost area of a screen, and may determine an external electronic device as an audio output device for other applications.

The memory 230 may include a volatile and/or non-volatile memory. The memory 230 may store, for example, instructions or data relevant to at least one other element of the electronic device 201. The memory 230 may store software and/or a program 240. The program 240 may include a kernel 241, middleware 243, an application programming interface (API) 245, and/or application programs (applications) 247. At least some of the kernel 241, the middleware 243, and the API 245 may be referred to as an operating system (OS). The memory 230 may store biometric information for user authentication. The memory 230 may store audio output device information for each application. For example, the memory 230 may store information indicating that the audio output device of a first application is a Bluetooth headset, the audio output device of a second application is a Bluetooth speaker, and the audio output device of remaining applications is the electronic device 201. As another example, the memory 230 may store information indicating that the audio output device of a first application is a first sub-output device, the audio output device of a second application is a second sub-output device, and the audio output device of remaining applications is a main output device, wherein the first sub-output device is a Bluetooth headset, the second sub-output device is a Bluetooth speaker, and the main-output device is the electronic device 201.

The kernel 241 may control or manage system resources (e.g., the bus 210, the processor 220, the memory 230, or the like) used for executing an operation or function implemented by other programs (e.g., the middleware 243, the API 245, or the application 247). The kernel 241 may provide an interface via which the middleware 243, the API 245, or the application programs 247 may access the individual elements of the electronic device 201 so as to control or manage the system resources.

The middleware 243 may function as, for example, an intermediary for allowing the API 245 or the application programs 247 to communicate with the kernel 241 to exchange data. The middleware 243 may process one or more task requests received from the application programs 247 according to the priorities thereof. For example, the middleware 243 may assign priorities to use the system resources (e.g., the bus 210, the processor 220, the memory 230, or the like) of the electronic device 201 to one or more of the application programs 247, and may process the one or more task requests. The API 245 is an interface used by the application program 247 to control a function provided from the kernel 241 or the middleware 243, and may include, for example, at least one interface or function (e.g., an instruction) for file control, window control, image processing, character control, or the like.

The input/output interface 250 may function as, for example, an interface that can forward instructions or data, which are input from a user or an external device, to the other element(s) of the electronic device 201. The input/output interface 250 may output instructions or data received from the other element(s) of the electronic device 201 to a user or the other external device. The input/output interface 250 may include, for example, a key pad, a dome switch, a physical button, a touch panel, and a jog & shuttle. The input/output interface 250 may be at least one sensor device that may receive sensor data associated with, for example, biometric information, a movement, a temperature, a sound, an image, and the like.

The display 260 may include, for example, a liquid crystal display (LCD), a light-emitting diode (LED) display, an organic LED (OLED) display, a micro electro mechanical system (MEMS) display, or an electronic paper display. The display 260 may display various types of content (e.g., text, images, videos, icons, and/or symbols) for a user. The display 260 may include a touch screen and may receive a touch, gesture, proximity, or hovering input using an electronic pen or the user's body part.

The communication interface 270 may set communication between the electronic device 201 and an external device (e.g., an accessory device 202, a first device 204, or a second device 206). For example, the communication interface 270 may be connected to a network 262 via wireless or wired communication so as to communicate with an external device (e.g., the electronic device 204 or the second device 206).

The wireless communication may include, for example, cellular communication that uses at least one of LTE, LTE-Advanced (LTE-A), code division multiple access (CDMA), wideband CDMA (WCDMA), universal mobile telecommunications system (UMTS), wireless broadband (WiBro), global system for mobile communications (GSM), 5G network, or the like. The wireless communication may include, for example, at least one (e.g., short-range communication 264) of Wi-Fi, Li-Fi, Bluetooth, Bluetooth Low Energy (BLE), ZigBee, near-field communication (NFC), magnetic secure transmission, radio frequency (RF), and body area network (BAN). According to an embodiment, the wireless communication may include a GNSS. The GNSS may be, for example, a global positioning system (GPS), a Global Navigation Satellite System (GLONASS), a BeiDou navigation satellite system (hereinafter, referred to as "BeiDou"), or Galileo (the European global satellite-based navigation system). Hereinafter, the term "GPS" may be interchangeable with the term "GNSS". The wired communication may include, for example, at least one of a Universal Serial Bus (USB), a HDMI, recommended standard-232 (RS-232), power-line communication, optical communication, and a plain old telephone service (POTS). The network 272 may include a telecommunications network, for example, at least one of a computer network (e.g., a LAN or a WAN), the Internet, and a telephone network.

Figure 3:
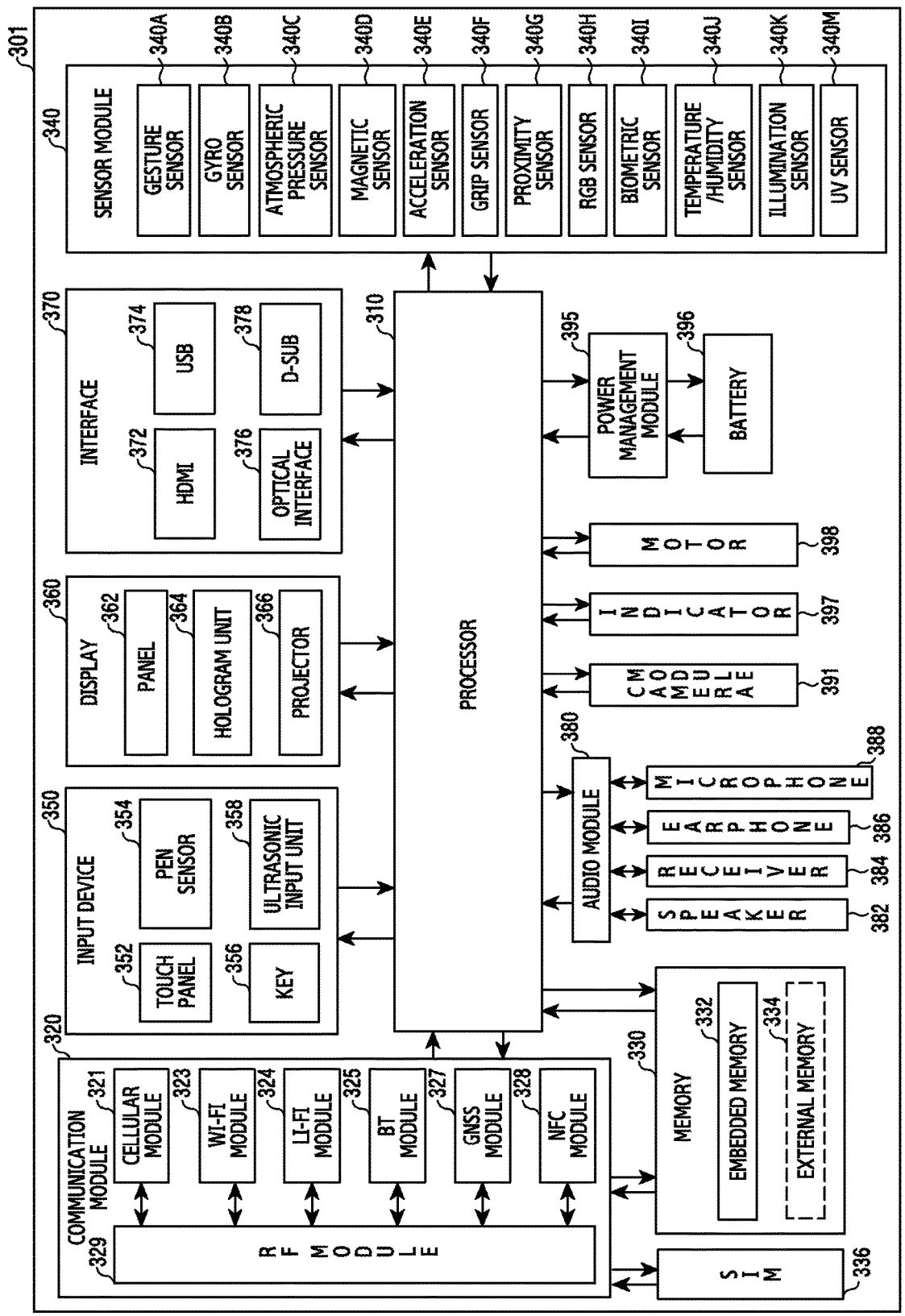
FIG. 3 is a block diagram illustrating an electronic device according to an embodiment of the disclosure.

FIG. 3 is a block diagram of an electronic device according to various embodiments of the disclosure. An electronic device 301 of FIG. 3 may include, for example, a part or the entirety of the electronic device 201 illustrated in FIG. 2.

Referring to FIG. 3, the electronic device 301 may include at least one processor (e.g., AP) 310, a communication module 320, a subscriber identification module 336, a memory 330, a sensor module 340, an input device 350, a display 360, an interface 370, an audio module 380, a camera module 391, a power management module 395, a battery 396, an indicator 397, and a motor 398.

The processor 310 may control a plurality of hardware or software elements connected thereto and may perform various data processing and operations by driving an operating system or an application program. The processor 310 may be implemented by a system on chip (SoC). The processor 310 may further include a graphic processing unit (GPU) and/or an image signal processor (ISP). The processor 310 may also include at least some of the elements illustrated in FIG. 3 (e.g., a cellular module 321). The processor 310 may load, in a volatile memory, instructions or data received from at least one of the other elements (e.g., a non-volatile memory), process the loaded instructions or data, and store the resultant data in the non-volatile memory.

The processor 310 may determine an audio output device for at least one application, based on a user input. When the execution of an application is detected, the processor 310 may perform control such that audio data generated by the executed application is output to an audio output device which is predetermined for the executed application.

The communication module 320 may have a configuration equal or similar to that of the communication interface 270 of FIG. 2. The communication module 320 may include a cellular module 321, a Wi-Fi module 323, a Li-Fi module 324, a Bluetooth module 325, a GNSS module 327, an NFC module 328, and an RF module 329.

The cellular module 321 may provide a voice call, a video call, a text message service, an Internet service, or the like via a communication network. The cellular module 321 may identify and authenticate the electronic device 301 within a communication network using the subscriber identification module 336 (e.g., a SIM card). The cellular module 321 may perform at least some of the functions that the processor 310 may provide. The cellular module 321 may include a communication processor (CP).

According to various embodiments of the disclosure, at least some (e.g., two or more) of the cellular module 321, the Wi-Fi module 323, the Li-Fi module 324, the BT module 325, the GNSS module 326, and the NFC module 327 may be included in one integrated chip (IC) or IC package.

The RF module 329 may transmit/receive a communication signal (e.g., an RF signal). The RF module 329 may include a transceiver, a power amp module (PAM), a frequency filter, a low-noise amplifier (LNA), an antenna, or the like. According to another embodiment, at least one of the cellular module 321, the Wi-Fi module 323, the Li-Fi module 324, the Bluetooth module 325, the GNSS module 326, and the NFC module 327 may transmit and receive RF signals via a separate RF module. The subscriber identification module 336 may include, for example, a card that includes a subscriber identification module, or an embedded SIM, and may contain unique identification information (e.g., an integrated circuit card identifier (ICCID)) or subscriber information (e.g., international mobile subscriber identity (IMSI)).

The memory 330 (e.g., the memory 130 of FIG. 1) may include an embedded memory 332 or an external memory 334. The embedded memory 332 may include, for example, at least one of a volatile memory (e.g., a DRAM, an SRAM, an SDRAM, or the like) and a non-volatile memory (e.g., a one-time programmable ROM (OTPROM), a PROM, an EPROM, an EEPROM, a mask ROM, a flash ROM, a flash memory, a hard disc drive, or a solid-state drive (SSD)). The external memory 334 may include a flash drive, for example, a compact flash (CF), a secure digital (SD), a Micro-SD, a Mini-SD, an eXtreme digital (xD), a multi-media card (MMC), a memory stick, and the like. The external memory 334 may be functionally and/or physically connected to the electronic device 301 via any of various interfaces.

The sensor module 340 may, for example, measure a physical quantity or detect the operating state of the electronic device 301 and may convert the measured or detected information into an electrical signal. The sensor module 340 may include, for example, at least one of a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (e.g., a red, green, and blue (RGB) sensor), a biometric sensor 340I, a temperature/humidity sensor 340J, an illumination sensor 340K, and an ultraviolet (UV) sensor 340M. The sensor module 340 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may further include a control circuit for controlling one or more sensors included therein. The electronic device 301 may further include a processor configured to control the sensor module 340 as a part of or separately from the processor 310, and may control the sensor module 340 while the processor 310 is in a sleep state. For example, the temperature/humidity sensor 340J may include a plurality of temperature sensors disposed in different locations.

The input device 350 may include a touch panel 352, a (digital) pen sensor 354, a key 356, or an ultrasonic input device 358. The touch panel 352 may use, for example, at least one of a capacitive type, a resistive type, an infrared type, and an ultrasonic type. Furthermore, the touch panel 352 may further include a control circuit. The touch panel 352 may further include a tactile layer so as to provide a tactile reaction to a user. The (digital) pen sensor 354 may include, for example, a recognition sheet that is a part of, or separate from, the touch panel. The key 356 may include a physical button, an optical key, or a keypad. The ultrasonic input device 358 may detect ultrasonic waves, which are generated by an input tool, via a microphone (e.g., a microphone 388) to identify data corresponding to the detected ultrasonic waves.

The display 360 (e.g., the display 260 of FIG. 2) may include a panel 362, a hologram device 364, a projector 366, and/or a control circuit for controlling them. The panel 362 may be implemented to be, for example, flexible, transparent, or wearable. The panel 362, together with the touch panel 352, may be configured as one or more modules. The hologram device 364 may show a three-dimensional image in the air using light interference. The projector 366 may display an image by projecting light onto a screen. The screen may be located, for example, in the interior of, or on the exterior of, the electronic device 301. The interface 370 may include an HDMI 372, a USB 374, an optical interface 376, or a D-subminiature (D-sub) interface 378. The interface 370 may be included in the communication interface 270 illustrated in FIG. 2. The interface 370 may include a Mobile High-definition Link (MHL) interface, a SD card/MMC interface, or an Infrared Data Association (IrDA) standard interface.

The audio module 380 may convert sound into an electrical signal, and vice versa. At least some elements of the audio module 380 may be included in the input/output interface 250 illustrated in FIG. 2. The audio module 380 may process sound information that is input or output via, for example, a speaker 382, a receiver 384, earphones 386, the microphone 388, and the like. The audio module 380 may receive audio output device information associated with each application from the processor 310, and may provide audio data of an application to a corresponding audio output device, based on the provided information.

The camera module 391 captures still images and moving images. The camera module 291 may include one or more image sensors (e.g., a front sensor or a rear sensor), a lens, an image signal processor (ISP), or a flash (e.g., an LED or xenon lamp).

The power management module 395 may manage the power of the electronic device 301. The power management module 395 may include a power management integrated circuit (PMIC), a charger IC, or a battery or fuel gauge. The PMIC may use a wired and/or wireless charging method. Examples of the wireless charging method may include a magnetic-resonance method, a magnetic-induction method, an electromagnetic-wave method, and the like. Additional circuits (e.g., a coil loop, a resonance circuit, a rectifier, and the like) for wireless charging may be further included. The battery gauge may measure, for example, the amount of charge remaining in the battery 396 and a voltage, current, or temperature while charging. The battery 396 may include, for example, a rechargeable battery and/or a solar battery.

The indicator 397 may display a particular state, for example, a booting state, a message state, a charging state, or the like of the electronic device 301 or a part (e.g., the processor 310) of the electronic device 301. The motor 398 may convert an electrical signal into a mechanical vibration and may generate a vibration, a haptic effect, or the like. The electronic device 301 may include a mobile TV support device (e.g., GPU) that may process media data according to a standard such as digital multimedia broadcasting (DMB), digital video broadcasting (DVB), mediaFlo™, and the like.

Each of the above-described elements may be configured with one or more components, and the names of the corresponding elements may vary based on the type of electronic device. In various embodiments, an electronic device (e.g., the electronic device 301) may omit some elements, or may further include additional elements, or some of the elements of the electronic device may be combined with each other to configure one entity, in which case the electronic device may equally perform the functions of the corresponding elements prior to the combination.

Figure 4:
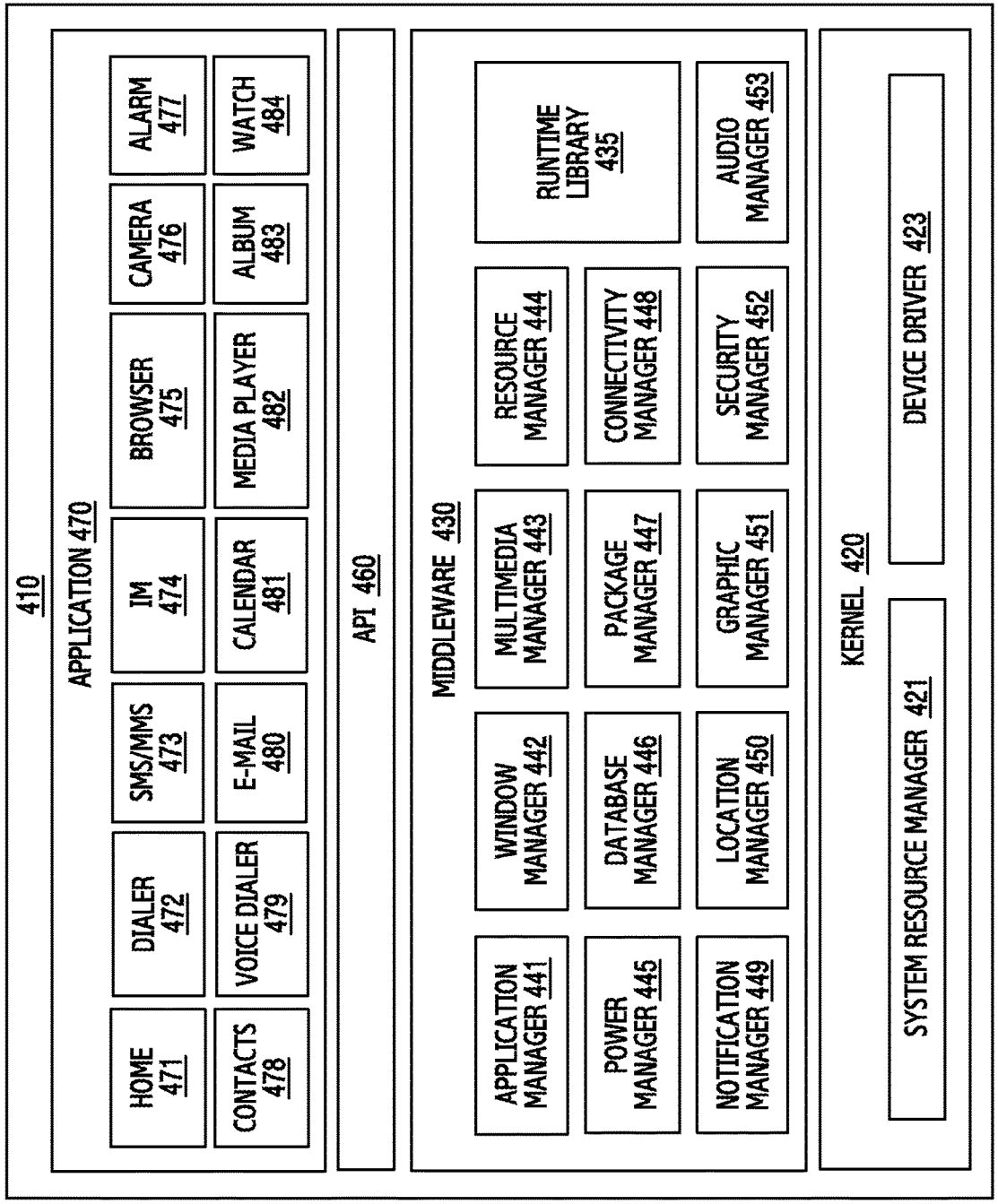
FIG. 4 is a block diagram illustrating a program module according to an embodiment of the disclosure.
Figure 5:
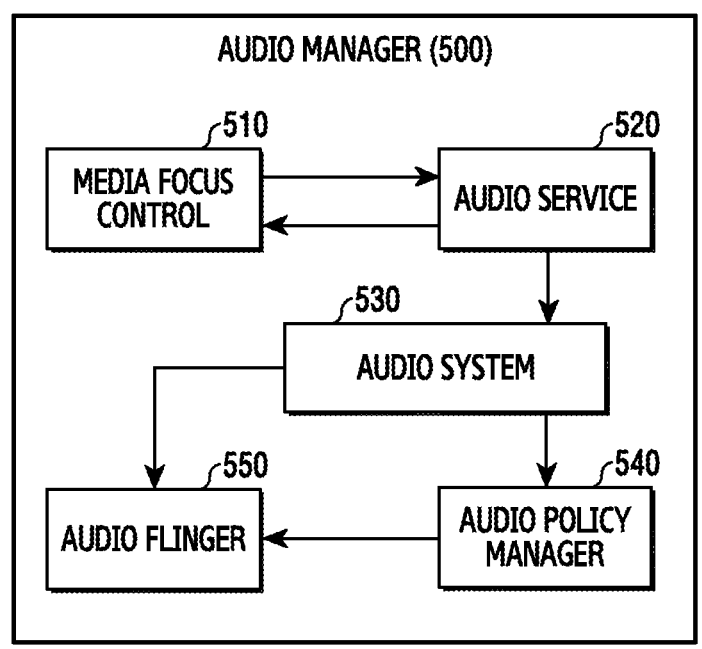
FIG. 5 is a block diagram illustrating an audio manager according to an embodiment of the disclosure.

FIG. 4 is a block diagram of a program module according to an embodiment of the disclosure. FIG. 5 is a block diagram of an audio manager according to an embodiment of the disclosure.

Referring to FIG. 4, the program module 410 (e.g., the program 240) may include an operating system (OS) that controls resources relating to an electronic device (e.g., the electronic device 201) and/or various applications (e.g., the application programs 247) that are driven on the operating system. The operating system may include, for example, Android™, iOS™, Windows™, Symbian™ Tizen™, or Bada™.

Referring to FIG. 4, the program module 410 may include a kernel 420 (e.g., the kernel 241), middleware 430 (e.g., the middleware 243), an API 460 (e.g., the API 245), and/or applications 470 (e.g., the application programs 247). At least a part of the program module 410 may be preloaded on the electronic device, or may be downloaded from an external electronic device (e.g., the electronic device 202 or 204 or the server 206).

The kernel 420 may include a system resource manager 421 and/or a device driver 423. The system resource manager 421 may control, allocate, or retrieve system resources. The system resource manager 421 may include a process manager, a memory manager, or a file-system manager. The device driver 423 may include, for example, a display driver, a camera driver, a Bluetooth driver, a shared-memory driver, a USB driver, a keypad driver, a Wi-Fi driver, an audio driver, a touch device driver, a pressure-device driver, or an inter-process communication (IPC) driver.

The middleware 430 may provide a function required by the applications 470 in common, or may provide various functions to the applications 470 via the API 460 such that the applications 470 can efficiently use the limited system resources within the electronic device. The middleware 430 may include at least one of a runtime library 435, an application manager 441, a window manager 442, a multimedia manager 443, a resource manager 444, a power manager 445, a database manager 446, a package manager 447, a connectivity manager 448, a notification manager 449, a location manager 450, a graphic manager 451, a security manager 452, and an audio manager 453.

The runtime library 435 may include a library module that a compiler uses in order to add a new function using a programming language while the applications 470 are running. The runtime library 435 may manage input/output, manage memory, or process arithmetic functions. The application manager 441 may manage the life cycles of the applications 470. The application manager 441 may transmit a biometric information request signal to the security manager 452, based on a content request of the application 470. The application manager 441 may provide, to the application 470, content information provided from the database manager 446. The window manager 442 may manage GUI resources used for a screen. The multimedia manager 443 may identify formats required for reproducing various media files, and may encode or decode a media file using a codec suitable for the corresponding format. The resource manager 444 may manage the source code of the applications 470 or the space in memory. The power manager 445 may manage the capacity or power of a battery, and may provide power information required for operating the electronic device. The power manager 445 may interoperate with a basic input/output system (BIOS). The database manager 446 may generate, search, or change databases to be used by the applications 470. The database manager 446 may search a database and detect content that matches biometric information provided from the security manager 452. The package manager 447 may manage the installation or update of an application that is distributed in the form of a package file. The connectivity manager 448 may manage wireless connections. The notification manager 449 may provide an event (e.g., an arrival message, an appointment, a proximity notification, or the like) to a user. The location manager 450 may manage the location information of the electronic device. The graphic manager 451 may manage a graphic effect to be provided to a user and a user interface relating to the graphic effect. The security manager 452 may provide system security or user authentication. The security manager 452 may collect biometric information via the biometric sensor 180 in response to a biometric information request signal provided from the application manager 441.

Referring to FIG. 5, the audio manager 453 and 500 may include a media focus controller 510, an audio service unit 520, an audio system 530, an audio policy manager 540, and an audio flinger 550. The media focus controller 510 may configure a focus stack for each audio output device, and may manage and control a new policy for an audio focus. For example, the media focus controller 510 may manage and control rights associated with outputting audio data of applications for each audio output device. The media focus controller 510 may manage and control a policy associated with outputting audio data of different applications via different audio output devices in parallel. The audio service unit 520 may control the volume for each audio output device. For example, the audio service unit 520 may control the volume of an audio output device selected by a user input. The audio policy manager 540 may configure a map indicating an application that is to output audio data to a main-output device for audio data and an application that is to output audio data to a sub-output device for audio data, and may control the output of audio data according to the configured map. The audio flinger 540 may control the volume for each application. The audio flinger 540 may control the volume for an application, based on application identification information.

The middleware 430 may include a telephony manager for managing a voice or video call function of an electronic device or a middleware module capable of combining the functions of the above-described elements. The middleware 430 may provide a module specialized for each type of operating system. The middleware 430 may dynamically remove some existing elements, or may add new elements. The API 460 is, for example, a set of API programming functions, and may be provided in different configurations depending on the operating system. For example, in the case of Android or iOS, one API set may be provided for each platform, and in the case of Tizen, two or more API sets may be provided for each platform.

The applications 470 may include one or more applications that can perform functions such as home 471, a dialer 472, SMS/MMS 473, instant messaging (IM) 474, a browser 475, a camera 476, an alarm 477, contacts 478, voice dialing 479, e-mail 480, a calendar 481, a media player 482, an album 483, a watch 484, health-care applications (e.g., for measuring exercise quantity or blood glucose), environment information (e.g., atmospheric pressure, humidity, or temperature information) provision applications, and the like.

The applications 470 may include an information exchange application that can support the exchange of information between the electronic device and an external electronic device. The information exchange application may include a notification relay application for relaying particular information to an external electronic device or a device management application for managing an external electronic device. For example, the notification relay application may relay notification information generated in the other applications of the electronic device to an external electronic device, or may receive notification information from an external electronic device and provide the received notification information to a user. The device management application may install, delete, or update functions of an external electronic device that communicates with the electronic device (e.g., turning on/off the external electronic device itself (or some elements thereof) or adjusting the brightness (or resolution) of a display) or applications executed in the external electronic device.

The applications 470 may include applications (e.g., a health care application of a mobile medical appliance) that are designated according to the attributes of an external electronic device. According to an embodiment, the applications 470 may include applications received from an external electronic device. The applications 470 may include an application for providing a user authentication service. An application for providing a user authentication service may include applications that need to perform user authentication to execute a function requested by a user, for example, an application for providing a lock function, an application for providing a payment function, and the like. At least some of the program module 410 may be implemented (e.g., executed) by software, firmware, hardware (e.g., the processor 210), or a combination of two or more thereof and may include a module, a program, a routine, an instruction set, or a process for performing one or more functions.

Figure 6:
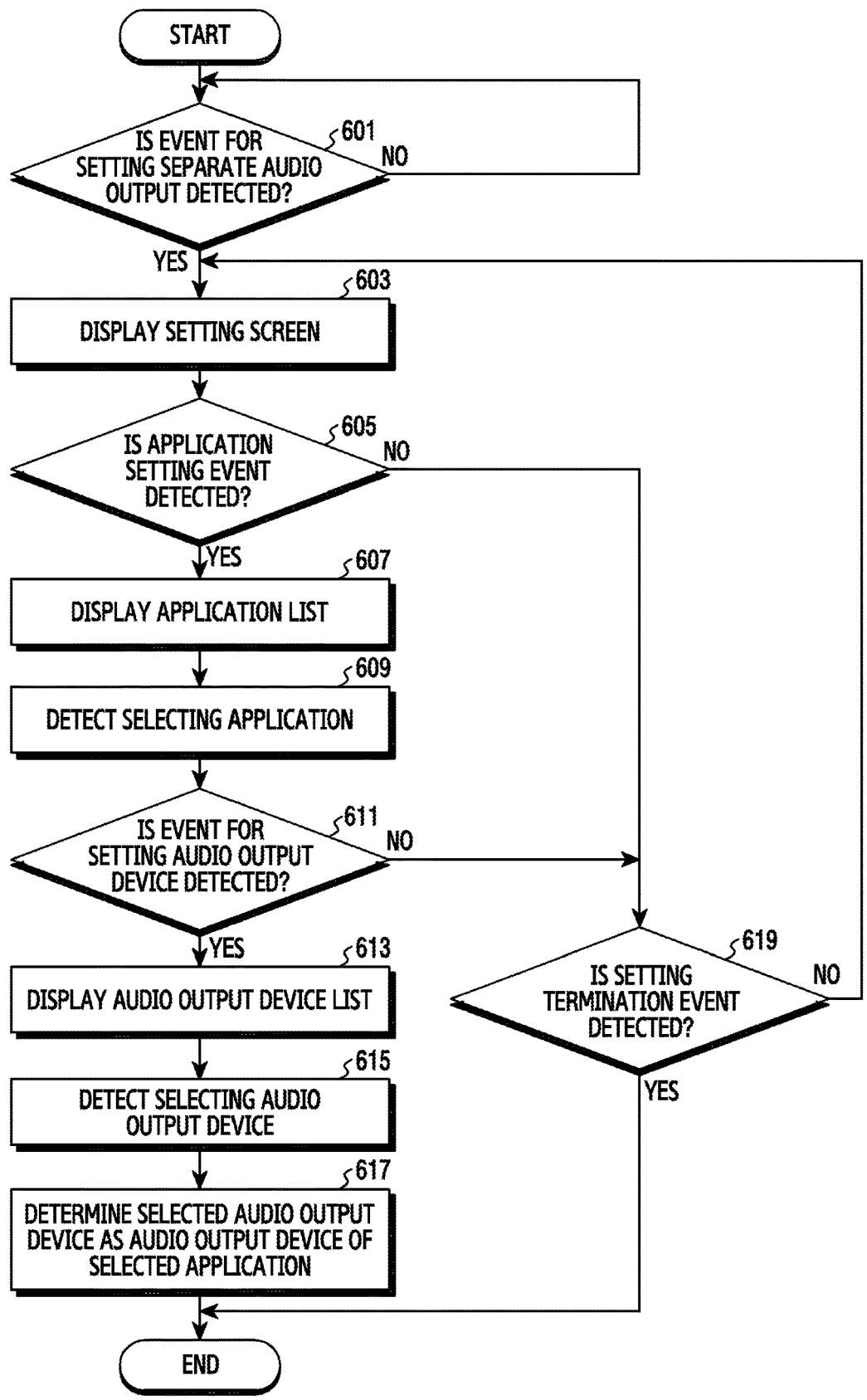
FIG. 6 is a flowchart illustrating a process of setting audio data which is to be separately output by an electronic device according to an embodiment of the disclosure.

FIG. 6 is a flowchart illustrating a process of setting audio data which is to be separately output by an electronic device according to an embodiment of the disclosure. FIGS. 7A to 7E illustrate configurations of a screen for setting audio data to be separately output by an electronic device according to various embodiments of the disclosure.

Referring to FIG. 6, operations may be performed sequentially, but the operations are not required to be performed sequentially. The order of the operations may be changed, and at least two operations may be performed in parallel. The electronic device may be the first electronic device 100 of FIG. 1 or the electronic device 201 of FIG. 2. Hereinafter, at least one operation in FIG. 6 will be described with reference to FIGS. 7A to 7E.

Referring to FIG. 6, an electronic device may determine whether an event for setting separate audio output is detected in operation 601. For example, the electronic device may detect the occurrence of a set event that is associated with a function for separately outputting audio data of at least one application and audio data of other applications.

Figure 7A:
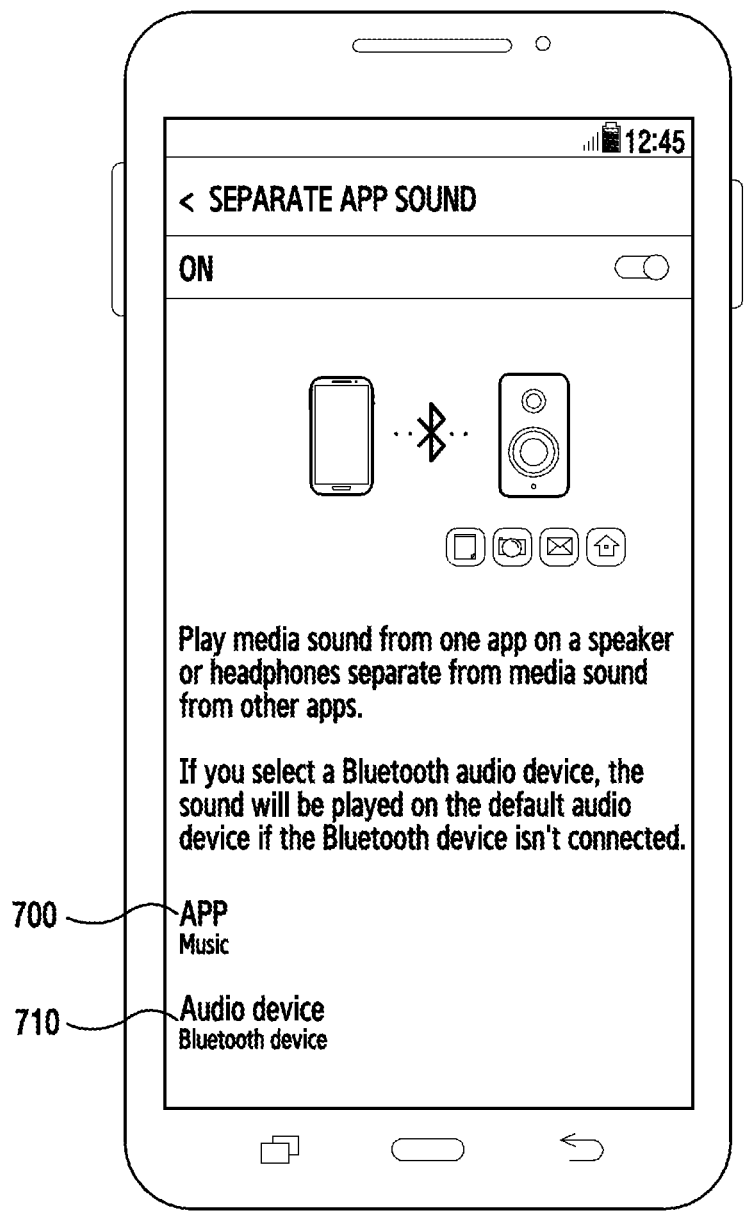
FIGS. 7A, 7B, 7C, 7D, and 7E are diagrams illustrating configurations of a screen for setting audio data to be separately output by an electronic device according to various embodiments of the disclosure.

When the set event for separate audio output is detected, the electronic device may display a screen for setting the separate audio output in operation 603. The screen for setting the separate audio output may include an item 700 for controlling whether to activate a separate audio output function, an application setting item 700, and an audio output device setting item 710, as illustrated in FIG. 7A.

The electronic device may determine whether an event for setting an application associated with separate output is detected in operation 605. The electronic device may determine whether an event for setting an application associated with separate output is detected, based on whether a user input on an application setting item is detected from the screen for setting separate audio output. For example, when a user touch on the application setting item is detected, the electronic device may determine that the event for setting an application associated with separate output is detected.

Figure 7B:
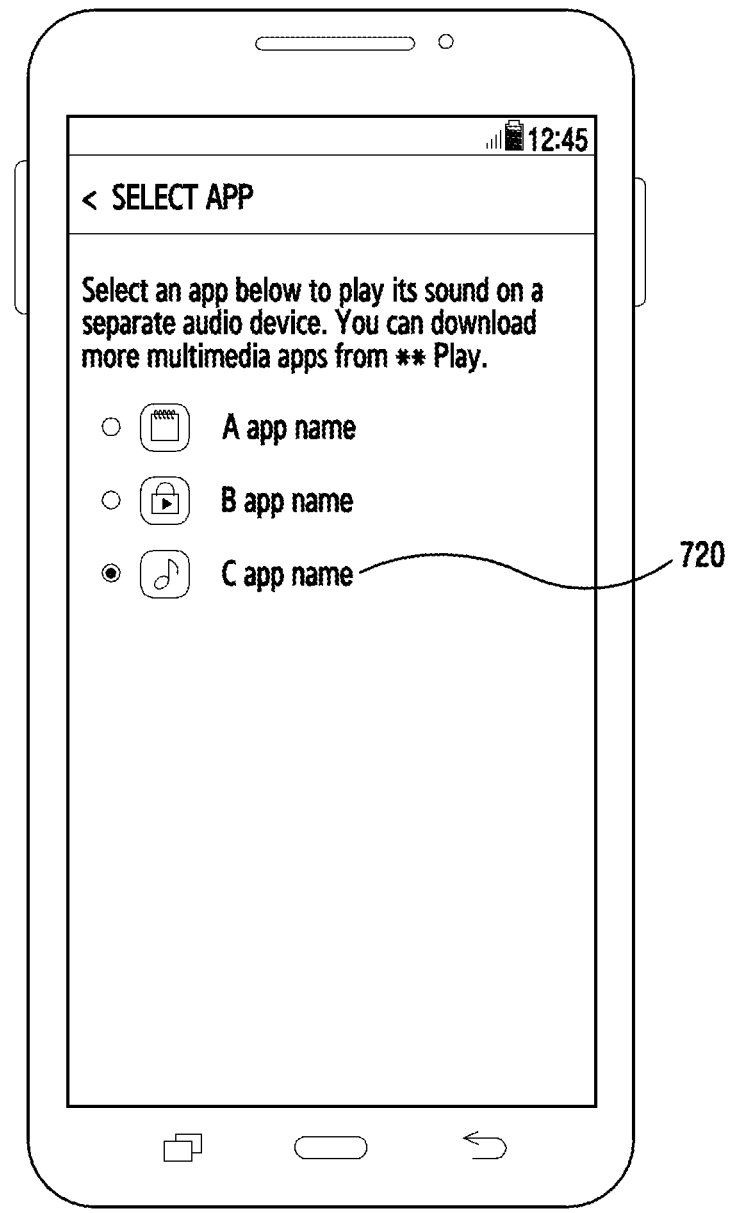

When the event for setting an application associated with separate output is detected, the electronic device may display an application list in operation 607. The application list may include all applications that are executable in the electronic device. The application list may include applications that generate audio data from among all of the applications that are executable in the electronic device. The application list may include applications previously designated by a user from among all of the applications that are executable in the electronic device. The application list may include applications selected based on user's preference from among all of the applications that are executable in the electronic device. For example, as illustrated in FIG. 7B, the electronic device may display an application list including identification information (an application name, an application ID, and an application icon) of multiple applications.

The electronic device may detect that at least one application is selected, based on a user input in operation 609. For example, as illustrated in FIG. 7B, the electronic device may detect that application "C app name" 720 is selected based on a user input from an application list including three applications. Although FIG. 7B illustrates the case in which one application is selected, multiple applications may be selected based on a user input according to various embodiments.

The electronic device may determine whether an event for setting an audio output device for separate output is detected in operation 611. The electronic device may determine whether an audio output device setting event is detected, based on whether a user input on an audio output device setting item is detected from a screen for setting separate audio output. For example, when a user touch on an item for setting an audio output device for separate output is detected, the electronic device may determine that an event for setting an audio output device for separate output has been detected.

Figure 7C:
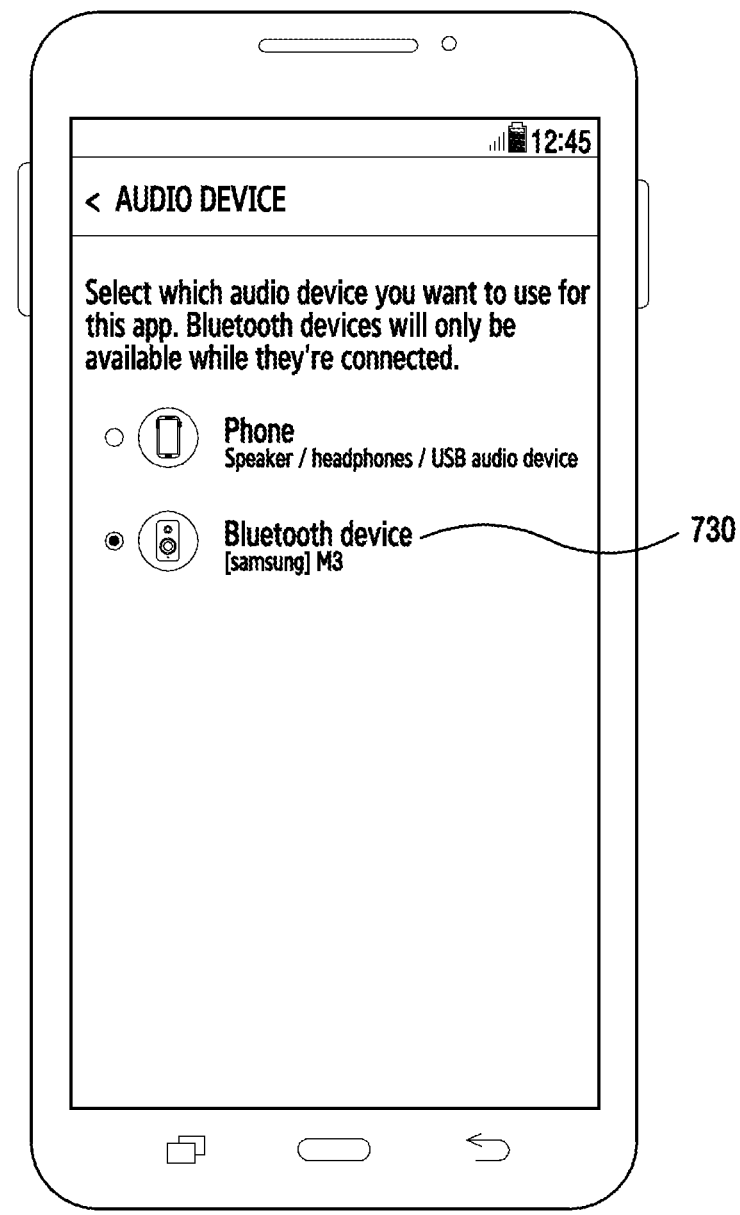
Figure 7D:
Figure 7E:

The electronic device may display an audio output device list in operation 613. The audio output device list may include at least one of an electronic device, an external electronic device that is currently connected to the electronic device, and an external electronic device that has a record of connection to the electronic device in the past. For example, as illustrated in FIGS. 7C to 7E, an audio output device list including the electronic device (e.g., a phone) and at least one Bluetooth device corresponding to an external electronic device may be displayed. The audio output device list may include a user interface for selecting an audio output device for a selected application. The audio output device list may include identification information of a Bluetooth device that is currently connected to the electronic device and/or identification information of a Bluetooth device that has a record of connection to the electronic device, as illustrated in FIG. 7C. The audio output device list may include a user interface for selecting an audio output device for a selected application and a user interface for selecting an audio output device for other applications remaining after excluding the selected application, as illustrated in FIG. 7D and FIG. 7E. The audio output device list may provide a user interface for selecting audio output devices for a selected application and other applications from among the electronic device and a first Bluetooth device currently connected to the electronic device, as illustrated in FIG. 7E. Also, when a Bluetooth device that is connected to the electronic device is changed from the first Bluetooth device to a second Bluetooth device, the electronic device may automatically provide a user interface for performing setting to use the second Bluetooth device, instead of the first Bluetooth device.

The electronic device may detect that an audio output device is selected based on a user input in operation 615. For example, as illustrated in FIG. 7C, the electronic device may detect that a Bluetooth device 730 is selected, based on a user input. In the example illustrated in FIG. 7D, the electronic device may detect that a first Bluetooth device is selected for application "C app name" and that the electronic device is selected for other applications based on a user input. In the example illustrated in FIG. 7E, based on user input, the electronic device may detect that a first Bluetooth device is selected for the application "C app name", the electronic device is selected for other applications, and an audio output device of the application "C app name" is set to be changed from the first Bluetooth device to a second Bluetooth device when the Bluetooth device connected to the electronic device is the second Bluetooth device.

The electronic device may determine the selected audio output device as an audio output device for the selected application in operation 617. For example, the electronic device may determine a Bluetooth device as the audio output device for audio data of the selected application "C app name".

According to various embodiments, when an application setting event is not detected in operation 605, or when an audio output device setting event is not detected in operation 611, the electronic device may determine whether a setting termination event is detected in operation 619. For example, the electronic device may determine whether a cancellation event occurs or whether a touch input for returning to a previous screen has been made.

When a setting termination event is not detected, the electronic device may return to operation 603 and maintain display of a settings screen. When the setting termination event is detected, the electronic device may terminate an operation procedure according to various embodiments of the disclosure.

In the above description, the electronic device may provide a user interface for selecting at least one application associated with separate output, and when the at least one application is selected within the displayed screen, may provide a user interface for selecting an audio output device for the selected application. However, the disclosure is not limited thereto. According to various embodiments, the electronic device provides a user interface for selecting an audio output device for each of multiple applications, and may provide a user interface for setting an audio output device for each of the multiple applications.

Figure 8:
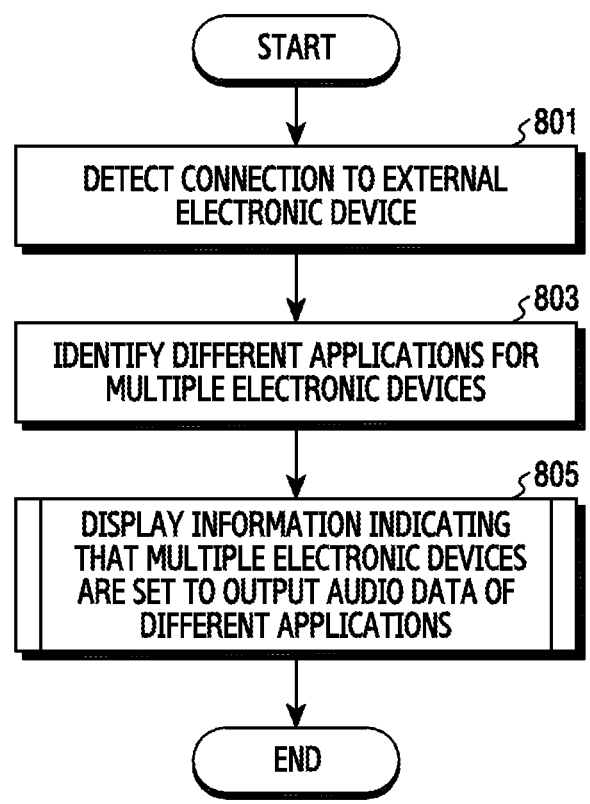
FIG. 8 is a flowchart illustrating a process of displaying information associated with separate output of audio data by an electronic device according to an embodiment of the disclosure.
Figure 9:
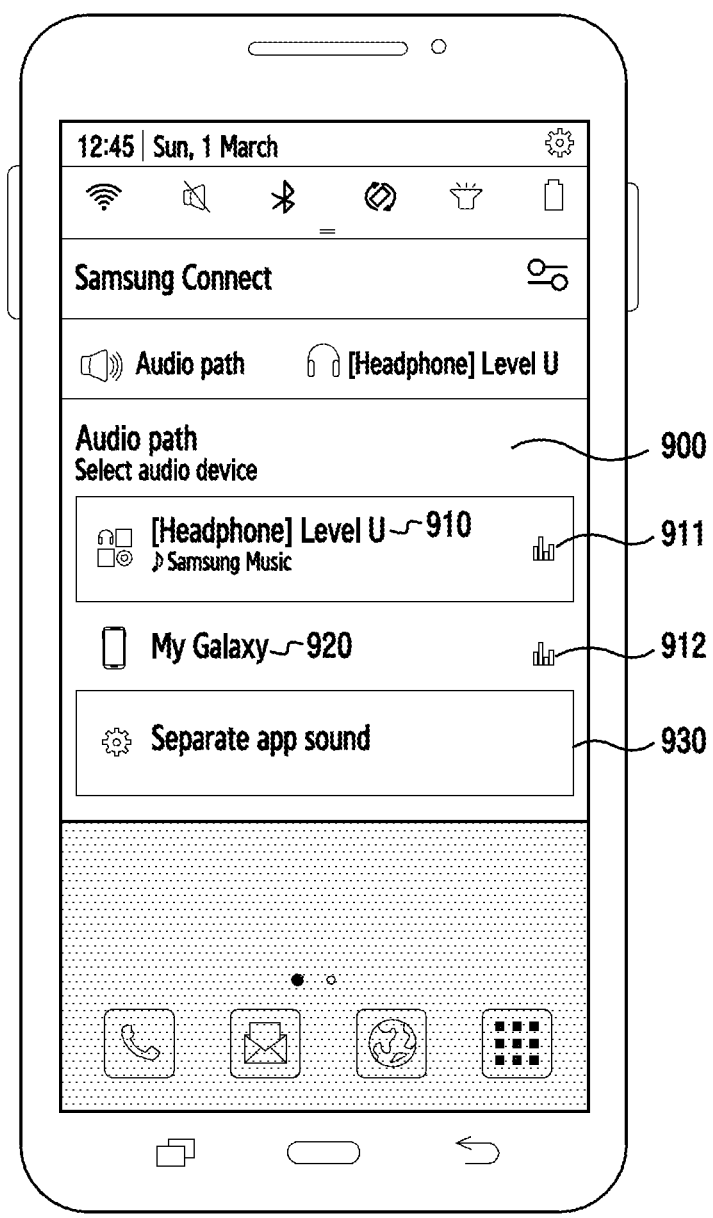
FIG. 9 is a diagram illustrating a configuration of a screen for displaying information associated with separate output of audio data by an electronic device according to an embodiment of the disclosure.

FIG. 8 is a flowchart illustrating a process of displaying information associated with separate output of audio data by an electronic device according to an embodiment of the disclosure. FIG. 9 is a diagram illustrating a configuration of a screen for displaying information associated with separate output of audio data by an electronic device according to various embodiments of the disclosure.

Referring to FIG. 8, operations may be performed sequentially, but the operations are not required to be performed sequentially. For example, the order of the operations may be changed, and at least two operations may be performed in parallel. Here, the electronic device may be the first electronic device 100 of FIG. 1 or the electronic device 201 of FIG. 2. Hereinafter, at least one operation of FIG. 8 will be described with reference to FIG. 9.

Referring to FIG. 8, an electronic device detect connection to at least one external electronic device in operation 801. For example, the electronic device may detect that the electronic device is connected to at least one external electronic device via a wired or wireless interface.

The electronic device may identify different applications respectively set for multiple electronic devices in operation 803. The electronic device may identify information associated with an application that is set to use the electronic device as an audio output device and information associated with an application that is set to use another electronic device connected to the electronic device as an audio output device. For example, the electronic device may identify that a Bluetooth headphone connected to the electronic device is set to output audio data of a music application, and that the electronic device is set to output audio data of the applications remaining after excluding the music application.

The electronic device may display, on a screen, information indicating that multiple electronic devices are set to output audio data of different applications in operation 805. The electronic device may display an audio device list including identification information of the electronic device and multiple external electronic devices connected to the electronic device, and may display information indicating that different electronic devices in the audio device list respectively output audio data of different applications. For example, as illustrated in FIG. 9, the electronic device may display an audio device list 900 including "My Galaxy" 920 which is the identification information of the electronic device and "[headphone]Level U" 910 which is the identification information of a Bluetooth headphone connected to the electronic device. The electronic device may display the icon of a music application and the name thereof (e.g., "Samsung Music"), together with "[headphone]Level U" 910, which is the identification information of the Bluetooth headphone, thereby indicating that the audio data of the application "Samsung Music" is output via the Bluetooth headphone. The electronic device may display equalizer icons 911 and 912 together with "[headphone]Level U" 910, which is the identification information of the Bluetooth headphone and "My Galaxy" 920, which is the identification information of the electronic device, thereby indicating that the corresponding devices operate as audio output devices for at least one application. For example, the electronic device may display the equalizer icon 911 together with "[headphone]Level U" 910, which is the identification information of the Bluetooth headphone, thereby indicating that the Bluetooth headphone is a sub-output device which is an audio output device for the application "Samsung Music" selected by a user. The electronic device may display the equalizer icon 912 together with "My Galaxy" 920, which is the identification information of the electronic device, thereby indicating that the electronic device is a main-output device that is an audio output device for the applications remaining after excluding the application "Samsung Music". The audio device list may include an item 930 for switching to a screen for setting separate output. The item 930 for switching to the screen for setting separate output may be displayed when a sub-output device, which is an audio output device for at least one application selected by a user input, is connected to the electronic device, or when the sub-output device is the electronic device. The electronic device may display the screen displayed in FIG. 7A when a user input on the item 930 for switching to the screen for setting separate output is detected.

In the above description, made with reference to FIGS. 8 and 9, the electronic device displays, on a screen, information indicating an application that takes an external electronic device as an audio output device when the external electronic device is connected to the electronic device. However, according to various embodiments, when the external electronic device is not connected to the electronic device, the electronic device may display, on the screen, information indicating an application that takes the external electronic device as an audio output device, based on information set in advance in the electronic device.

Figure 10:
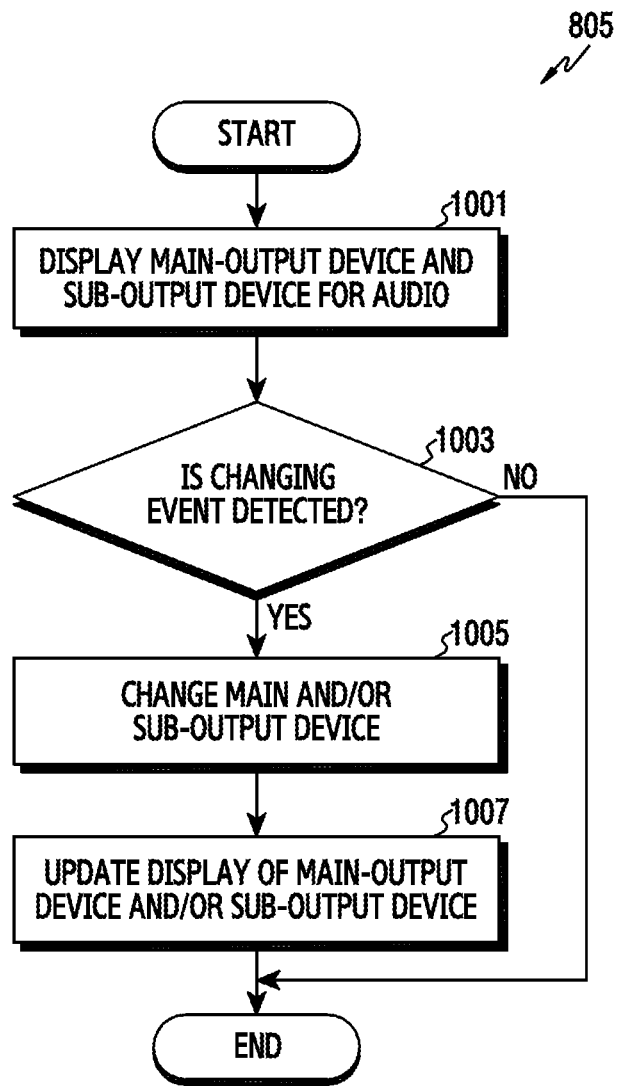
FIG. 10 is a flowchart illustrating a process of changing an audio output device by an electronic device according to an embodiment of the disclosure.

FIG. 10 is a flowchart illustrating a process of changing an audio output device by an electronic device according to an embodiment of the disclosure. Hereinafter, operation 805 of FIG. 8 will be described in detail.

Referring to FIG. 10, an electronic device may display a main-output device and a sub-output device for audio data in operation 1001. The electronic device may display information indicating a device that operates as a sub-output device and a device that operates as a main-output device, from among devices in an audio device list including identification information of the electronic device and multiple external electronic devices connected to the electronic device. For example, the electronic device may indicate the sub-output device and the main-output device using at least one of an equalizer icon, a previously designated icon, the color of displayed identification information, the size of displayed identification information, and the font of displayed identification information. The electronic device may display the main-output device and the sub-output device as illustrated in FIGS. 9 and 11A to 13C.

The electronic device may determine whether an event for changing at least one of the main-output device and the sub-output device is detected in operation 1003. For example, the electronic device may detect that an event for changing at least one of the main-output device and the sub-output device occurs, based on a user input on an area where any one of the devices included in the audio device list including identification information of the electronic device and multiple external electronic devices connected to the electronic device is displayed, a user input on an area where information associated with the main-output device is displayed, a user input on an area where information associated with the sub-output device is displayed, and a user input on an area that is set in advance for changing the main-output device and/or the sub-output device within the audio device list.

The electronic device may change at least one of the main-output device and the sub-output device based on a user input in operation 1005. For example, the electronic device may change the main-output device from the electronic device to an external electronic device, based on a user input. As another example, the electronic device may change the sub-output device from an external electronic device to the electronic device, based on a user input.

The electronic device may update display of the main-output device and/or the sub-output device in operation 1007. For example, when the main-output device is changed from the electronic device to an external electronic device and the sub-output device is changed from an external electronic to the electronic device in operation 1005, the electronic device may display information indicating that the external electronic device operates as the main-output device and the electronic device operates as the sub-output device.

FIGS. 11A to 11E are diagrams illustrating configurations of a screen for changing an audio output device by an electronic device according to various embodiments of the disclosure. FIGS. 11A to 11E illustrate the detailed configurations of a screen in association with operations 1001 to 1007.

Figure 11A:
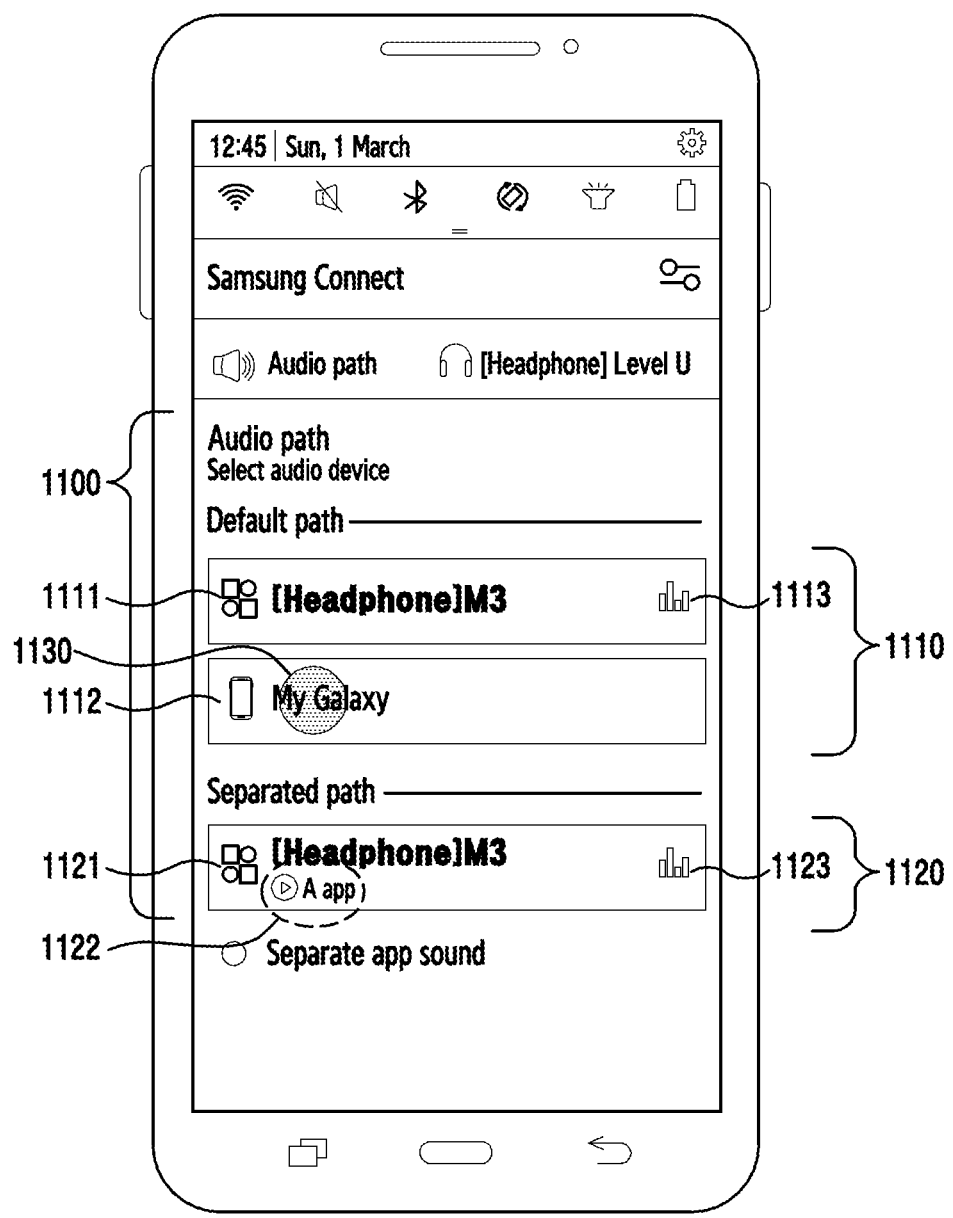
FIGS. 11A, 11B, 11C, 11D, and 11E are diagrams illustrating configurations of a screen for changing an audio output device by an electronic device according to various embodiments of the disclosure.

Referring to FIG. 11A, when an electronic device is connected to a Bluetooth headphone, the electronic device may display an audio device list 1100 including the identification information of the electronic device and the identification information of a Bluetooth headphone within a quick panel area. The electronic device may display a default path list 1110 for displaying a main-output device and a separated path list 1120 for displaying a sub-output device. The default path list 1110 may include identification information (e.g., "My Galaxy" and an icon) 1111 of the electronic device and identification information (e.g., "[Headphone]M3" and an icon) 1112 of a Bluetooth headphone. The separated path list 1120 may include identification information (e.g., "[Headphone]M3" and an icon) 1121 of the Bluetooth headphone. The electronic device may display an equalizer icon 1113 together with the identification information of the Bluetooth headphone within the default path list 1110, thereby indicating that the Bluetooth headphone operates as the main-output device. The electronic device may display an equalizer icon 1123 together with the identification information of the Bluetooth headphone within the separated path list 1120, thereby indicating that the Bluetooth headphone operates as the sub-output device. The electronic device may display the identification information of the Bluetooth headphone together with the identification information (e.g., "A app" and an icon) of an application that is to output audio data via the sub-output device, within the separated path list 1120.

Figure 11B:
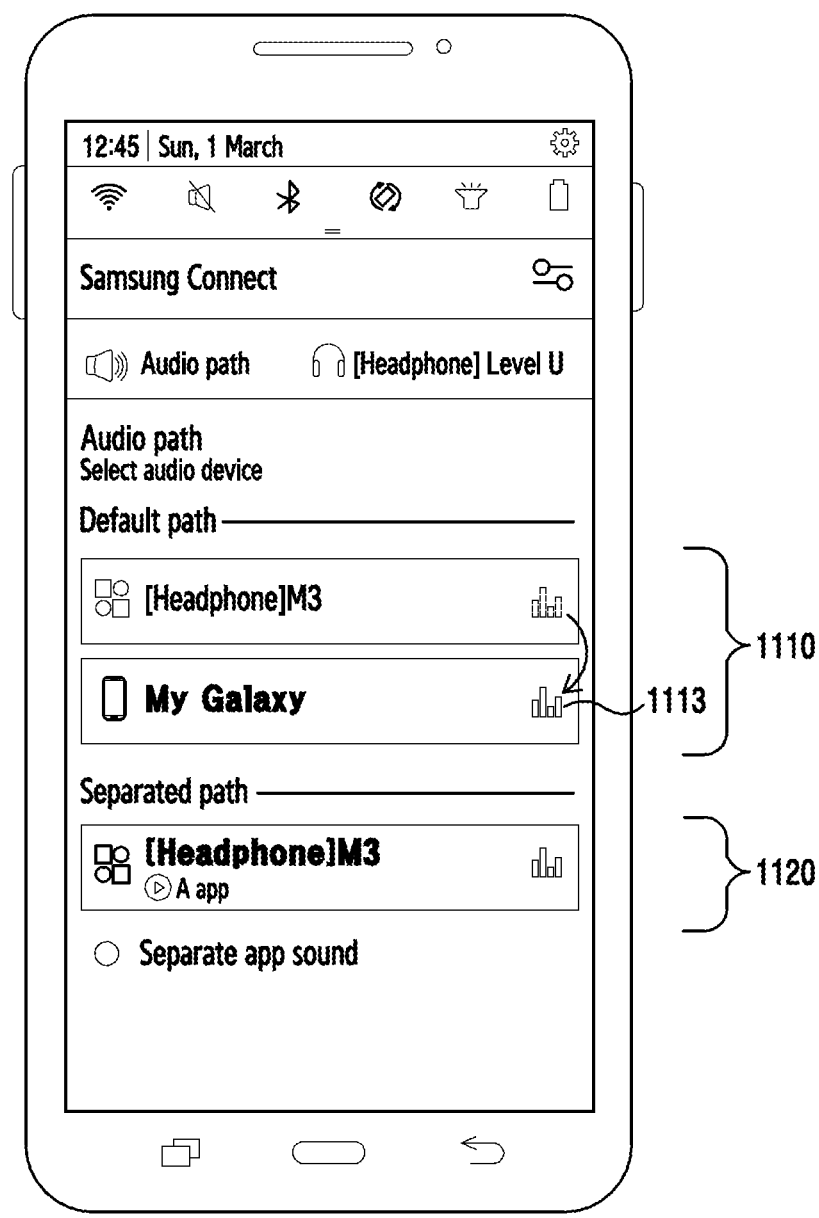

As illustrated in FIG. 11A, when a user input 1130 on the identification information 1120 of the electronic device displayed within the default path list 1110 is detected, the electronic device may determine that an event for changing the main-output device from the Bluetooth headphone to the electronic device occurs. As illustrated in FIG. 11B, in response to the detection of the user input 1130, the electronic device may delete the equalizer icon 1113 that is displayed together with the identification information of the Bluetooth headphone, and may display the equalizer icon 1113 together with the identification information of the electronic device, thereby indicating that the electronic device operates as the main-output device.

Figure 11C:
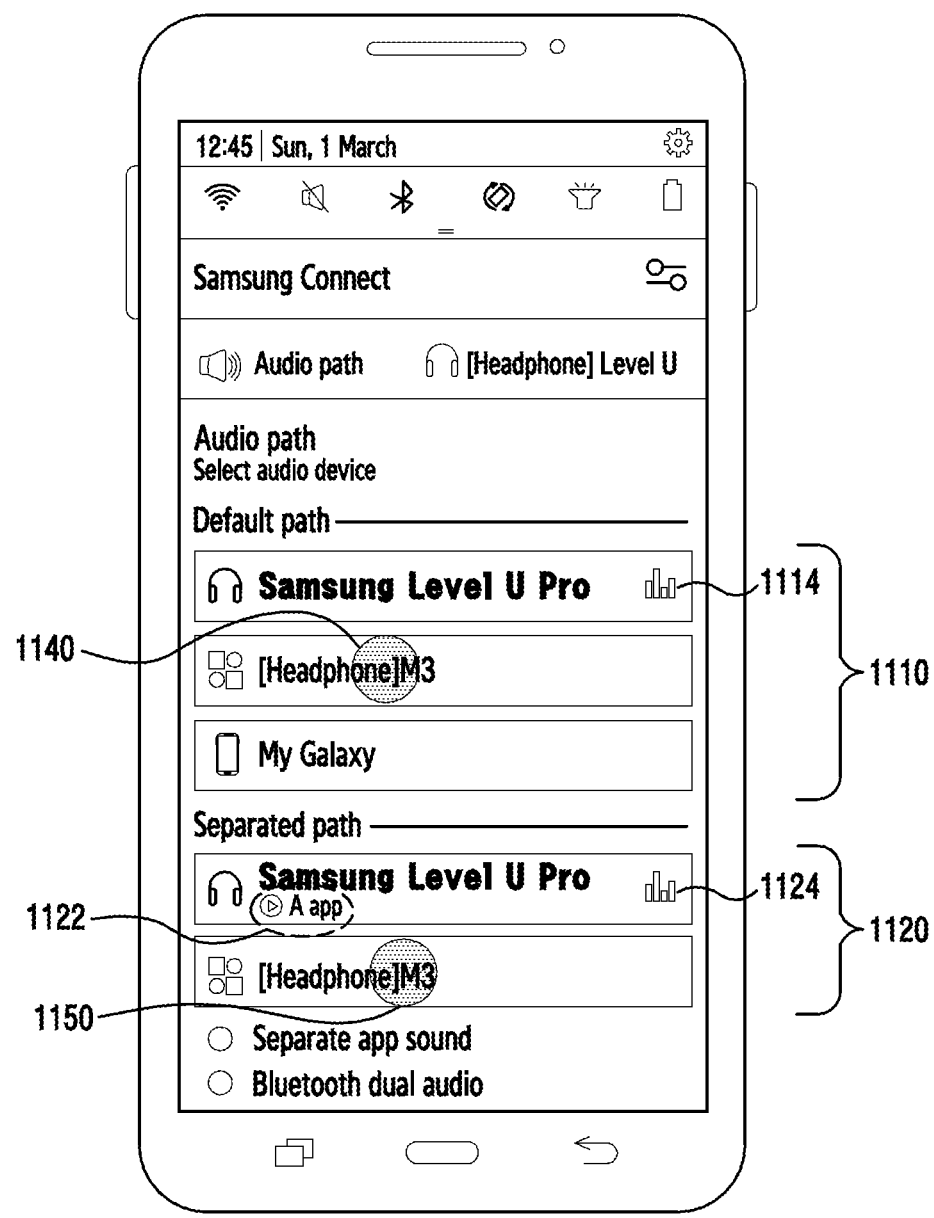
Figure 11D:
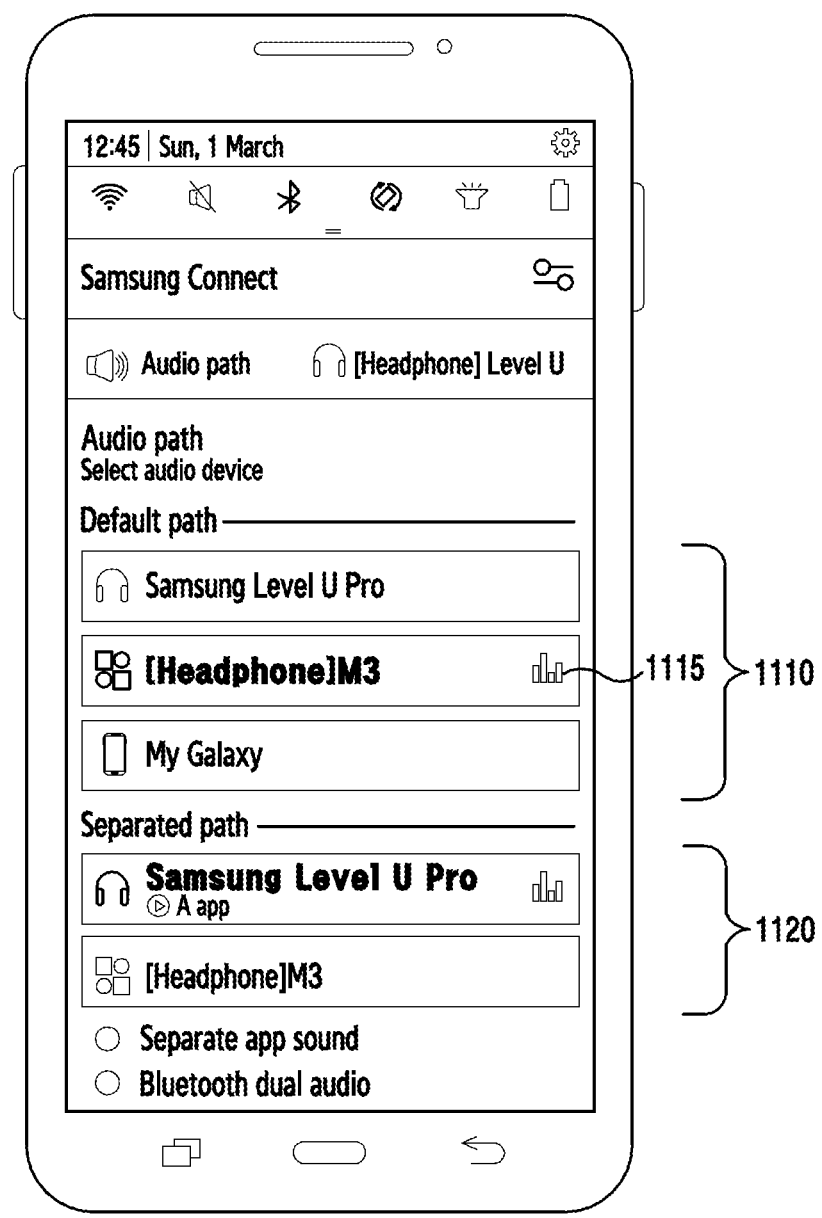

While the electronic device is connected to the Bluetooth headphone "[Headphone]M3", when a Bluetooth headset "Samsung Level U Pro" is connected, the electronic device may determine the latest connected Bluetooth headset as the main-output device and the sub-output device. For example, as illustrated in FIG. 11C, the electronic device may additionally display the identification information of the Bluetooth headset within the default path list 1110 and the separated path list 1120. The electronic device may display equalizer icons 1114 and 1124 together with the identification information associated with the Bluetooth headset, thereby indicating that the Bluetooth headset operates as the main-output device and the sub-output device. The electronic device may display identification information 1122 of an application that is to output audio data via the sub-output device, together with the identification information of the Bluetooth headset, within the separated path list 1120.

Figure 11E:
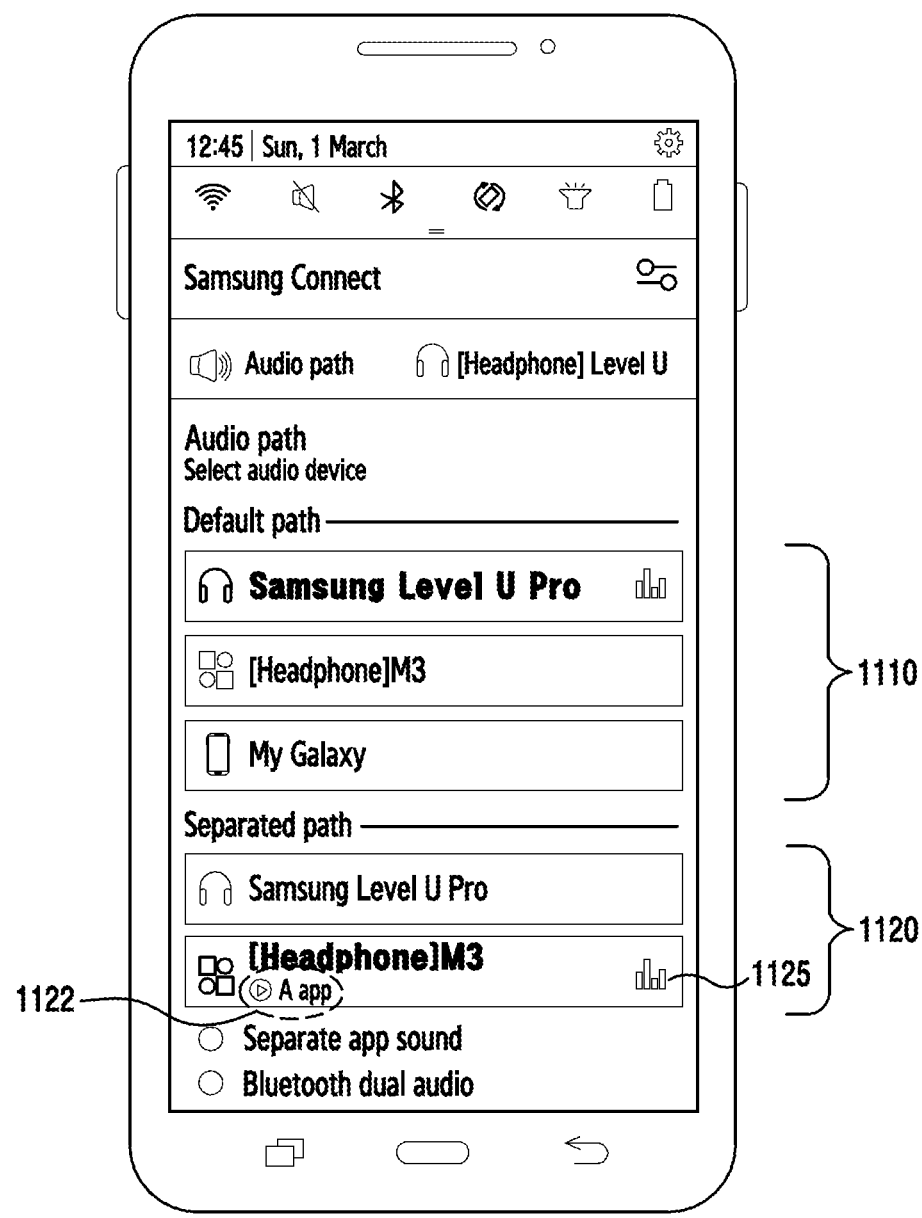

As illustrated in FIG. 11C, when a user input 1140 on the identification information of the Bluetooth headphone displayed within the default path list 1110 is detected, the electronic device may determine that an event for changing the main-output device from the Bluetooth headset to the Bluetooth headphone occurs. As illustrated in FIG. 11E, in response to the detection of the user input 1140, the electronic device may delete the equalizer icon 1114 that is displayed together with the identification information of the Bluetooth headset within the default path list 1110, and may display the equalizer icon 1115 together with the identification information of the Bluetooth headphone, thereby indicating that the Bluetooth headphone operates as the main-output device.

As illustrated in FIG. 11C, when a user input 1150 on the identification information of the Bluetooth headphone displayed within the default path list 1120 is detected, the electronic device may determine that an event for changing the sub-output device from the Bluetooth headset to the Bluetooth headphone occurs. As illustrated in FIG. 11E, in response to the detection of the user input 1150, the electronic device may delete the equalizer icon 1124 that is displayed together with the identification information of the Bluetooth headset within the separated path list 1120, and may display the equalizer icon 1125 together with the identification information of the Bluetooth headphone, thereby indicating that the Bluetooth headphone operates as the sub-output device. The electronic device may display identification information 1122 of an application that is to output audio data via the sub-output device, together with the identification information of the Bluetooth headphone, within the separated path list 1120.

FIGS. 12A to 12D are diagrams illustrating configurations of a screen for changing an audio output device by an electronic device according to various embodiments of the disclosure. FIGS. 12A to 12D illustrate detailed configurations of a screen in association with operations 1001 to 1007.

Figure 12A:
FIGS. 12A, 12B, 12C, and 12D are diagrams illustrating configurations of a screen for changing an audio output device by an electronic device according to various embodiments of the disclosure.

Referring to FIG. 12A, the scheme of displaying a main-output device and a sub-output device of FIG. 12A may be the same as the scheme of displaying a main-output device and a sub-output device of FIG. 11A. The difference is that the main-output device of FIG. 12A is an electronic device and the main-output device of FIG. 11A is a Bluetooth headphone.

Referring to FIG. 12A, the electronic device may detect that a Bluetooth headset is additionally connected in the state in which the Bluetooth headphone is connected. In response to the detection of the additional connection of the Bluetooth headset, the electronic device may determine the main-output device and the sub-output device as the most recently connected Bluetooth headset, and may display equalizer icons 1212 and 1222 together with identification information 1211 and 1221 of the Bluetooth headset within a default path list 1210 and a separated path list 1220, as illustrated in FIG. 12B.

Figure 12B:
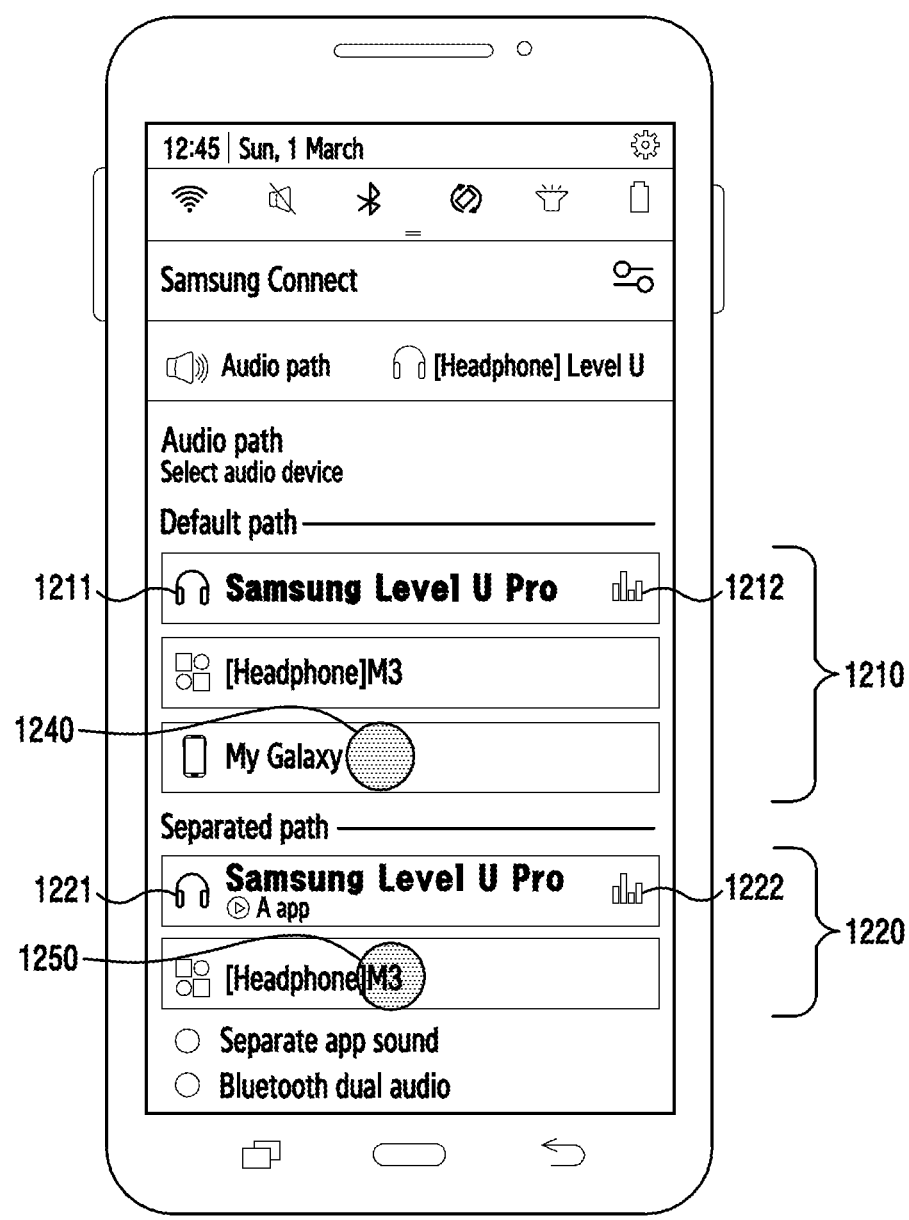
Figure 12C:
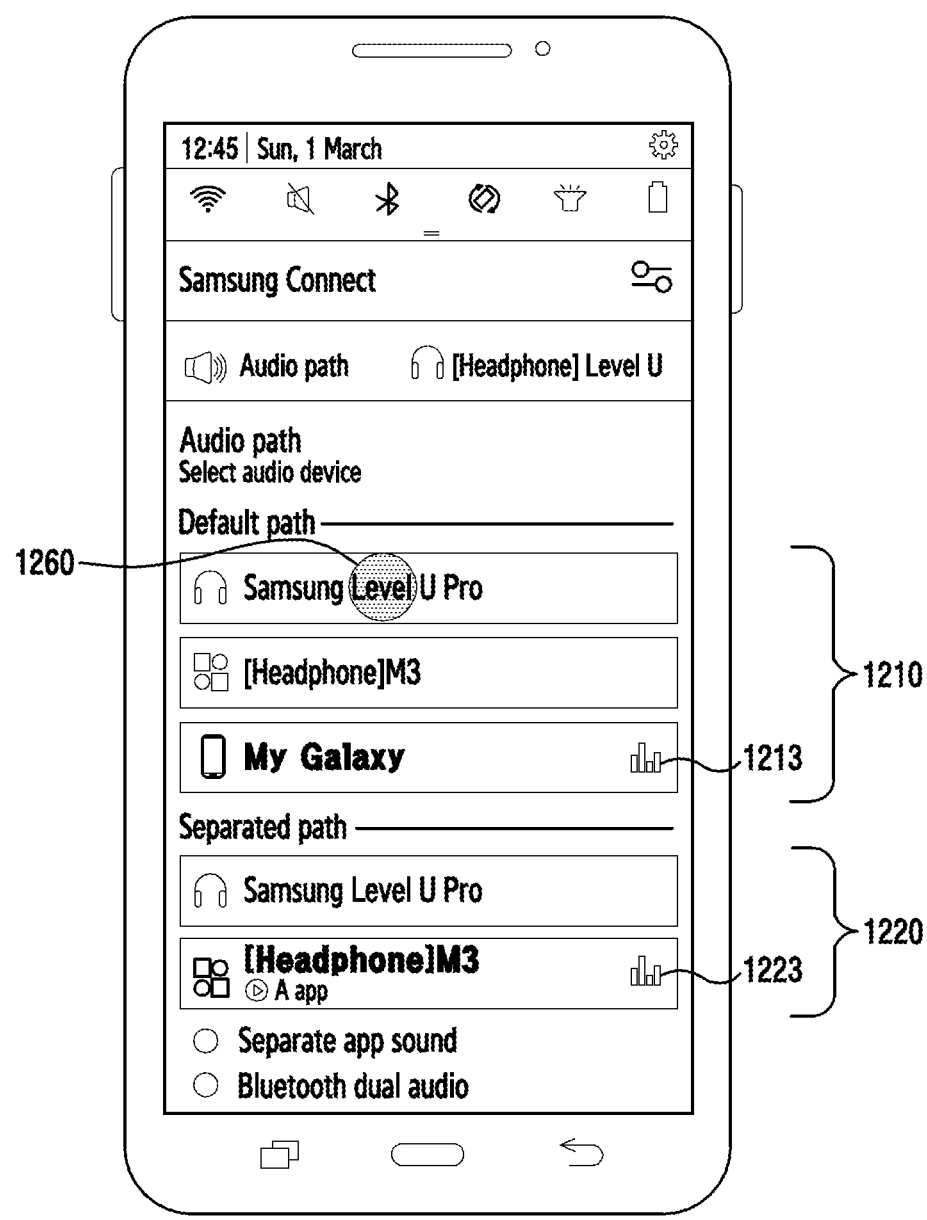

Referring to FIG. 12B, when a user input 1240 on the identification information of the electronic device displayed within the default path list 1210 is detected, the electronic device may determine that an event for changing the main-output device from the Bluetooth headset to the electronic device occurs. Referring to FIG. 12C, in response to the detection of the user input 1240, the electronic device may delete the equalizer icon 1212 that is displayed together with the identification information of the Bluetooth headset within the default path list 1210, and may display the equalizer icon 1213 together with the identification information of the electronic device, thereby indicating that the electronic device operates as a main-output device.

A illustrated in FIG. 12B, when a user input 1250 on the identification information of the Bluetooth headphone displayed within the separated path list 1220 is detected, the electronic device may determine that an event for changing the sub-output device from the Bluetooth headset to the Bluetooth headphone occurs. As illustrated in FIG. 12C, in response to the detection of the user input 1250, the electronic device may delete the equalizer icon 1222 that is displayed together with the identification information of the Bluetooth headset within the separated path list 1220, and may display the equalizer icon 1223 together with the identification information of the Bluetooth headphone, thereby indicating that the electronic device operates as a sub-output device. The electronic device may display identification information 1225 of an application that is to output audio data via the sub-output device, together with the identification information of the Bluetooth headphone, within the separated path list 1220.

Figure 12D:
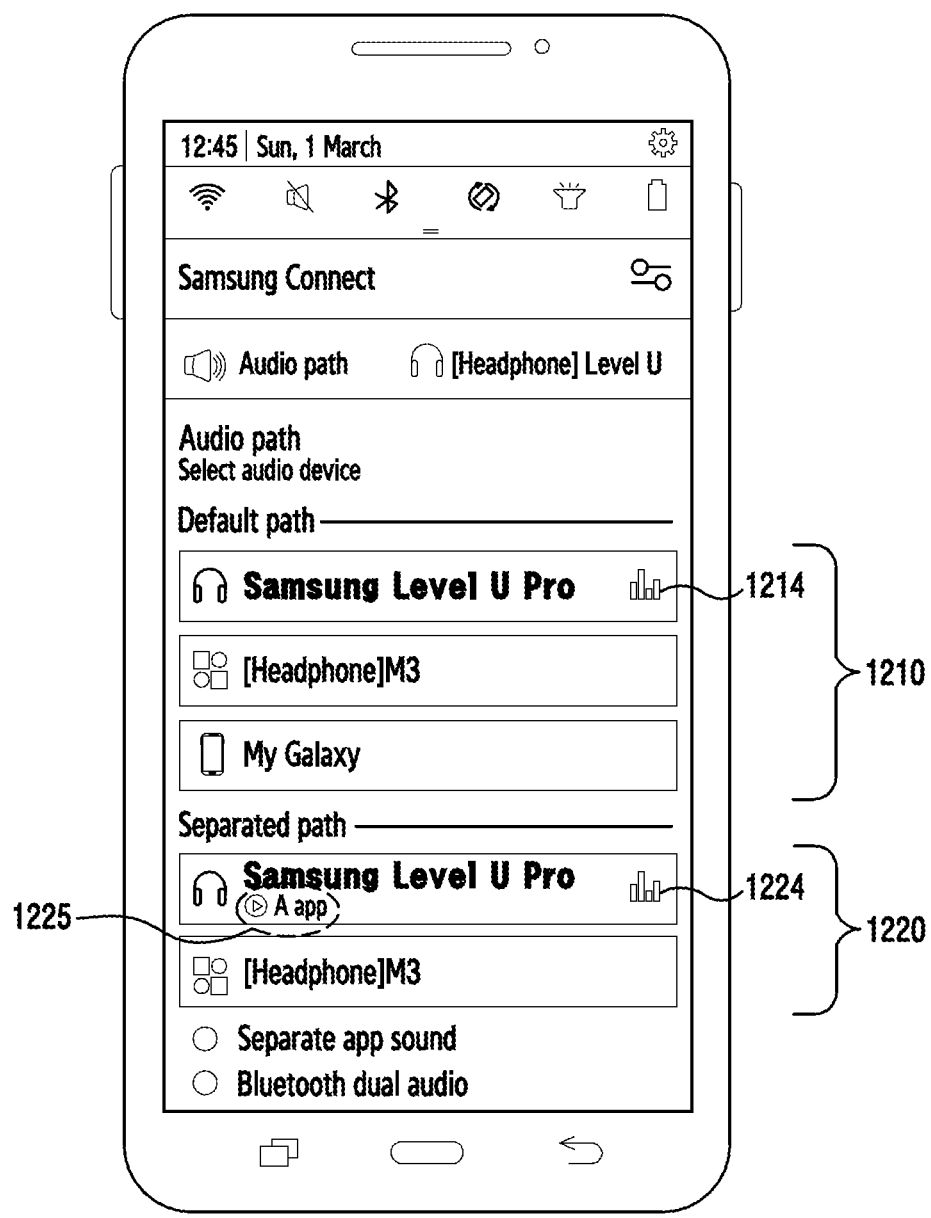

Referring to FIG. 12C, when a user input 1260 on the identification information of the Bluetooth headset displayed within the default path list 1210 is detected, the electronic device may determine that an event for changing the main-output device and the sub-output device to the Bluetooth headset occurs. As illustrated in FIG. 12D, in response to the detection of the user input 1260, the electronic device may display equalizer icons 1214 and 1224 together with the identification information of the Bluetooth headset within the default path list 1210 and the separated path list 1220, thereby indicating that the Bluetooth headset operates as a main-output device and a sub-output device. The electronic device may also display identification information 1225 of an application that is to output audio data via the sub-output device together with the identification information of the Bluetooth headset, within the separated path list 1220.

Figure 13A:
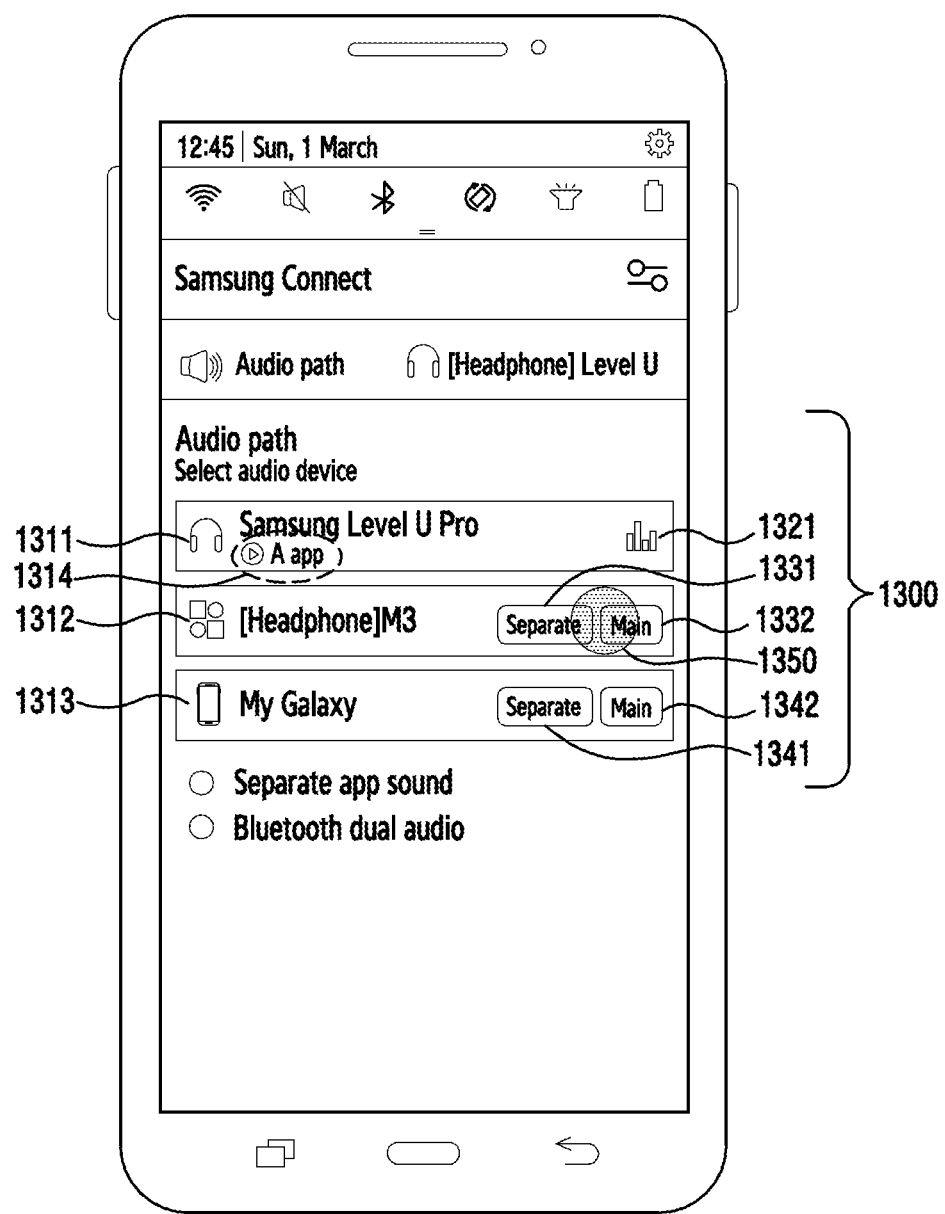
FIGS. 13A, 13B, and 13C are diagrams illustrating configurations of a screen for changing an audio output device by an electronic device according to various embodiments of the disclosure.
Figure 13B:
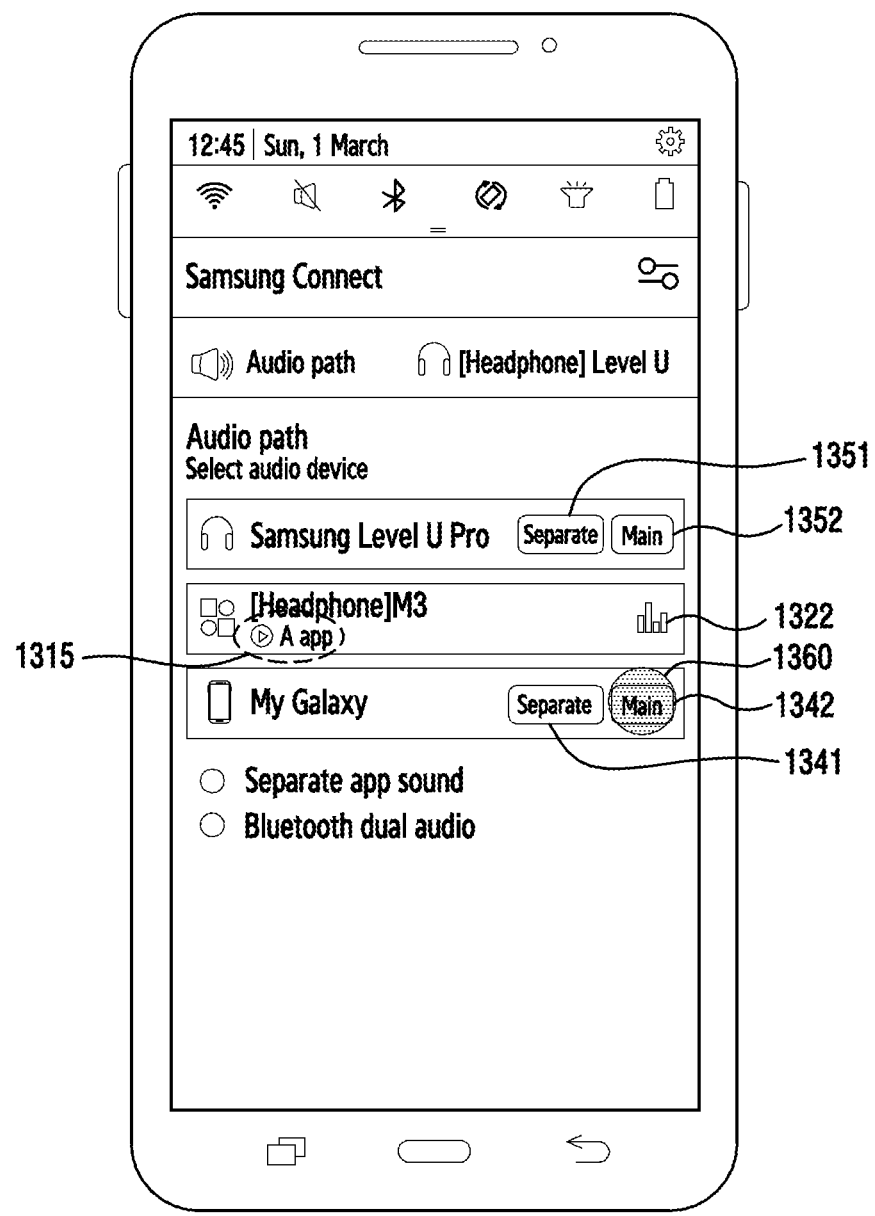
Figure 13C:
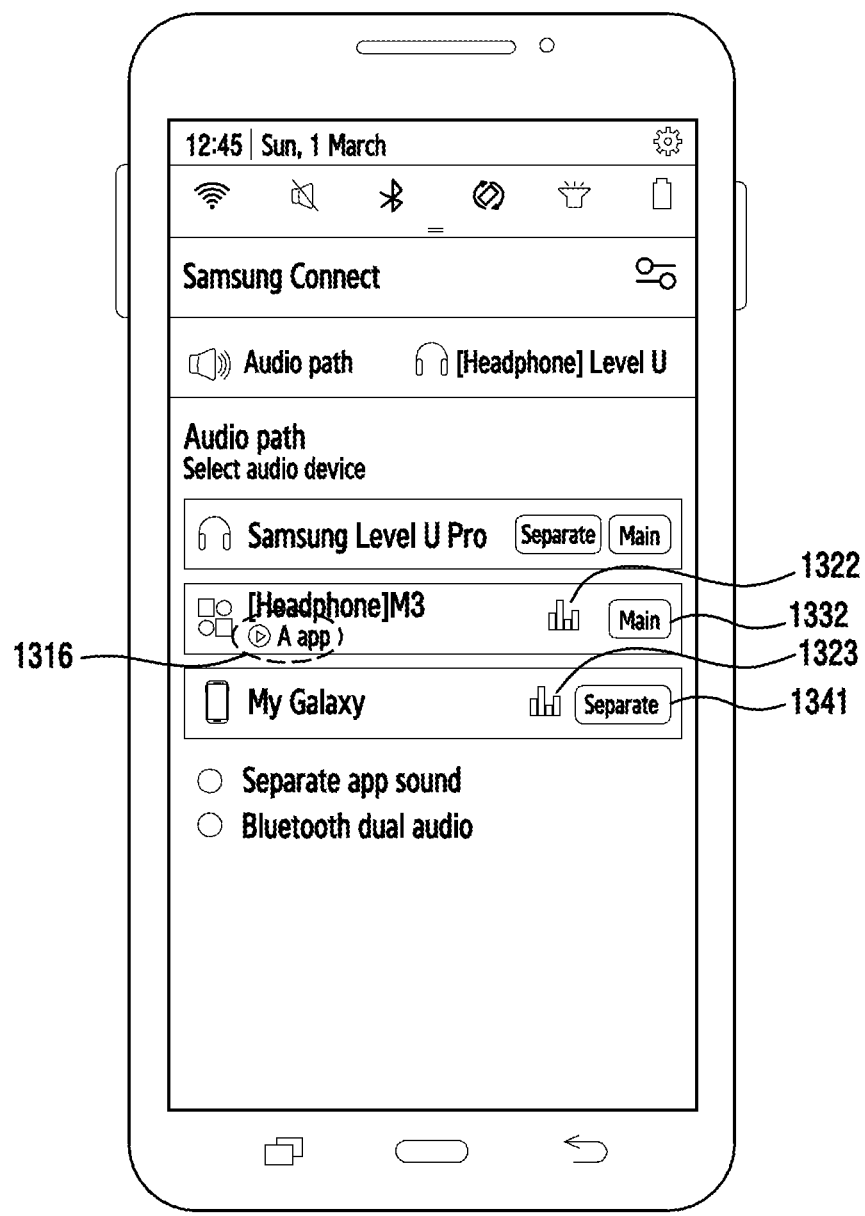

FIGS. 13A to 13C are diagrams illustrating configurations of a screen for changing an audio output device by an electronic device according to various embodiments of the disclosure. FIGS. 13A to 13D illustrate the detailed configurations of a screen in association with operations 1001 to 1007.

Referring to FIG. 13A, when an electronic device is connected to a Bluetooth headphone and a Bluetooth headset, the electronic device may display an audio device list 1300 including identification information of the electronic device, identification information of a Bluetooth headphone, and identification information of a Bluetooth headset within a quick panel area. The electronic device may indicate a main-output device and a sub-output device using an equalizer icon and/or a button icon. For example, as illustrated in FIG. 13A, the electronic device may display only an equalizer icon 1321 together with the identification information of the Bluetooth headset, thereby indicating that the Bluetooth headset operates as a main-output device and a sub-output device. The electronic device may display identification information 1314 of an application that is to output audio data via the sub-output device together with the identification information of the Bluetooth headset. The electronic device may display separate button icons 1331 and 1341 and the main button icons 1332 and 1342, together with the identification information 1312 of the Bluetooth headphone and the identification information 1313 of the electronic device, thereby indicating that the Bluetooth headphone and the electronic device do not operate as a main-output device and a sub-output device. The main-button icon serves to set a corresponding electronic device as a main-output device, and the separate button icon serves to set a corresponding electronic device as a sub-output device.

As illustrated in FIG. 13A, when a user input 1350 on the separate button icon 1331 and the main-button icon 1332 corresponding to the identification information of the Bluetooth headphone is detected, it is determined that an event for setting the Bluetooth headphone as a main-output device and a sub-output device occurs. As illustrated in FIG. 13B, in response to the detection of the user input 1350, the electronic device displays an equalizer icon 1322 together with the identification information of the Bluetooth headphone, thereby indicating that the electronic device operates as a main-output device and a sub-output device. The electronic device may display identification information 1315 of an application that is to output audio data via the sub-output device together with the identification information of the Bluetooth headphone. The electronic device may display a separate button icon 1351 and the main button icon 1352 together with the identification information 1311 of a Bluetooth headset, thereby indicating that the Bluetooth headset does not operate as a main-output device and a sub-output device.

As illustrated in FIG. 13B, when a user input 1360 on the main button icon 1342 corresponding to the identification information of the electronic device is detected, it is detected that an event for setting the electronic device as a main-output device occurs. As illustrated in FIG. 13C, in response to the detection of the user input 1360, the electronic device displays an equalizer icon 1323 and the separate button icon 1341 together with the identification information of the electronic device, thereby indicating that the electronic device operates as a main-output device. The electronic device may display the equalizer icon 1322 and the main button icon 1332, together with the identification information of the Bluetooth headphone, thereby indicating that the Bluetooth headphone operates as a sub-output device. The electronic device may display the identification information 1316 of an application that is to output audio data via the sub-output device together with the identification information of the Bluetooth headphone.

In the above description, made with reference to FIG. 13, a button icon corresponding to each electronic device is displayed, and is used to change a main-output device and/or a sub-output device. However, according to various embodiments, the main-output device and/or the sub-output device may be changed using a drop-down list including a menu item for changing the main-output device and/or sub-output device. For example, when a user selects an area where the identification information of a predetermined electronic device is displayed, a drop-down list is displayed, which includes a menu item for setting the corresponding electronic device as a main-output device and a menu item for setting the corresponding electronic device as a sub-output device, and the corresponding electronic device may be set as the main-output device and/or the sub-output device according to a selection made by the user within the drop-down list.

Figure 14:
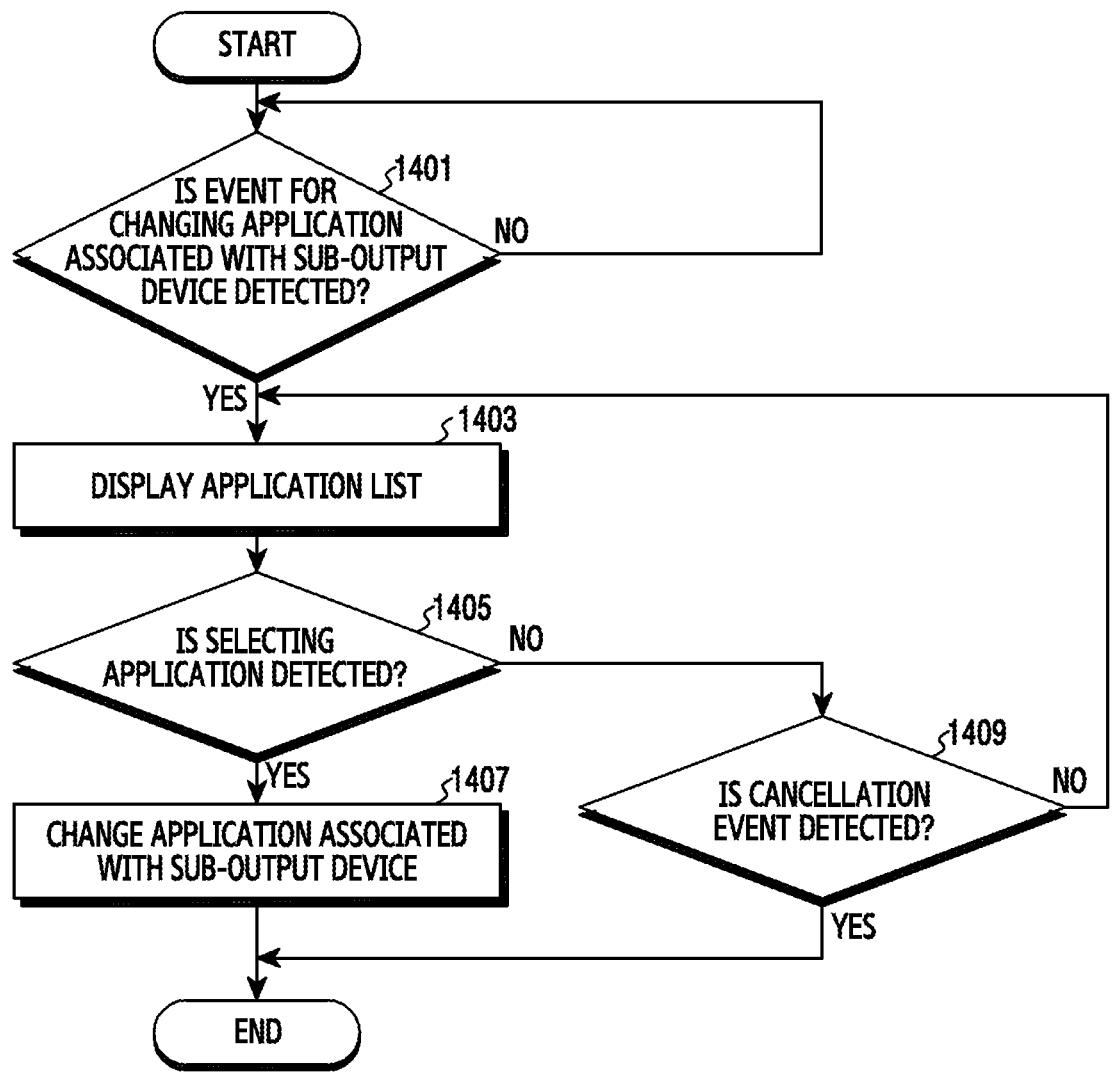
FIG. 14 is a flowchart illustrating a process of changing an application associated with separate output by an electronic device according to an embodiment of the disclosure.
Figure 15:
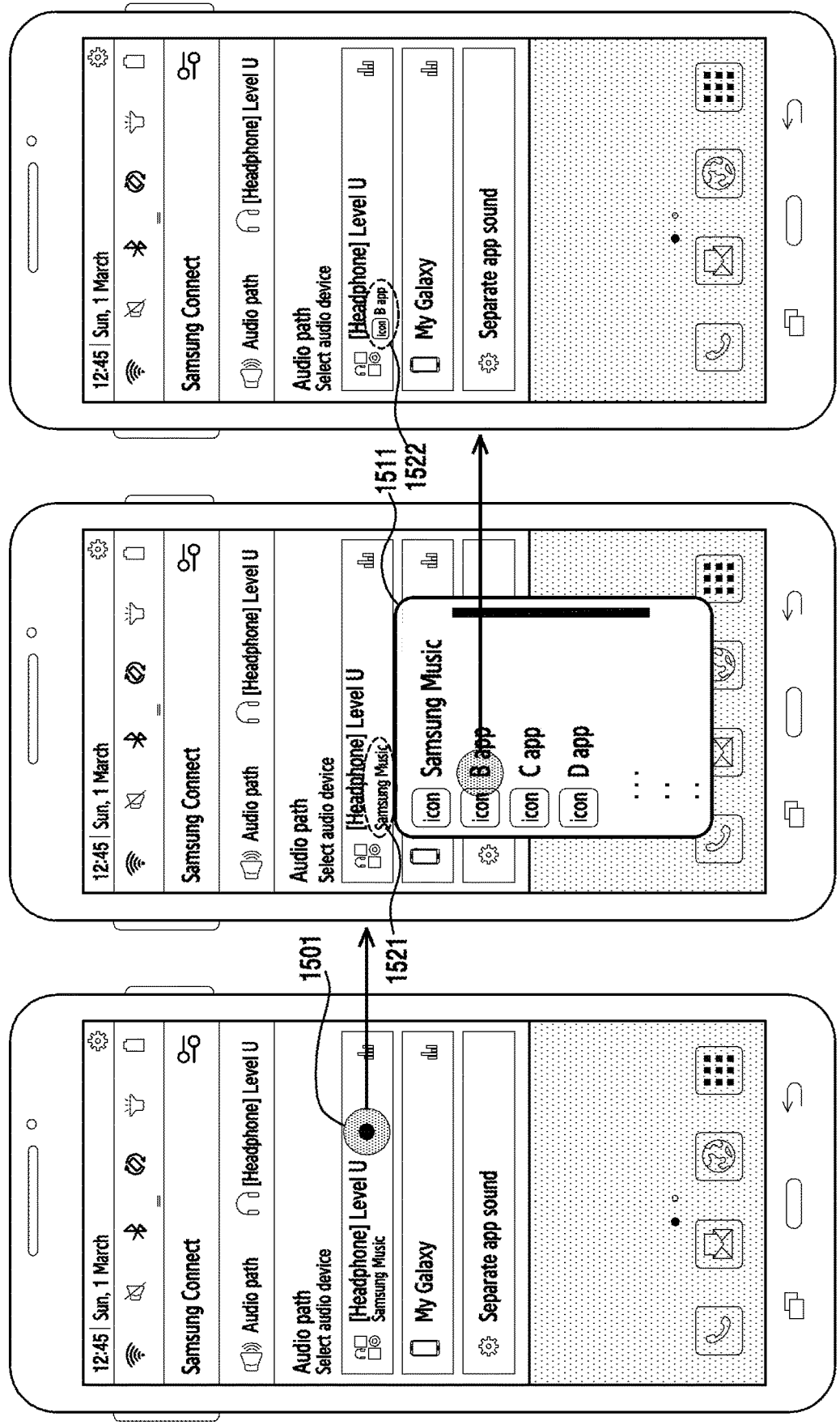
FIG. 15 is a diagram illustrating a configuration of a screen for changing an application associated with separate output by an electronic device according to an embodiment of the disclosure.

FIG. 14 is a flowchart illustrating a process of changing an application associated with separate output by an electronic device according to an embodiment of the disclosure. FIG. 15 is a flowchart illustrating a configuration of a screen for changing an application associated with separate output by an electronic device according to various embodiments of the disclosure. At least one operation of FIG. 14 will be described with reference to FIG. 15.

Referring to FIG. 14, an electronic device may determine whether an event for changing an application associated with a sub-output device is detected in operation 1401. For example, as illustrated in FIG. 15, when a user input 1501 that satisfies a predetermined condition is detected from an area displaying the identification information of a headphone, which operates as a sub-output device, the electronic device may determine that an event for changing an application associated with a sub-output device is detected. The predetermined condition may include a condition associated with at least one of a touch hold time, a touch pressure, and the number of touches.

In response to the detection of the event for changing an application associated with the sub-output device, the electronic device may display an application list in operation 1403. For example, as illustrated in FIG. 15, the electronic device may display an application list 1511 including the identification information of multiple applications. The application list may include all applications that are executable in the electronic device. The application list may include applications that generate audio data from among all of the applications that are executable in the electronic device. The application list may include applications that are designated in advance by a user from among all of the applications that are executable in the electronic device. The application list may include applications that are selected based on a user's preference from among all of the applications that are executable in the electronic device.

The electronic device may determine whether selecting at least one application by a user input is detected in operation 1405. For example, the electronic device may detect whether at least one application is selected by a user input within the application list 1511 as illustrated in FIG. 15.

In response to the detection of selecting at least one application, the electronic device may change an application associated with a sub-output device to at least one selected application in operation 1407. For example, as illustrated in FIG. 15, the electronic device may detect that application "B app" is selected within the application list 1511 by a user input, may change application information associated with a sub-output device from "Samsung Music" 1521 to "B app" 1522, and may display the same, thereby indicating that the application associated with the sub-output device is changed to "B app".

When selection of at least one application is not detected in operation 1405, the electronic device may determine whether a cancellation event is detected in operation 1409. For example, the electronic device may determine whether a touch input for returning to a previous screen occurs, or may determine whether a touch input on an area excluding the application list 1511 occurs. When the cancellation event is not detected, the electronic device may return to operation 1403, and may maintain display of the application list. When the cancellation event is detected, the electronic device may terminate operation of the electronic device according to various embodiments of the disclosure.

Figure 16:
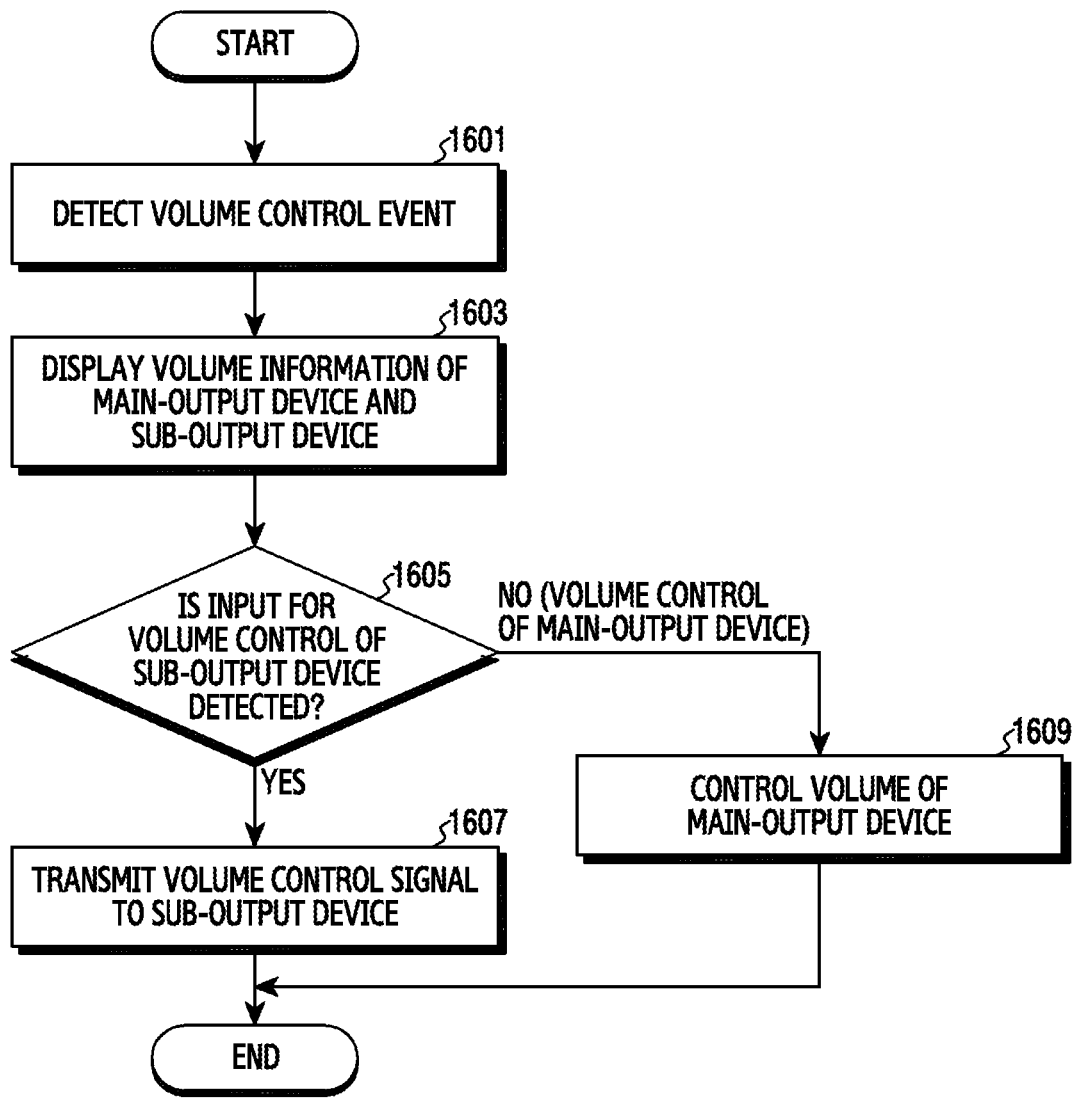
FIG. 16 is a flowchart illustrating a process of controlling a volume by an electronic device according to an embodiment of the disclosure.
Figure 17:
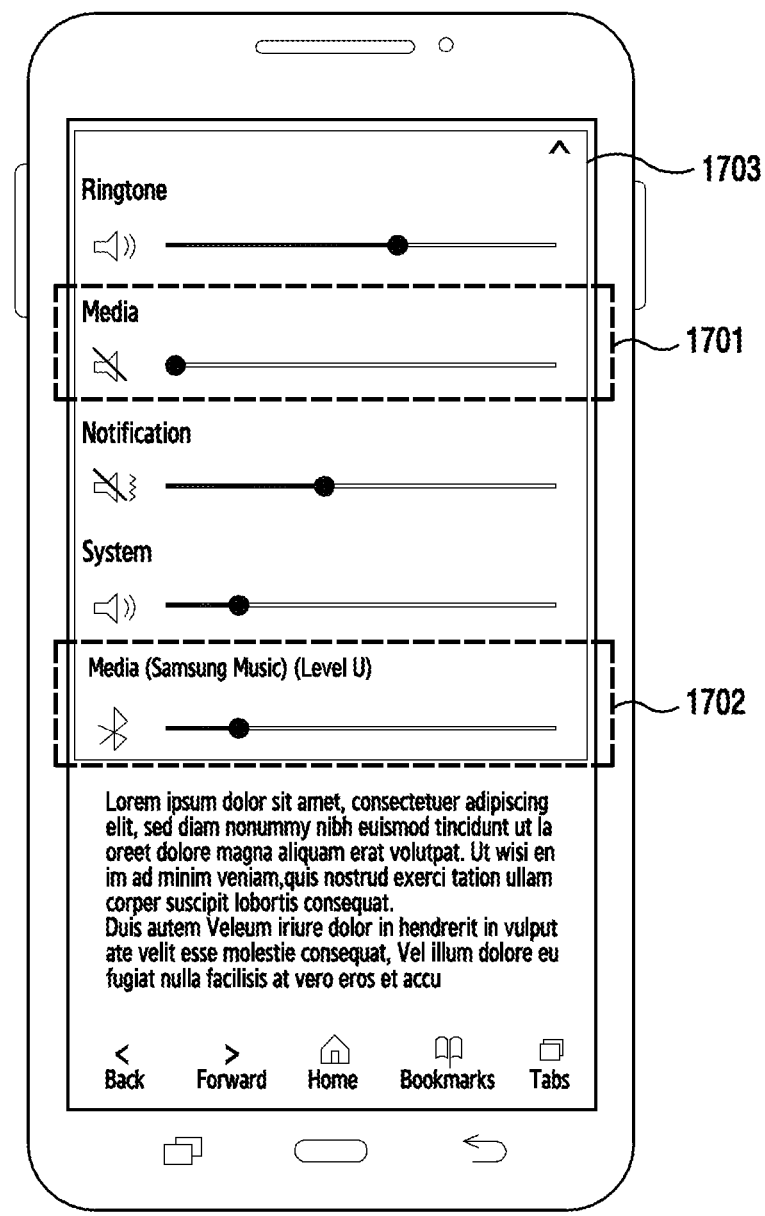
FIG. 17 is a diagram illustrating a configuration of a screen for controlling a volume by an electronic device according to an embodiment of the disclosure.

FIG. 16 is a flowchart illustrating a process of controlling a volume by an electronic device according to an embodiment of the disclosure. FIG. 17 is a flowchart illustrating the configuration of a screen for controlling a volume by an electronic device according to various embodiments of the disclosure. Hereinafter, at least one operation of FIG. 16 will be described with reference to FIG. 17.

Referring to FIG. 16, an electronic device may detect a volume control event in operation 1601. For example, when a hardware volume key is pressed by a user, the electronic device may detect the volume control event.

The electronic device may display volume information associated with a main-output device and a sub-output device in operation 1603. For example, as illustrated in FIG. 17, the electronic device may display media volume information 1701 of the electronic device, which is the main-output device, and media volume information 1702 of a Bluetooth headset, which is the sub-output device, via a popup window 1703. When the media volume information of the sub-output device is displayed, the electronic device may display the identification information (e.g., a name, ID, or icon) of an application that is to output audio data via the sub-output device and the identification information (e.g., a name, ID, device type, or icon) of the sub-output device.

The electronic device may determine whether an input for volume control of the sub-output device is detected or an input for volume control of the main-output device is detected in operation 1605. For example, as illustrated in FIG. 17, the electronic device may determine whether a user input is detected in an area where the media volume information 1702 of the Bluetooth headset is displayed within the popup window 1703, or whether a user input is detected in an area where the media volume information 1701 of the electronic device is displayed.

In response to the detection of an input for volume control of the sub-output device, the electronic device may transmit a volume control signal to the sub-output device in operation 1607. For example, the electronic device may determine the degree of volume control of the sub-output device, based on the movement distance and the movement direction of a touch for volume control of the Bluetooth headset, which is the sub-output device. The electronic device may transmit, to the sub-output device, a volume control signal that requests the determined degree of volume control.

In response to the detection of an input for volume control of the main-output device, the electronic device may control the volume of the main-output device in operation 1609. For example, the electronic device may control the volume of the main-output device based on the movement distance and the movement direction of a touch for volume control of the electronic device, which is the main-output device.

Figure 18:
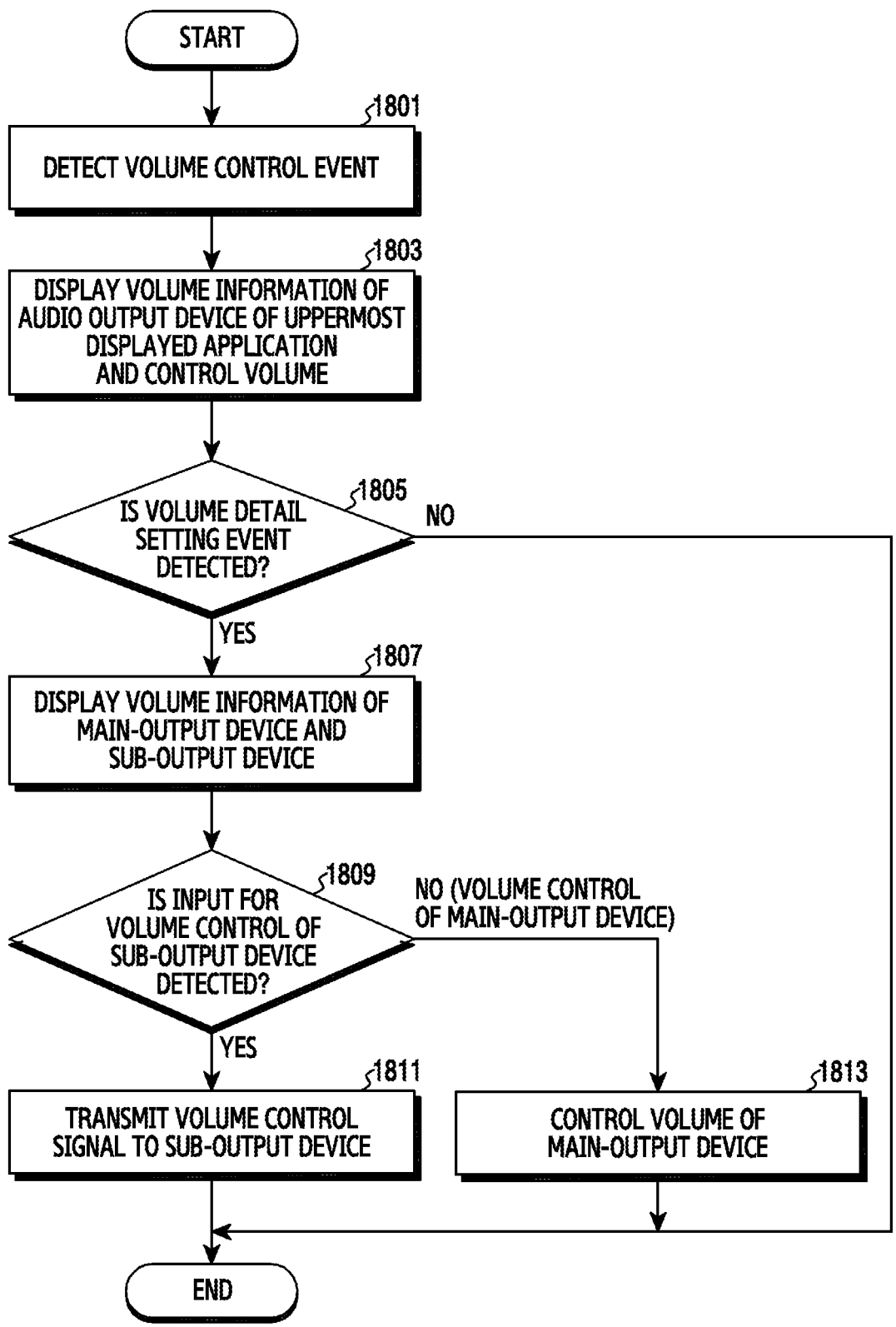
FIG. 18 is a flowchart illustrating a process of controlling a volume, based on an application, by an electronic device according to an embodiment of the disclosure.
Figure 19A:
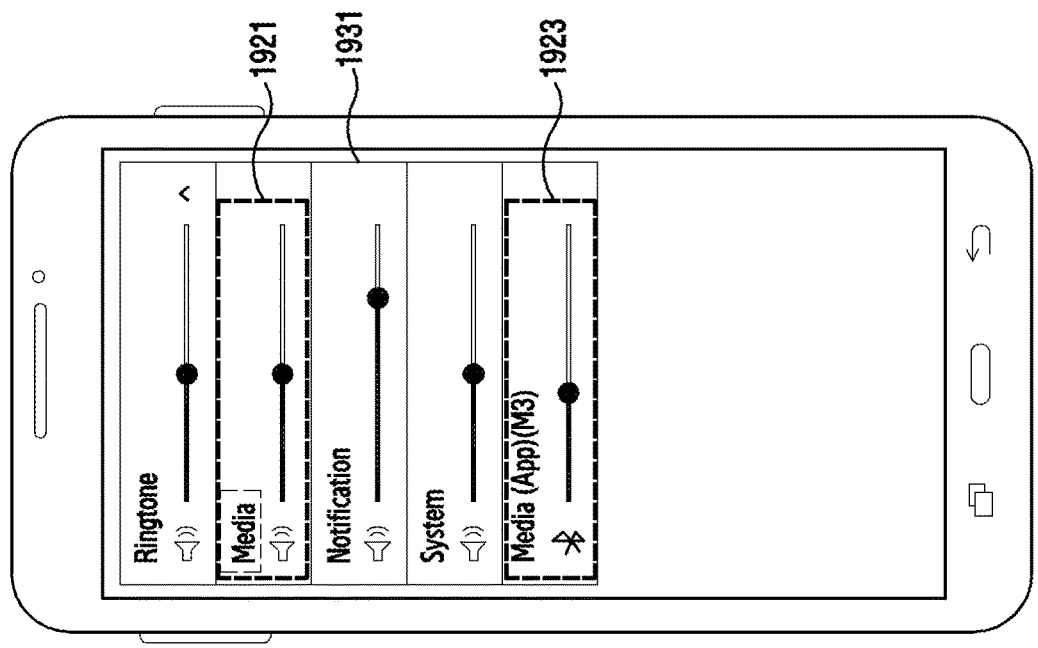
FIGS. 19A and 19B are diagrams illustrating configurations of a screen for controlling a volume, based on an application, by an electronic device according to various embodiments of the disclosure.
Figure 19A:
Figure 19A:
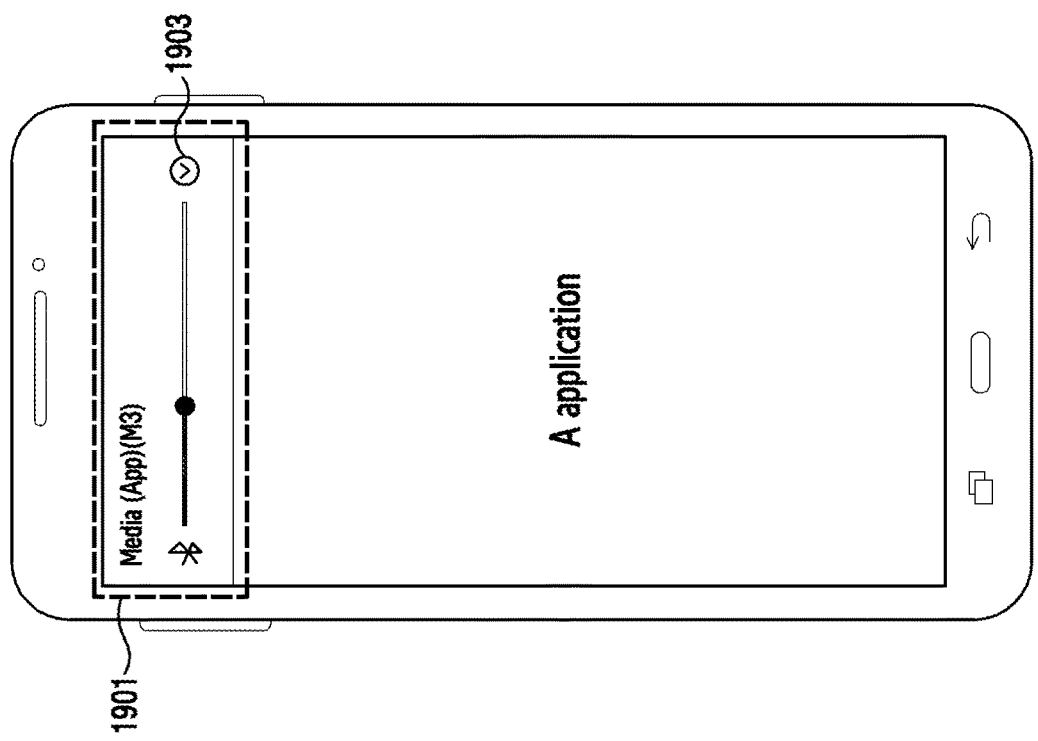
Figure 19B:
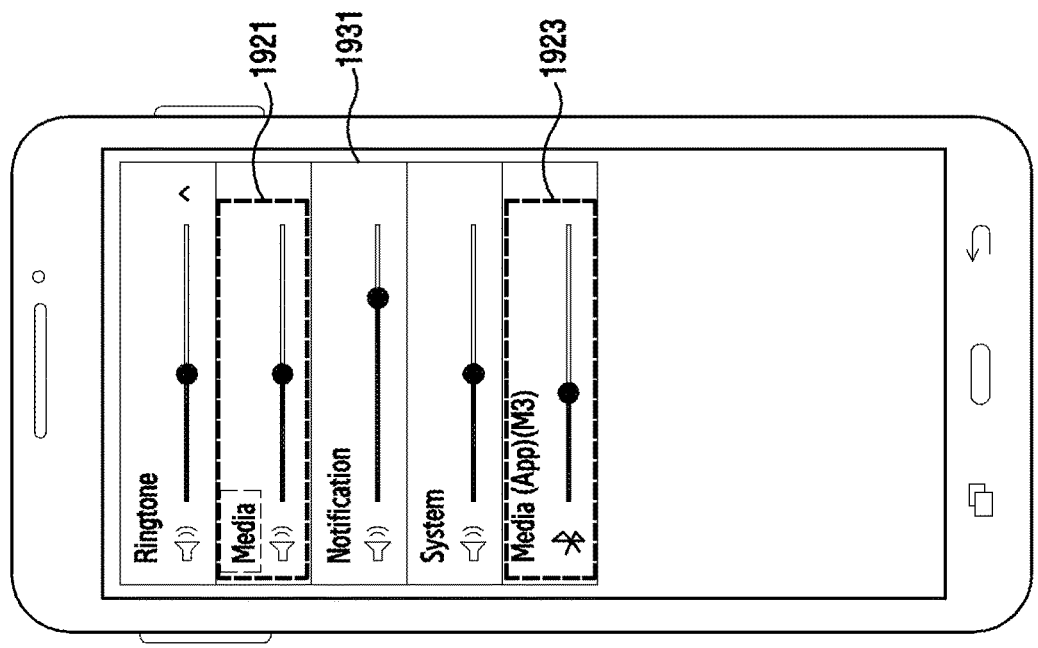
Figure 19B:
Figure 19B:
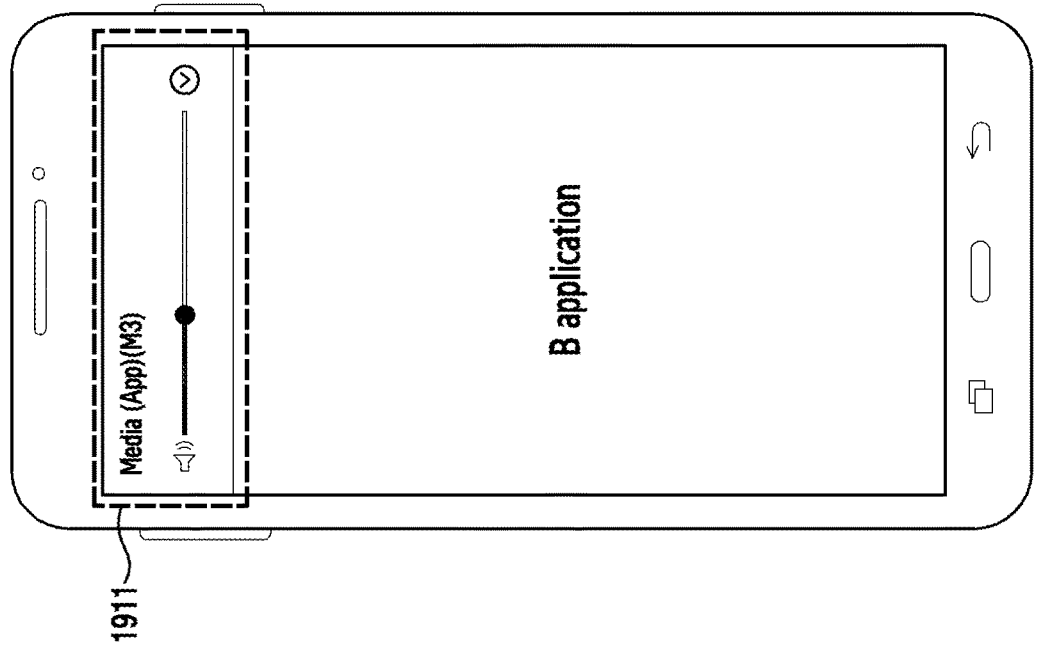

FIG. 18 is a flowchart illustrating a process of controlling a volume, based on an application, by an electronic device according to an embodiment of the disclosure. FIGS. 19A and 19B are diagrams illustrating configurations of a screen for controlling a volume, based on an application, by an electronic device according to various embodiments of the disclosure. Hereinafter, at least one operation in FIG. 18 will be described with reference to FIGS. 19A and 19B.

Referring to FIG. 18, an electronic device according to various embodiments may detect a volume control event in operation 1801. For example, when a hardware volume key is pressed by a user, the electronic device may detect the volume control event.

The electronic device may display volume information associated with an audio output device of an uppermost displayed application, and may control the volume of the corresponding audio output device in operation 1803. For example, as illustrated in FIG. 19A, when an execution screen of application A is displayed, and a volume control event is detected in the state in which audio data of the application A is output via the Bluetooth headphone M3, which is a sub-output device, a popup window 1901 including the audio volume information of the Bluetooth headphone M3, which is outputting audio data of the application A, may be displayed on a predetermined area of a screen. The electronic device may display the popup window 1901 including the audio volume information of the Bluetooth headphone M3 in a predetermined area of the screen, and may control the audio volume of the Bluetooth headphone M3 based on at least one of the volume key type of an input volume key and the number of times that a volume key is input.

In the example illustrated in FIG. 19B, when an execution screen of application B is displayed and a volume control event is detected in the state in which audio data of the application B is output via the electronic device, which is a main-output device, a popup window 1911 including audio volume information of the electronic device, which is the main-output device, may be displayed on a predetermined area of the screen. The electronic device may display the popup window 1911 including the audio volume information of the electronic device in a predetermined area of the screen, and may control the audio volume of the electronic device based on at least one of the volume key type of an input volume key and the number of times that a volume key is input. The predetermined area of the screen to which the popup window including the audio volume information is output may be set and changed by a user. For example, the predetermined area of the screen may be set and changed to the upper area, the lower area, the left area, the right area, or the central area of the screen by a user input, or may be set and changed to an area designated by a user touch.

The electronic device may determine whether a volume detail setting event is detected in operation 1805. For example, as illustrated in FIG. 19A, the electronic device may determine whether a user input on an item 1903 for setting volume details is detected.

In response to the detection of the volume detail setting event, the electronic device may display volume information associated with the main-output device and the sub-output device in operation 1807. For example, as illustrated in FIGS. 19A and 19B, the electronic device may display media volume information 1921 of the electronic device, which is the main-output device, and media volume information 1923 of the Bluetooth headphone M3, which is the sub-output device, via a popup window 1931. When the media volume information of the sub-output device is displayed, the electronic device may display the identification information (e.g., a name, ID, or icon) of an application that is to output audio data via the sub-output device and the identification information (e.g., a name, ID, device type, or icon) of the sub-output device.

The electronic device may determine whether an input for volume control of the sub-output device is detected or an input for volume control of the main-output device is detected in operation 1809. For example, as illustrated in FIGS. 19A and 19B, the electronic device may determine whether a user input is detected from an area where the media volume information 1923 of the Bluetooth headset is displayed within the popup window 1931, or whether a user input is detected from an area where the media volume information 1921 of the electronic device is displayed.

In response to the detection of the input for volume control of the sub-output device, the electronic device may transmit a volume control signal to the sub-output device in operation 1811. For example, the electronic device may determine the degree of volume control of the sub-output device, based on the movement distance and the movement direction of a touch for volume control of the Bluetooth headset, which is the sub-output device. The electronic device may transmit, to the sub-output device, a volume control signal that requests the determined degree of volume control.

In response to the detection of the input for volume control of the main-output device, the electronic device may control the volume of the main-output device in operation 1813. For example, the electronic device may control the volume of the main-output device, based on the movement distance and the movement direction of a touch for volume control of the electronic device, which is the main-output device.

In the above description, made with reference to FIGS. 18, 19A, and 19B, it has been described that the electronic device controls the audio volume of the main-output device and the sub-output device. However, the disclosure is not limited thereto, and the electronic device may control the audio volume of each application according to various embodiments.

In the above description, made with reference to FIG. 19B, volume control of the main-output device has been described when a volume control event is detected in the state in which an execution screen of application B, which is outputting audio data via the main-output device, is displayed. However, according to various embodiments, the volume of the main-output device may be controlled when a volume control event is detected in the state in which a home screen is displayed.

Figure 20:
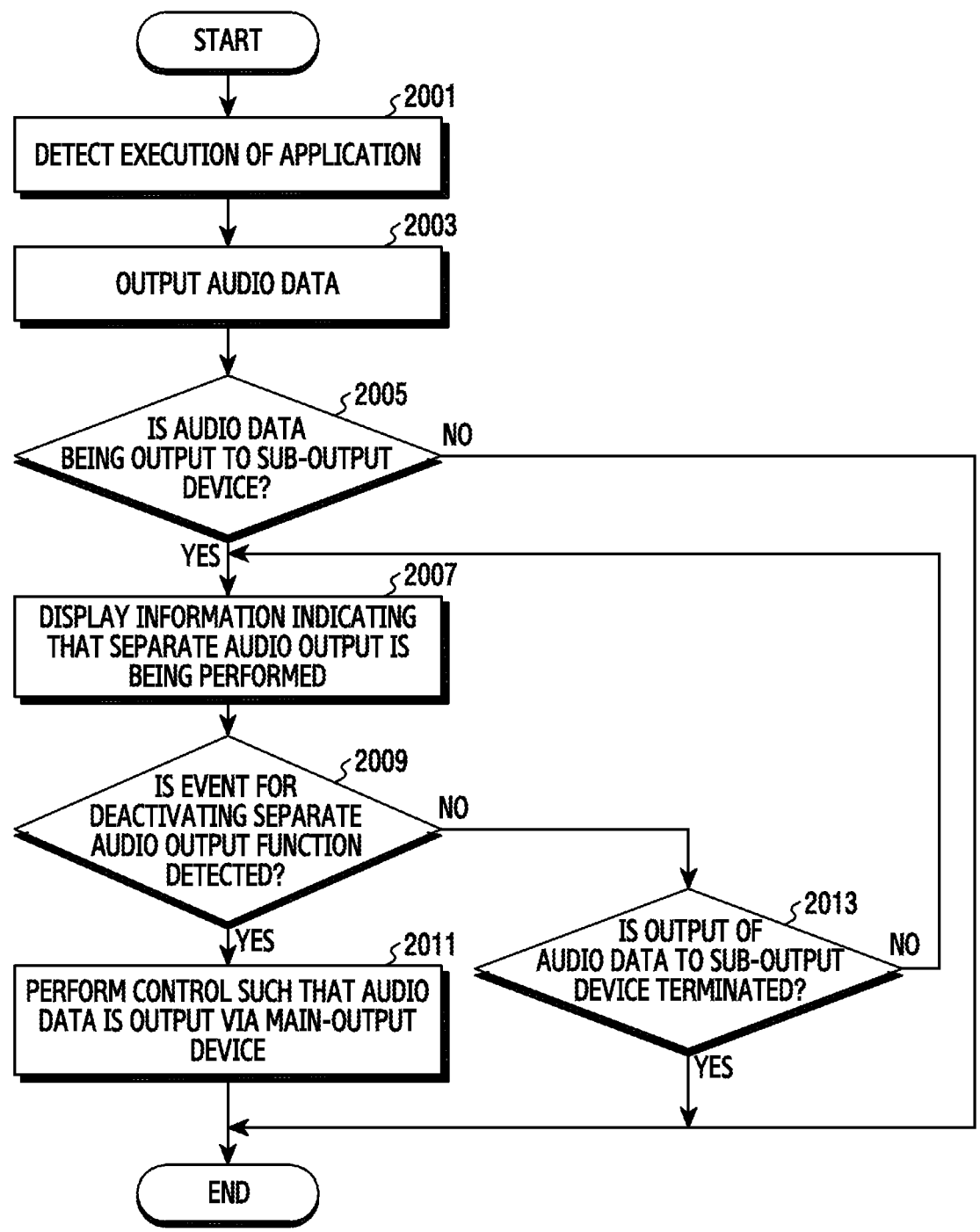
FIG. 20 is a flowchart illustrating a process of controlling separate output of audio data by an electronic device according to an embodiment of the disclosure.
Figure 21A:
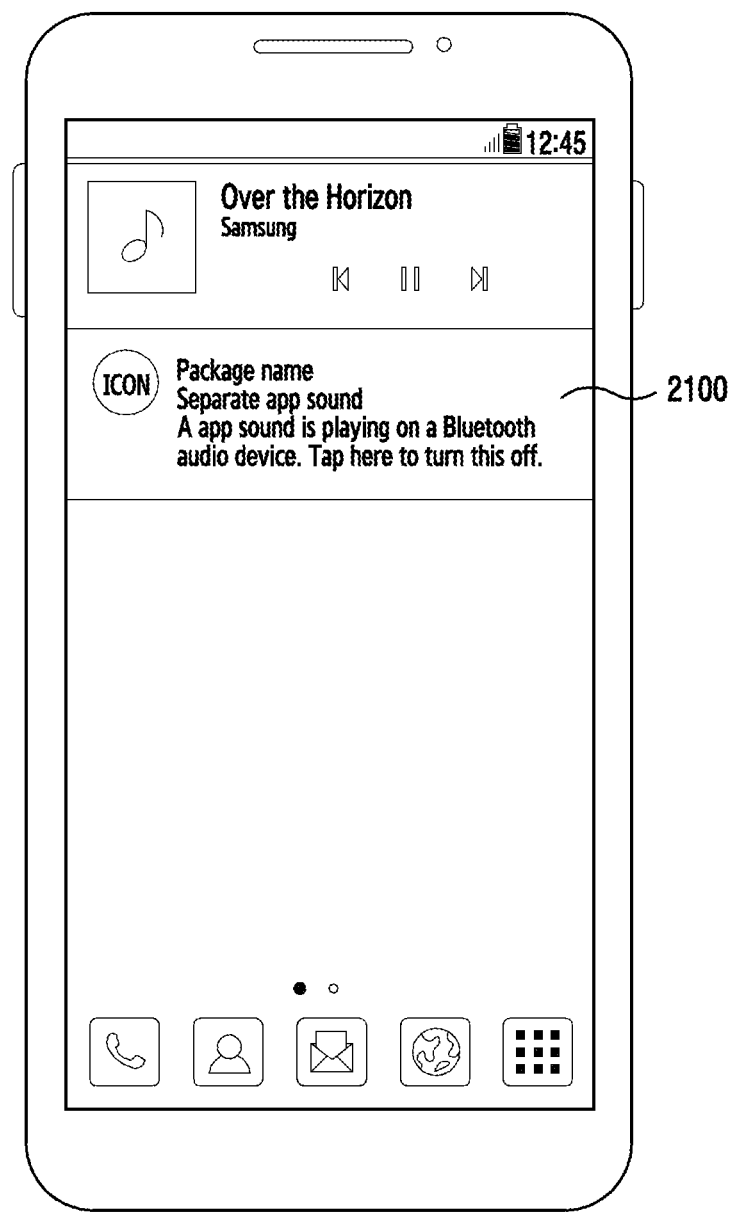
FIGS. 21A and 21B are diagrams illustrating configurations of a screen for controlling separate output of audio data by an electronic device according to various embodiments of the disclosure.
Figure 21B:
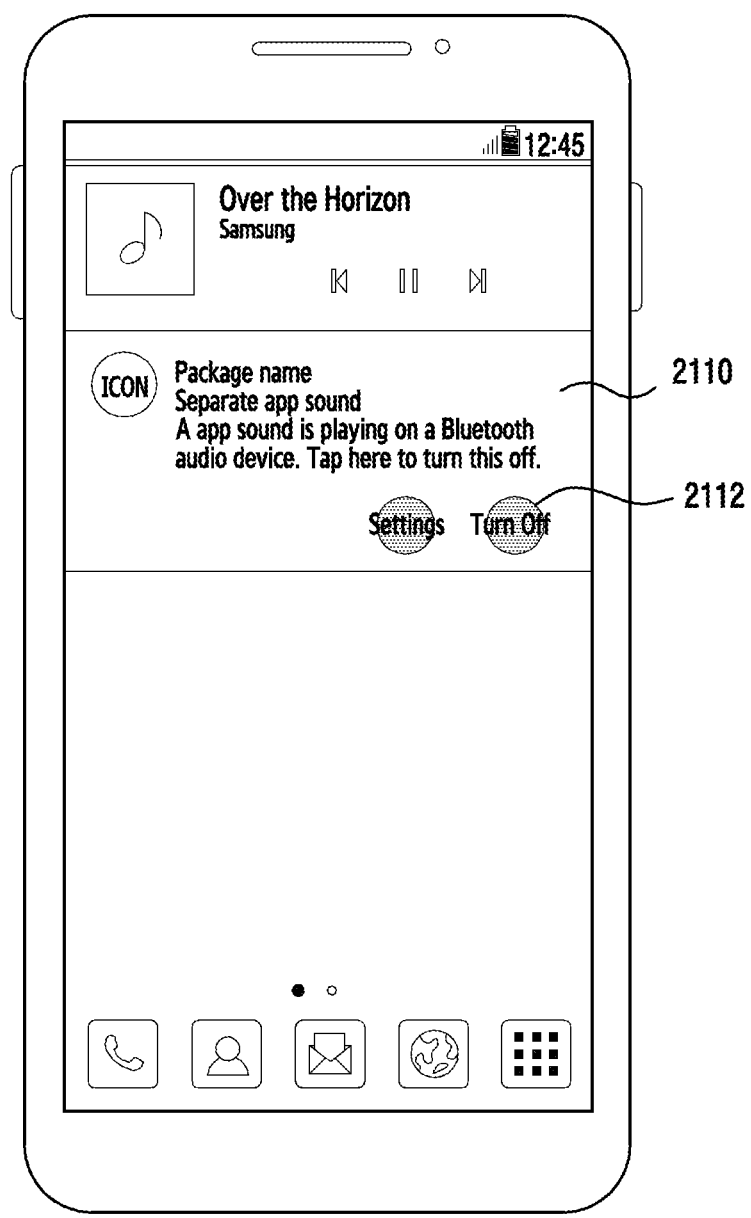

FIG. 20 is a flowchart illustrating a process of controlling separate output of audio data by an electronic device according to various embodiments of the disclosure. FIGS. 21A and 21B illustrate configurations of a screen for controlling the separate output of audio data by an electronic device according to various embodiments of the disclosure. Hereinafter, at least one operation in FIG. 20 will be described with reference to FIGS. 21A and 21B.

Referring to FIG. 20, the electronic device according to various embodiments may detect execution of an application in operation 2001. For example, the electronic device may detect that application A, which is a music application, is executed by a user input.

The electronic device may output audio data of the executed application in operation 2003. The electronic device may identify an audio output device of the executed application, and may output audio data to the identified audio output device. For example, when the executed application A is an application that is set to output audio data to a sub-output device, and the sub-output device is a Bluetooth device connected to the electronic device, the electronic device may transmit audio data of the application A to the Bluetooth device. As another example, when the executed application B is an application that is set to output audio data to a main-output device, and the main-output device is the electronic device, the electronic device may transmit audio data of the application B via a speaker of the electronic device.

The electronic device may determine whether audio data is being output to the sub-output device in operation 2005. For example, the electronic device may determine whether the audio output device of the executed application is a sub-output device in operation 2003.

When the audio data is being output to a sub-output device, the electronic device may display information indicating that the audio data is being separately output on a screen in operation 2007. The information indicating that the audio data is being separately output may include at least one of a predetermined icon, a graphic image, and a message. The information indicating that the audio data is being separately output may be displayed in a quick panel area, an upper bar area, a notification area, an area indicating that an application is executed, an area that is previously designated by a designer, or an area designated by a user. The information indicating that the audio data is being separately output may be displayed in the form of a popup window. For example, as illustrated in FIGS. 21A and 21B, the electronic device may display, on a screen, a message 2100 and 2110 indicating that the sound of application A is being output to a Bluetooth device.

The electronic device may determine whether an event for deactivating a separate audio output function is detected in operation 2009. The electronic device may determine whether the event for deactivating the separate audio output function is detected, based on whether a user input for information indicating that the audio data is being separately output is detected. For example, as illustrated in FIG. 21A, when a user touch is detected from an area where the message 2100 indicating that audio data is being separately output is displayed, it is determined that the event for deactivating the separate audio output function is detected. As another example, as illustrated in FIG. 21B, when a user touch on a button item 2112 for deactivating a separate output function is detected within an area where the message 2110 indicating that audio data is being separately output is displayed, it is determined that the event for deactivating the separate audio output function is detected.

When the event for deactivating the separate audio output function is detected, the electronic device may perform control such that audio data is output via the main-output device in operation 2011. For example, the electronic device may perform control such that the audio data of the application A is not output via the Bluetooth device, which is the sub-output device, but is output via the electronic device, which is the main-output device.

When the event for deactivating the separate audio output function is not detected, the electronic device may check whether output of the audio data to the sub-output device is terminated in operation 2013. For example, the electronic device may check whether output of the audio data to the sub-output device is terminated, based on whether the execution of an application that is outputting audio data to the sub-output device is terminated. When the execution of the application that is outputting audio to the sub-output device is terminated, the electronic device may determine that output of the audio data to the sub-output device is terminated.

When output of the audio data to the sub-output device is not terminated, the electronic device may return to operation 2007, and may continue to display, on the screen, information indicating that the audio data is being separately output. When output of the audio data to the sub-output device is terminated, the electronic device may terminate an operation procedure according to various embodiments of the disclosure.

In the above described embodiments, an electronic device sets an audio output device for an application, based on a user input, thereby executing separate output of audio data. However, according to various embodiments, an electronic device may set a condition for separate output, whereby separate output of audio data may be performed according to the set condition.

Figure 22A:
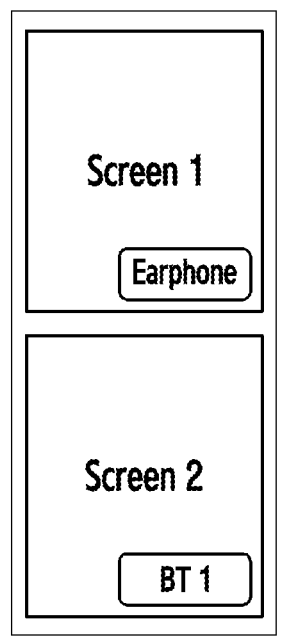
FIGS. 22A, 22B, and 22C are diagrams illustrating conditions for separate audio output by an electronic device according to various embodiments of the disclosure.
Figure 22B:
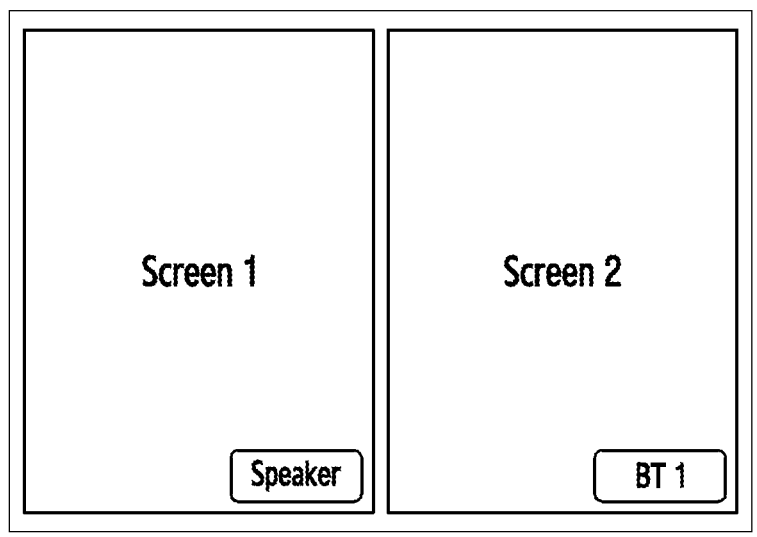
Figure 22C:
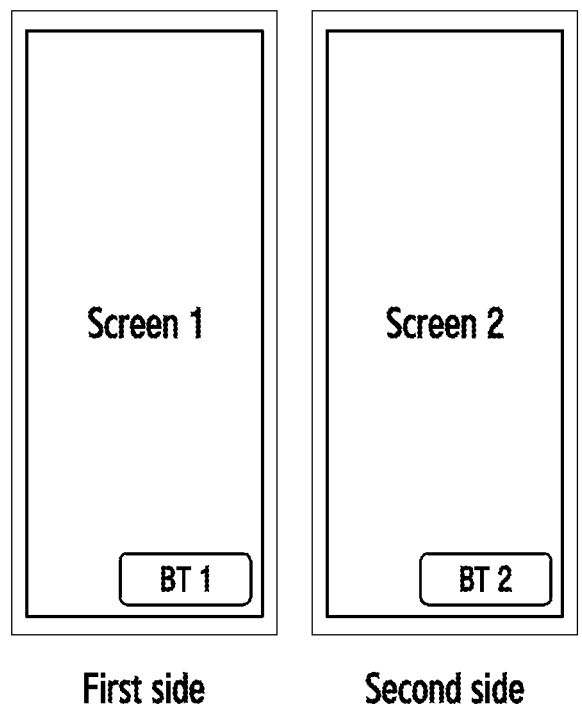

FIGS. 22A to 22C are diagrams illustrating a separation condition for audio output by an electronic device according to various embodiments of the disclosure.

Referring to FIGS. 22A to 22C, the electronic device may divide a screen area of a display into multiple areas, and may set an audio output device for each area. For example, the electronic device may divide the screen area of the display into a first area and a second area, and may set an audio output device for each of the applications executed in the first area and the second area.

The screen area of the display may be divided into multiple areas which may be logically divided by a designer and/or user setting. An audio output device for each area may be set and changed by a user. As a detailed example, as illustrated in FIG. 22A, the electronic device may divide a screen area of a single display into a first area corresponding to the upper area and a second area corresponding to the lower area, may set an audio output device for an application executed in the first area as earphones, and may set an audio output device for an application executed in the second area as a first Bluetooth device. In the example illustrated in FIG. 22B, the electronic device may divide a screen area of a single display into a first area corresponding to the left area and a second area corresponding to the right area, may set an audio output device for an application executed in the first area as a speaker, and may set an audio output device for an application executed in the second area as a first Bluetooth device.

The screen area of a display may be divided in advance into multiple areas which are physically divided. In the example illustrated in FIG. 22C, the screen area of the display of the electronic device may be divided in advance into a first area corresponding to the screen area of a display disposed on a first side and a second area corresponding to the screen area of a display disposed on a second side. An audio output device for each area may be set and changed by a user. In the example illustrated in FIG. 22C, the electronic device may set an audio output device for an application executed in the first area disposed on the first side as a first Bluetooth device, and may set an audio output device for an application executed in the second area disposed on the second side as a second Bluetooth device.

In this situation, when execution of an application is detected, the electronic device may identify an audio output device of the corresponding application, based on the area where the corresponding application is displayed. When application A is equally executed in both the first area and the second area, the electronic device may recognize the application A executed in the first area and the application A executed in the second area as different applications, may provide audio data of the application A executed in the first area to an audio output device corresponding to the first area, and may provide audio data of the application A executed in the second area to an audio output device corresponding to the second area.

Figure 23A:
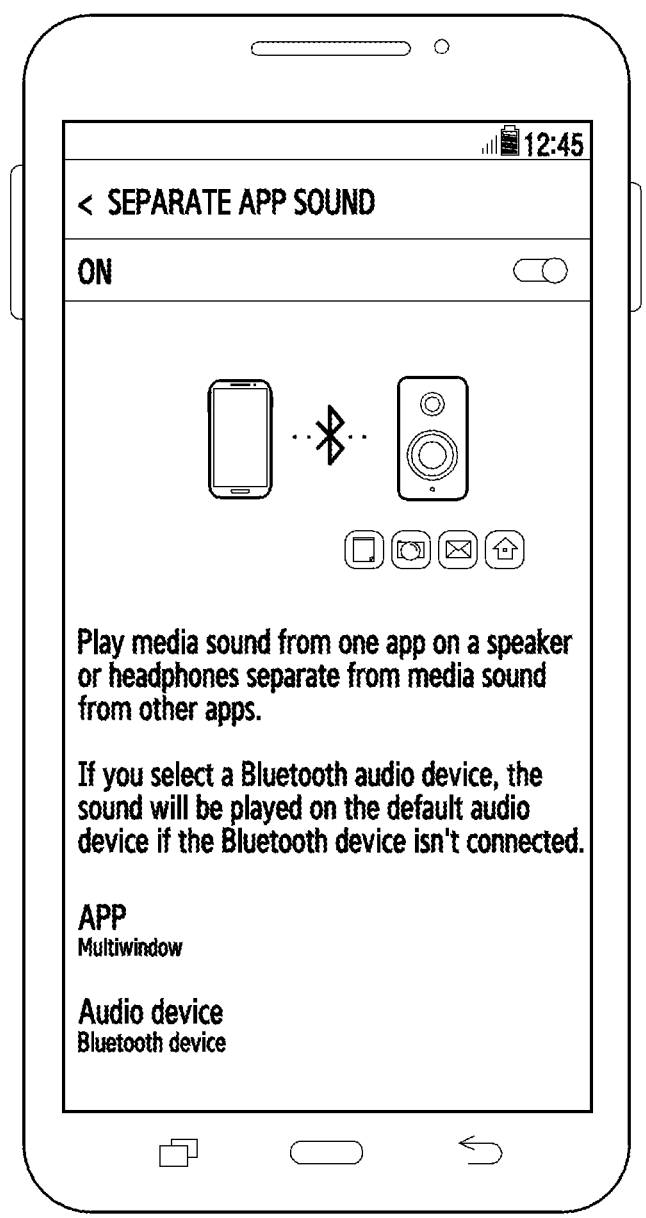
FIGS. 23A and 23B are diagrams illustrating conditions for separate audio output by an electronic device according to various embodiments of the disclosure.
Figure 23B:
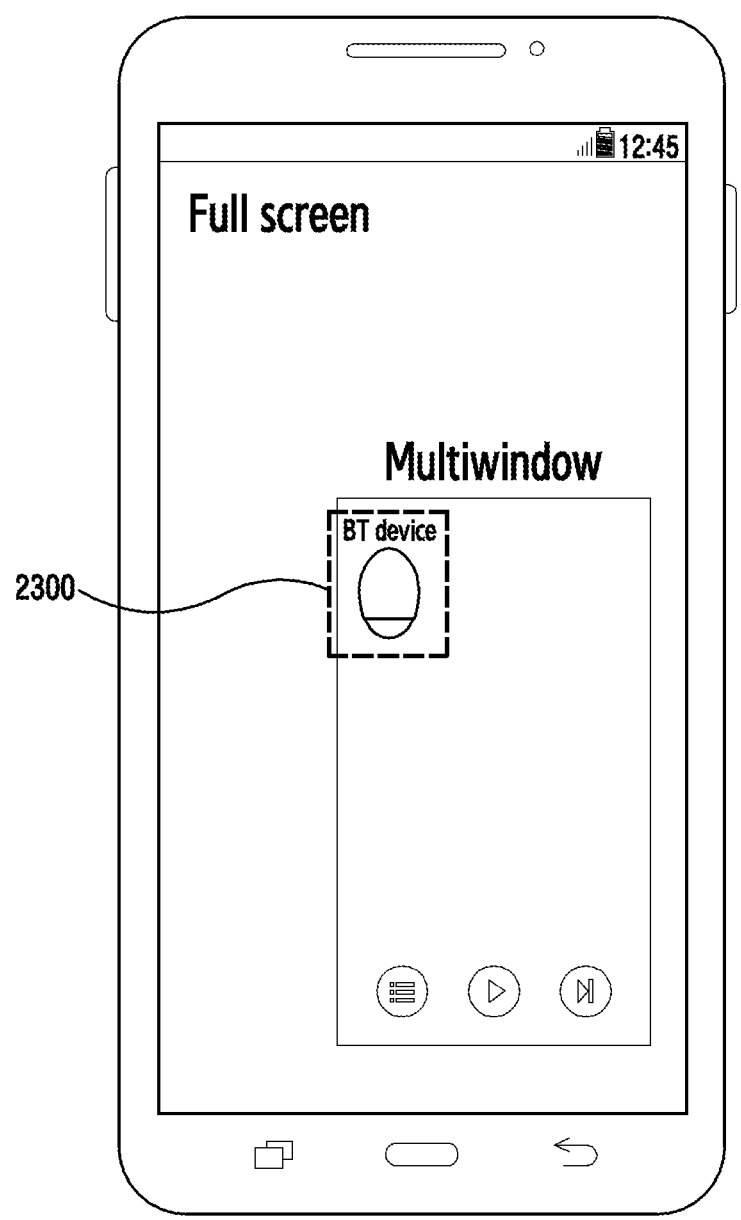

FIGS. 23A to 23B are diagrams illustrating a condition for separate audio output by an electronic device according to various embodiments of the disclosure.

Referring to FIGS. 23A and 23B, the electronic device may set an audio output device of an application based on a window type corresponding to the application. For example, the electronic device may perform setting such that audio data of an application executed in a multi-window is output to a sub-output device. In the example illustrated in FIG. 23A, the electronic device may set a condition for a separate audio output application as a multi-window, and may set a Bluetooth device a sub-output device for separate audio output. Accordingly, as illustrated in FIG. 23B, the electronic device may output the audio data of an application executed in a multi-window to the Bluetooth device. Although not illustrated, the electronic device may output the audio data of an application executed in a basic window via an audio output device set as a main-output device. The electronic device may display information (e.g., an icon, a graphic image, and a message) 2300 indicating that a corresponding application is outputting audio data via a Bluetooth device within a multi-window that displays an application execution screen.

When multiple applications are executed in a multi-window, the electronic device may set audio data of the multiple applications to be output via a sub-output device. When multiple applications are executed in a multi-window, the electronic device may perform setting such that audio data of an application corresponding to a multi-window displayed in the uppermost part of a screen from among the multiple applications is output to a sub-output device, and audio data of an application corresponding to the remaining multi-window is output to a main-output device.

As described above, the electronic device separately outputs audio data of at least one application from among multiple applications so as to satisfy various user requirements.

FIGS. 24A to 24D are diagrams illustrating a situation in which separate output of audio data is applied by an electronic device according to various embodiments of the disclosure.

Figure 24A:
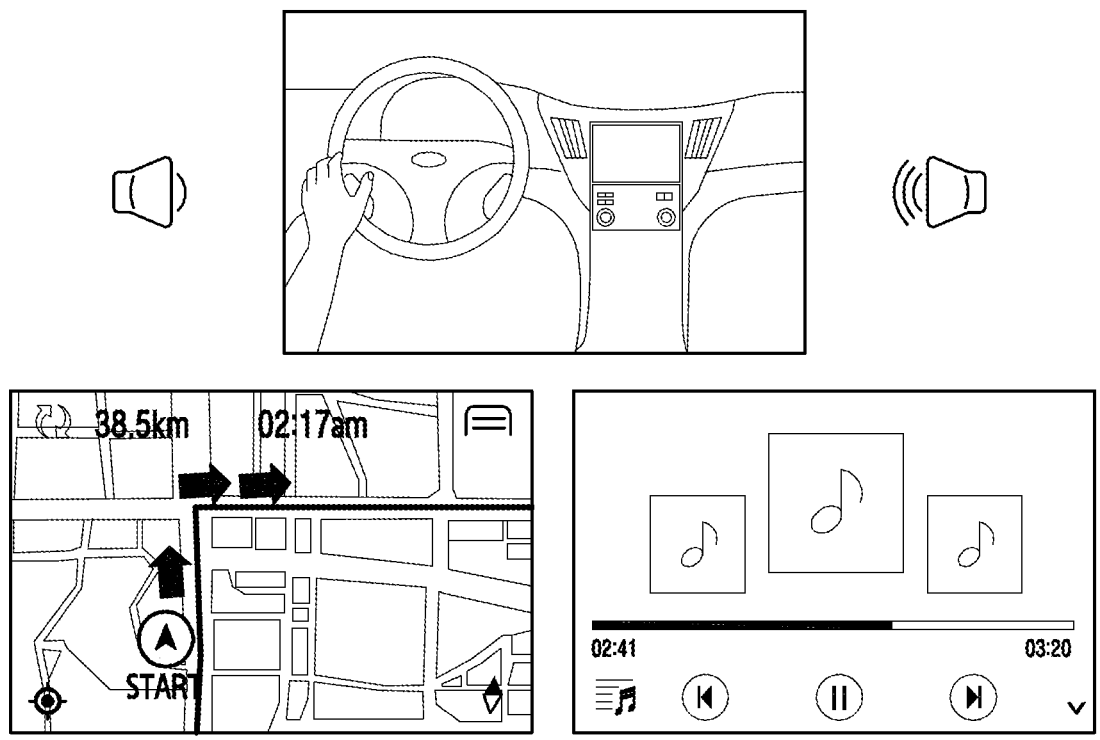
FIGS. 24A, 24B, 24C, and 24D are diagrams illustrating situations in which separate output of audio data is applied by an electronic device according to various embodiments of the disclosure.
Figure 24B:
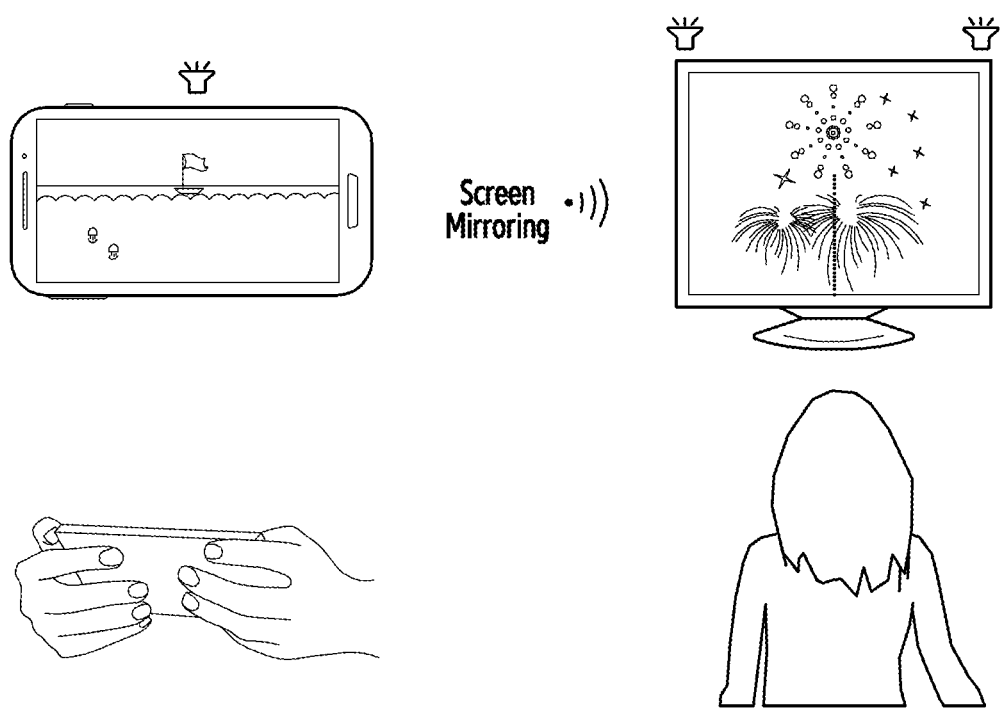
Figure 24C:
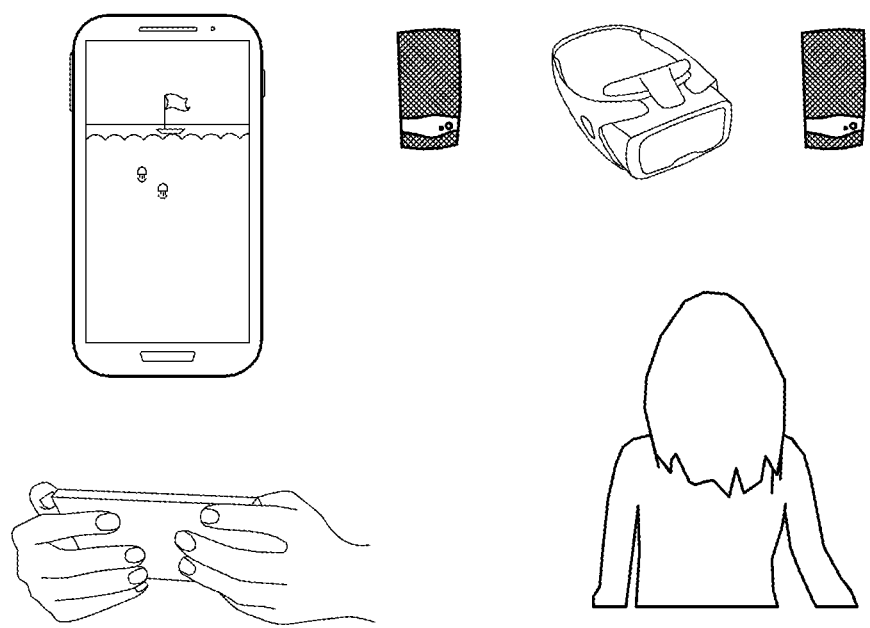
Figure 24D:
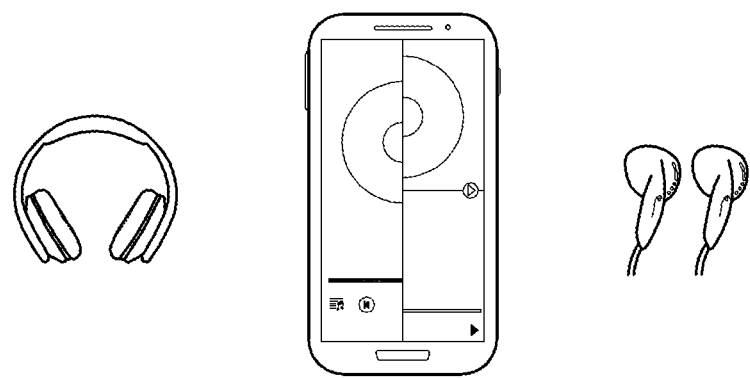

Referring to FIG. 24A, while a user drives a vehicle, the electronic device may output audio data of a navigation application via a speaker of the electronic device, and may output audio data of a music application via a speaker installed to the vehicle. In the example illustrated in FIG. 24B, the electronic device may output audio data of a game application via a speaker of the electronic device or earphones, and may output audio data of a video application via a TV. In the example illustrated in FIG. 24C, the electronic device may output audio data of a game application via a speaker of the electronic device, and may output audio data of a music application via a Bluetooth speaker. In the example illustrated in FIG. 24D, the electronic device outputs audio data of a music application executed in a first area of a screen via a Bluetooth headset, and may output audio data of a music application executed in a second area of the screen via earphones of the electronic device.

According to an electronic device of various embodiments and an operation method thereof, the electronic device may perform control such that audio data of multiple applications are separately output via different audio output devices, and thus various user desires may be satisfied.

According to an electronic device of various embodiments and an operation method thereof, the electronic device may provide a user interface that is capable of setting and changing an audio output device and an application that is to output audio data via the corresponding audio output device, whereby audio data of multiple applications can be output using multiple audio output devices according to a user's preference.

According to an electronic device of various embodiments and an operation method thereof, the electronic device may provide a user interface capable of separately controlling the volume of audio data output via different audio output devices, whereby a user can control the volume of audio data of an application that the user desires.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (e.g., modules or functions thereof) or the method (e.g., operations) according to the disclosure may be implemented by a command stored in a computer-readable storage medium in a program module form. The instruction, when executed by a processor (e.g., the processor 220), may cause the one or more processors to execute the function corresponding to the instruction. The computer-readable storage medium may be, for example, the memory 230.

The computer readable recoding medium may include a hard disk, a floppy disk, magnetic media (for example, a magnetic tape), optical media (for example, a compact disc read only memory (CD-ROM) and a DVD), magneto-optical media (for example, a floptical disk), a hardware device (for example, a ROM, a RAM, a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the disclosure, and vice versa.

Any of the modules or programming modules according to various embodiments of the disclosure may include at least one of the above described elements, exclude some of the elements, or further include other additional elements. The operations performed by the modules, programming module, or other elements according to various embodiments of the disclosure may be executed in a sequential, parallel, repetitive, or heuristic manner. Further, some operations may be executed according to another order or may be omitted, or other operations may be added.

The embodiments disclosed herein are provided merely to easily describe technical details of the disclosure and to help the understanding of the disclosure, and are not intended to limit the scope of various embodiments of the disclosure. Therefore, it should be construed that all modifications and changes or various other embodiments based on the technical idea of various embodiments of the disclosure fall within the scope of various embodiments of the disclosure.

While the disclosure has been shown and described with reference to various embodiments thereof, it will be understood by those skilled in the art that various changes in form and details may be made therein without departing from the spirit and scope of the disclosure as defined by the claims and their equivalents.

What is claimed is:

1. An electronic device comprising:
a plurality of displays comprising:
a first display disposed on a first side of the electronic device and including a first display area, and a second display disposed on a second side of the electronic device different from the first side and including a second display area, wherein the first display is physically separate from the second display; a communication interface; at least one processor; and a memory electrically connected to the at least one processor, wherein the memory is configured to store instructions, that, when executed, enable the at least one processor to perform: detecting a connection to at least one other electronic device via the communication interface, displaying a default path list including the electronic device and the at the one other electronic device and a separate path list including the at least one other electronic device connected to the electronic device, wherein the default path list includes an icon indicating that a corresponding device is set as a default device, and wherein the separate path list includes an icon indicating that a corresponding device is set to a certain application, changing an audio output device for at least one application and updating the display of the corresponding icon, based on a user input to one of the default path list and the separate path list, and outputting audio data of the at least one application through the audio output device.

2. The electronic device of claim 1, wherein the memory is further configured to store an instruction for:
in response to detecting the connection of the at least one other electronic device, controlling the display to display information in the separate path list indicating that the electronic device and the at least one other electronic device are set as audio output devices of different applications based on a user input.

3. The electronic device of claim 2, wherein the separate path list comprises identification information of a first application program corresponding to one of the electronic device and the at least one other electronic device.

4. The electronic device of claim 2, wherein the memory is further configured to store instructions for:
identifying an application executed in at least one display area among the first display area and the second display area, based on the at least one display area where the application is displayed, identifying at least one audio output device among the electronic device and at least one other electronic device which is connected through the communication interface.

5. The electronic device of claim 1, wherein the memory is further configured to store instructions for: detecting an audio volume control event; displaying audio volume information associated with each of the electronic device and the at least one other electronic device; and controlling a volume of one of the electronic device and the at least one other electronic device, based on a user input.

6. The electronic device of claim 1, wherein the memory is further configured to store instructions for:
detecting an audio volume control event;
displaying audio volume information of a first electronic device that outputs audio data of an executed application program that is being displayed on a screen, from among the electronic device and the at least one other electronic device; and
controlling a volume of the first electronic device, based on a user input.

7. The electronic device of claim 1, wherein the memory is further configured to store instructions for:
detecting execution of a first application program that takes a first electronic device as an audio output device from among the electronic device and the at least one other electronic device; and
controlling the display to display information indicating that audio data of the first application program is output to the first electronic device.

8. The electronic device of claim 7, wherein the memory is further configured to store instructions for:
interrupting output of the audio data of the first application program to the first electronic device, based on a user input; and
outputting the audio data of the first application program to a second electronic device.

9. The electronic device of claim 4, wherein the memory is configured to store instructions for setting the audio output device corresponding to one of the first display area or the second display area based on a user input.

10. The electronic device of claim 9, wherein the user input comprises a first user input fora selecting an application program and a second user input for selecting one of the electronic device and the at least one other electronic device as the audio output device of the selected application program.

11. A method of operating an electronic device comprising a plurality of displays comprising a first display disposed on a first side of the electronic device an including a first display area, and a second display area disposed on a second side of the electronic device different from the first side and including a second display area, wherein the first display is physically separate from the second display, the method comprising: detecting a connection to at least one other electronic device via a communication interface of the electronic device; displaying a default path list including the electronic device and the at the at least one other electronic device and a separate path list including the at least one other electronic device connected to the electronic device, wherein the default path list includes an icon indicating that a corresponding device is set as a default device, and wherein the separate path list includes an icon indicating that a corresponding device is set to a certain application; changing an audio output device for an application and updating the display of the corresponding icon, based on a user input to one of the default path list and the separate path list; and outputting audio data of the application through the audio output device.

12. The method of claim 11, further comprising:
in response to detecting the connection of the at least one other electronic device, displaying information in the separate path list indicating that the electronic device and the at least one other electronic device are set as audio output devices of different application programs based on a user input.

13. The method of claim 12, wherein the separate path list comprises identification information of a first application program corresponding to one of the electronic device and the at least one other electronic device.

14. The method of claim 12, further comprising:
identifying an application executed in at least one display area among the first display area and the second display area; and
based on the at least one display area where the application is displayed, identifying at least one audio output device among the electronic device and at least one other electronic device which is connected through a communication interface of the electronic device.

15. The method of claim 11, further comprising:
detecting an audio volume control event;
displaying audio volume information of each of the electronic device and the at least one other electronic device; and
controlling a volume of one of the electronic device and the at least one other electronic device, based on a user input.

16. The method of claim 11, further comprising:
detecting an audio volume control event;
displaying audio volume information of a first electronic device that outputs audio data of an executed application program that is being displayed on a screen from among the electronic device and the at least one other electronic device; and controlling a volume of the first electronic device, based on a user input.

17. The method of claim 11, further comprising:
detecting execution of a first application program that takes a first electronic device as an audio output device, from among the electronic device and the at least one other electronic device; and
displaying information indicating that audio data of the first application program is output to the first electronic device.

18. The method of claim 14, further comprising setting the audio output device corresponding to one of the first display area or the second display area based on a user input.

19. The method of claim 11, wherein the changing of the audio output device comprises:
in response to user input to the default path list, changing an audio output device for all applications, based on the user input; and in response to user input to the separate path list, changing an audio output device for the certain application, based on the user input.

20. The method of claim 11, wherein at least one of the default path list or the separate path list comprises:
- an equalizer icon indicating that at least one of the electronic device or the at least one other electronic device operates as a main output device or a sub output device,
- identification information of an application indicating that audio data of the application is output through at least one of the electronic device or the at least one other electronic device,
- a user interface for selecting at least one of the electronic device or the at least one other electronic device as the main output device or the sub output device.

* * * * *